(12) United States Patent
Kaku et al.

(10) Patent No.: US 12,005,811 B2
(45) Date of Patent: Jun. 11, 2024

(54) SEAT SYSTEM

(71) Applicant: TS TECH CO., LTD., Asaka (JP)

(72) Inventors: Hiroyuki Kaku, Tochigi (JP); Atsushi Kusano, Tochigi (JP); Satoru Kaneda, Tochigi (JP); Satoshi Suzuki, Tochigi (JP); Munetaka Kowa, Tochigi (JP); Yoshikazu Ito, Tochigi (JP); Yasuharu Otsuka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 398 days.

(21) Appl. No.: 17/298,339

(22) PCT Filed: Nov. 29, 2019

(86) PCT No.: PCT/JP2019/046741
§ 371 (c)(1),
(2) Date: May 28, 2021

(87) PCT Pub. No.: WO2020/111220
PCT Pub. Date: Jun. 4, 2020

(65) Prior Publication Data
US 2022/0111765 A1    Apr. 14, 2022

(30) Foreign Application Priority Data

Nov. 29, 2018  (JP) ................................. 2018-224048
Nov. 29, 2018  (JP) ................................. 2018-224053
(Continued)

(51) Int. Cl.
*B60N 2/00*    (2006.01)
*A63B 71/06*   (2006.01)
*G09F 19/00*   (2006.01)

(52) U.S. Cl.
CPC .......... *B60N 2/002* (2013.01); *A63B 71/0622* (2013.01); *G09F 19/00* (2013.01); *A63B 2220/52* (2013.01)

(58) Field of Classification Search
CPC .. A63B 71/0622; A63B 2220/52; B60N 2/002
See application file for complete search history.

(56) References Cited

U.S. PATENT DOCUMENTS

| 6,607,484 B2 | 8/2003 | Suzuki et al. |
| 6,942,615 B2 | 9/2005 | Suzuki et al. |

(Continued)

FOREIGN PATENT DOCUMENTS

| CN | 108764977 A | 11/2018 |
| CN | 108859876 A | 11/2018 |

(Continued)

OTHER PUBLICATIONS

International Search Report and Written Opinion issued for International Patent Application No. PCT/JP2019/046741, dated Feb. 18, 2020, 20 pages including English translation.

(Continued)

*Primary Examiner* — Milton Nelson, Jr.
(74) *Attorney, Agent, or Firm* — HSML P.C.

(57) ABSTRACT

To propose a new value for a seat, a seat system which can make notification of advertising information fit for an occupant seated on the seat with a sensor included therein is provided. The seat system includes: a seat which includes a seat body, and a sensor provided in the seat body and configured to acquire information for use in identifying a physical state of an occupant seated on the seat body; a server having pieces of advertising information stored therein; and a terminal capable of acquiring the information from the sensor and communicating with the server. The terminal or the server is configured to choose, based on the (Continued)

information or an evaluation value based on the information, a piece of advertising information related to the information or the evaluation value from among the pieces of advertising information, and notify the occupant of the piece of advertising information.

5 Claims, 36 Drawing Sheets

(30) Foreign Application Priority Data

Nov. 29, 2018 (JP) .................................. 2018-224086
Nov. 29, 2018 (JP) .................................. 2018-224090

(56) References Cited

U.S. PATENT DOCUMENTS

| | | | |
|---|---|---|---|
| 9,795,322 | B1 | 10/2017 | Karunaratne et al. |
| 9,981,158 | B2 * | 5/2018 | Melnik .............. A63B 21/4047 |
| 10,302,444 | B2 | 5/2019 | Miyajima |
| 10,328,816 | B2 | 6/2019 | Ichikawa et al. |
| 10,558,213 | B2 | 2/2020 | Sato et al. |
| 2001/0049471 | A1 | 12/2001 | Suzuki et al. |
| 2003/0194205 | A1 | 10/2003 | Suzuki et al. |
| 2003/0195398 | A1 | 10/2003 | Suzuki et al. |
| 2003/0204132 | A1 | 10/2003 | Suzuki et al. |
| 2011/0269601 | A1 | 11/2011 | Nelson et al. |
| 2014/0243711 | A1 | 8/2014 | Sugiyama et al. |
| 2017/0282740 | A1 | 10/2017 | Ichikawa et al. |
| 2017/0370744 | A1 | 12/2017 | Miyajima |
| 2018/0046185 | A1 | 2/2018 | Sato et al. |
| 2018/0078812 | A1 * | 3/2018 | Harlow .................. A47C 7/402 |
| 2018/0333093 | A1 | 11/2018 | Gallagher et al. |

FOREIGN PATENT DOCUMENTS

| | | |
|---|---|---|
| JP | H09276256 A | 10/1997 |
| JP | 2001344352 | 12/2001 |
| JP | 2002215639 | 8/2002 |
| JP | 2007280363 A | 10/2007 |
| JP | 2011258080 A | 12/2011 |
| JP | 2012048286 A | 3/2012 |
| JP | 2014161514 A | 9/2014 |
| JP | 2015156877 | 9/2015 |
| JP | 2016218648 A | 12/2016 |
| JP | 2017041939 A | 2/2017 |
| JP | 2017065504 | 4/2017 |
| JP | 2017107326 | 6/2017 |
| JP | 2017178079 | 10/2017 |
| JP | 2018027726 | 2/2018 |
| JP | 2018075357 A | 5/2018 |
| JP | 2018190249 A | 11/2018 |
| WO | 2016121174 | 8/2016 |

OTHER PUBLICATIONS

Decision of Refusal issued for Japanese Patent Application No. 2018-224053, Dispatch Date: Jan. 24, 2023, 6 pages including English translation.

Notification of Reason(s) for Refusal issued for Japanese Patent Application No. 2018-224053, Dispatch Date: Oct. 18, 2022, 6 pages including English translation.

The First Office Action issued for Chinese Patent Application No. 201980079360.6, dated Oct. 16, 2023, 14 pages including English machine translation.

Notice of Reasons for Refusal issued for Japanese Patent Application No. 2023-002062, Dispatch Date: Feb. 6, 2024, 8 pages including English machine translation.

Notice of Reasons for Refusal issued for Japanese Patent Application No. 2023-030608, Dispatch Date: Feb. 27, 2024, 8 pages including English machine translation.

The Second Office Action issued for Chinese Patent Application No. 201980079360.6, dated Apr. 19, 2024, 18 pages including English machine translation other than search results.

* cited by examiner

| AVERAGE TIME | ADVERTISING INFORMATION |
|---|---|
| ~11 secs. | GYM |
| 11~14 secs. | YOGA CLASS |
| 14~17 secs. | TREKKING GUIDE |
| 17 secs.~ | EXERCISE PROGRAM FOR SENIOR CITIZEN | ion fit for the physical state of the occupant
SEAT SYSTEM

TECHNICAL FIELD

This disclosure relates to a seat system comprising a seat with a sensor.

BACKGROUND ART

A car seat with a plurality of pressure sensors located on the seat to detect a seated posture of an occupant is hitherto known in the art (Patent document 1).

Also known in the art is a system for executing a recharge guidance control such that in order to encourage the use of external charging for a hybrid car or an electric car, if a utilization indicator of an extent of utilization of external charging is lower than a threshold value, a determination is made that the extent of utilization of external charging is low, and once the car is parked in an electric recharging point such as a home parking lot and a charging station, etc. in which external charging is available, utilization of external charging is encouraged (Patent document 2).

Also known in the art is a control system for a self-driving car in which when an operation button is operated by a driver during automated driving, switching is done from automated driving to non-automated driving for a driver to operate a car, such that when a driver during automated driving is to be requested to terminate the automated driving, notification of a preliminary request is first given to the driver and then notification of a termination request is given to the driver, by means of a display and/or a speaker provided on an instrument panel (Patent document 3).

CITATION LIST

Patent Literature

Patent document 1: JP 2017-065504 A
Patent document 2: JP 2017-178079 A
Patent document 3: JP 2018-027726 A

SUMMARY OF INVENTION

However, the car seat of Patent document 1 merely presenting the results of evaluation made on the seating posture of the driver disadvantageously does not appear to be utilized in its full potential.

In one aspect, as a new value added to a seat with a sensor, a seat system is proposed which can make notification of advertising information fit for an occupant seated on the seat.

A seat system is disclosed which comprises: a seat which includes a seat body, and a sensor provided in the seat body and configured to acquire information for use in identifying a physical state of an occupant seated on the seat body; a server having pieces of advertising information stored therein; and a terminal capable of acquiring the information from the sensor and communicating with the server.

The terminal or the server is configured to choose, based on the information or an evaluation value based on the information, a piece of advertising information related to the information or the evaluation value from among the pieces of advertising information, and notify the occupant of the piece of advertising information.

With this configuration, a piece of advertising information is chosen based on information acquired by the sensor provided in the seat body, and other information, and the occupant is notified thereof; therefore, notification of advertising information fit for the physical state of the occupant seated on the seat with the sensor can be made.

The terminal may comprise a location information acquisition unit configured to acquire location information of the seat, and the terminal or the server may be configured to choose, based on the information or the evaluation value and on the location information, a piece of advertising information related to the information or the evaluation value and the location information from among the pieces of advertising information.

With this configuration, a piece of advertising information is chosen with reference made not only to information corresponding to the physical state but also to the location information; therefore, notification of advertising information fit for the current location of the occupant and the physical state of the occupant can be made.

The terminal may be configured to determine, based on the chosen piece of advertising information, a location of an advertiser of the piece of advertising information, and to make notification of the piece of advertising information on condition that a location specified by the location information is in a predetermined area including the location of the advertiser.

With this configuration, notification of the piece of advertising information is made on condition that the location specified by the location information is within a predetermined range of distance from the location of the advertiser, and thus the occupant is notified of the piece of advertising information corresponding to the current location in which the occupant is at present; therefore, the occupant can swiftly move to a place for receiving articles or services presented in the piece of advertising information, and can receive the services or the like offered therein without delay.

The sensor may be a pressure sensor, the terminal may be configured to compute an evaluation value related to physical exercise, based on a pressure value as the information, and the terminal or the server may choose a piece of advertising information, based on the evaluation value.

With this configuration, the piece of advertising information is chosen based on the evaluation value related to physical exercise; therefore, a facility fit for the athletic ability of the occupant, or the like, can be recommended to the occupant.

The terminal may be capable of executing an exercise program for prompting the occupant seated on the seat to do physical exercises based on the pressure value from the pressure sensor, and configured to notify the occupant of the chosen piece of advertising information, on condition that during execution of the exercise program, a predetermined set of exercises has been completed.

With this configuration, the occupant can be notified of the piece of advertising information fit for the achievement in the executed exercise program.

Further, in specific examples as will be described below, various other embodiments of a seat system comprising a seat with a sensor are disclosed.

Proposed as a new value is a seat system provided in an environment where seats with sensors are located in various places, such that an occupant seated on a seat can utilize information acquired in another seat.

The seat system comprises; a first seat including a first seat body and a first sensor provided in the first seat body and configured to acquire first information for use in detecting a physical state of an occupant seated on the first seat body; a second seat including a second seat body and a second sensor provided in the second seat body and configured to acquire second information for use in detecting a physical state of an occupant seated on the second seat body; a mobile terminal capable of communicating with the first seat and the second seat, computing a first evaluation value that is an evaluation value of the physical state of the occupant based on the first information, and computing a second evaluation value that is an evaluation value of the physical state of the occupant based on the second information; and a data accumulator configured to accumulate the first evaluation value and the second evaluation value as integrated data.

With this configuration, when an occupant is seated on the first seat, the occupant can use the mobile terminal to acquire the first information from the first seat and compute the first evaluation value from the first information. Also, when an occupant is seated on the second seat, the occupant can use the mobile terminal to acquire the second information from the second seat and compute the second evaluation value from the second information. The first evaluation value and the second evaluation value computed in the mobile terminal are accumulated in the data accumulator as integrated data. Accordingly, an occupant seated on a predetermined seat in an environment where seats with sensors are located in various places can utilize information acquired in another seat.

The mobile terminal may comprise the data accumulator.

With this feature, a server comprising the data accumulator is not necessary, and the configuration of the seat system can be simplified accordingly.

Alternatively, the seat system may further comprise a server capable of communicating with the mobile terminal, and the server may comprise the data accumulator.

With this configuration, the mobile terminal may not need to have the data accumulator provided therein, and the storage capacity of the mobile terminal can be freed accordingly.

The mobile terminal may be configured to be capable of acquiring data integrated in the server from the server, so that the occupant may be notified of the data acquired from the server.

With this configuration, the occupant is notified of the data integrated in the server via the mobile terminal; therefore, the occupant can utilize the data effectively.

The first sensor and the second sensor may be pressure sensors, and the mobile terminal may be configured to be capable of computing an amount of exercise of the occupant as the first evaluation value based on a first pressure value as the first information, and computing an amount of exercise of the occupant as the second evaluation value based on a second pressure value as the second information.

With this configuration, the amount of exercise of the occupant is adopted as the evaluation value, and thus the occupant can consult the integrated amount of exercise, and can grasp the occupant's own physical state.

Further, in specific examples as will be described below, an in-seat experience system and a car are disclosed.

The system of Patent document 2 is configured to encourage utilization of external charging by visual representation on a display, or voice output from a speaker, and the effect of motivating a user to take action of recharging is thus limited.

It would be desirable to provide an in-seat experience system and a car which can motivate a user to take action of recharging.

It would be possible to guide a user to a specific charging station.

It would be expected to summon motivation to drive in such a manner as to reduce power consumption.

An in-seat experience system in one aspect comprises a seat, an experience instruction device, and a server. The seat is installed in a car comprising a motor as a driving source and a battery capable of supplying electric power to the motor. The seat includes a seat body, and a sensor provided in the seat body and configured to acquire a measurement value for use in detecting motion of an occupant seated on the seat body. The experience instruction device provides notification of a motion instruction to an occupant seated on the seat body. The server is capable of communicating with the experience instruction device. The experience instruction device transmits user identification information for use in identifying the occupant to the server, and makes a determination based on the measurement value of the sensor as to whether or not a condition for granting points is satisfied, and transmits the result of determination to the server at least if the condition for granting points is satisfied. The server adds a point score obtained by multiplying a basic point score based on the result of determination by a predetermined factor to and increases a point score stored for the corresponding user identification information on condition that the result of determination that the condition for granting points is satisfied is received from the experience instruction device. The experience instruction device or the server makes the predetermined factor greater if the battery has been recharged than if the battery has not been recharged.

With this configuration, increase in the point score awarded if the battery has been recharged can serve to enhance the user's motivation to take action of recharging.

In the in-seat experience system, the experience instruction device or the server may be configured to change the predetermined factor in accordance with a type of a charging station in which the battery has been recharged.

With this configuration, the predetermined factor can be made greater or smaller in accordance with the type of the charging station in which the battery has been recharged. Therefore, it is possible to guide the user to a specific charging station.

In the in-seat experience system as described above, the experience instruction device or the server may be configured to make the predetermined factor greater if the charging station is one other than a home charging station that is a charging station at the car user's own home, than if it is the home charging station.

With this configuration, it is possible to motivate the user to willingly take action of recharging even while on the road.

In the in-seat experience system as described above, the experience instruction device or the server may be configured to make the predetermined factor greater if the battery is in a state of charge equal to or greater than a first threshold value of the state of charge than if the battery is in a state of charge smaller than the first threshold value of the state of charge.

With this configuration, the increased point score that the user can be awarded by keeping the state of charge of the battery high can serve to greatly enhance the user's motivation to take action of recharging.

In the in-seat experience system as described above, the car may be configured to be switchable in accordance with a driver's operation between a first driving mode and a second driving mode in which power consumption in the battery is less than in the first driving mode, and the experience instruction device or the server may be configured to make the predetermined factor greater if the second driving mode is in effect than if the first driving mode is in effect.

This configuration can serve to motivate the user to drive in such a manner as to reduce power consumption in the battery.

In the in-seat experience system as described above, the server may be configured to add a predetermined point score to and increase a point score stored for corresponding user identification information on condition that the car has arrived at a charging station in which the battery can be recharged.

With this configuration, the point score awarded by going to the charging station can serve to motivate the user to take action of recharging.

In the in-seat experience system as described above, the experience instruction device may be configured to prohibit a use of an application program of which power consumption is equal to or greater than a power consumption threshold value among application programs executable on the experience instruction device, if the battery is in a state of charge equal to or smaller than a second threshold value of the state of charge.

With this configuration, the use of an application program that consumes a great amount of electric power is prohibited when the state of charge of the battery is low; therefore, the user is made increasingly aware that the state of charge of the battery should be kept high enough, and can be motivated to take action of recharging.

In the in-seat experience system as described above, the seat may include a driver's seat on which a driver is to be seated, the seat body of the driver's seat may be switchable to a driving state to be assumed when the car is driven, and to a non-driving state in which at least part thereof has been moved from a position thereof in the driving state, and the experience instruction device may be configured such that when the car is running, a use of at least an application program assumed to be used when the driver's seat is in the non-driving state among application programs executable on the experience instruction device is prohibited, while if the battery is being recharged, a use of the application assumed to be used when the driver's seat is in the non-driving state is allowed.

With this configuration, even when the car is on the road, if the battery is being recharged, even a driver is allowed to use an application program chosen from a list of increased number of the application programs; therefore, the user (driver) is motivated to take action of recharging.

In another aspect, a car is provided which comprises: a motor as a driving source; a battery capable of supplying electric power to the motor; a seat including a seat body, and a sensor provided in the seat body and configured to acquire a measurement value for use in detecting motion of an occupant seated on the seat body; and an experience instruction device configured to provide notification of a motion instruction to the occupant seated on the seat body. The experience instruction device transmits user identification information for use in identifying the occupant to a server capable of communicating with the experience instruction device, makes a determination based on the measurement value of the sensor as to whether or not a condition for granting points is satisfied, and transmits the results of determination at least if the condition for granting points is satisfied, whereas the server adds a point score obtained by multiplying a basic point score based on the result of determination by a predetermined factor to and increases a point score stored for the corresponding user identification information on condition that the result of determination that the condition for granting points is satisfied is received from the experience instruction device, and whereas the experience instruction device makes the predetermined factor greater if the battery has been recharged than if the battery has not been recharged.

With this configuration, increase in the point score awarded if the battery has been recharged can serve to enhance the user's motivation to take action of recharging.

Further, in specific examples as will be described below, other embodiments of a seat system and a car, as well as a program are disclosed.

The near-future debut of a self-driving car as will free drivers from a driving operation during automated driving is in prospect. In such a car, during automated driving, a driver may operate a terminal such as a smartphone and use an application program installed therein such as a game app. In this situation, a system hitherto known in the art would disadvantageously have no capability of effectively providing notification of a termination request to the driver using the terminal.

Thus, it is proposed to provide a seat system, a car, and a program in which a driver using a terminal is effectively notified of the necessity of switching from automated driving to non-automated driving.

It would be desirable to provide means for prompting a driver to prepare for responding to the switching from automated driving to non-automated driving.

It would also be expected to effectively notify a driver of the necessity of causing the seat body to be switched from a non-driving state to a driving state.

A seat system as one aspect comprises a seat and a terminal. The seat is installed in a car that is switchable between automated driving and non-automated driving. The seat includes a seat body, and a sensor provided in the seat body and configured to acquire a measurement value for use in detecting motion of a driver seated on the seat body. The terminal acquires the measurement value from the sensor. The terminal is capable of executing an application program using the measurement value. The terminal executing the application program during automated driving is configured to notify the driver of a termination request which requests termination of execution of the application program based on information acquired from a controller of the car on switching from automated driving to non-automated driving.

With this seat system, the driver using the terminal can be effectively notified of the necessity of switching from automated driving to non-automated driving.

In the seat system as described above, the terminal may be configured to notify the driver of a primary termination request, and thereafter notify the driver of a secondary termination request, as a termination request.

With this configuration, the necessity of switching from automated driving to non-automated driving can be notified stepwise; therefore, the necessity of switching from automated driving to non-automated driving can be notified more effectively.

In the seat system as described above, the terminal may be configured to notify the driver of the termination request at a time a predetermined period of time before a time to switch from automated driving to non-automated driving.

In the seat system as described above, the terminal is configured to forcefully terminate execution of an application program if the execution of the application program is not terminated by operation of the driver after the driver is notified of the termination request.

With this configuration, the driver can be made ready for the switching to the non-automated driving.

In the seat system as described above, the seat body may be switchable to a driving state to be assumed when the car is driven, and to a non-driving state in which at least part thereof has been moved from a position thereof in the driving state, and the terminal may be configured such that if the seat body is in the non-driving state at a time to notify the driver of the termination request, the driver is notified of a switching request to move the seat body from the position in the non-driving state to the position in the driving state, in addition to the termination request.

With this configuration, the driver using the terminal can be notified effectively through the terminal that the seat body need be moved from the position in the non-driving state back to the position in the driving state.

The seat system as described above may comprise an actuator capable of moving the seat body to a position thereof in the driving state and to a position thereof in the non-driving state, and the terminal may be configured to cause the actuator to move the seat body from the position in the non-driving state to the position in the driving state if the seat body is not moved from the position in the non-driving state to the position in the driving state by operation of the driver after the driver is notified of the switching request.

With this configuration, the driver can be made ready for the switching to the non-automated driving.

In another aspect, a car capable of switching between automated driving and non-automated driving is provided. The car comprises a seat, a terminal, and a controller. The seat includes a seat body, and a sensor provided in the seat body and configured to acquire a measurement value for use in detecting motion of a driver seated on the seat body. The terminal acquires the measurement value from the sensor. The controller controls automated driving. The terminal is capable of executing an application program using the measurement value, and when executing the application program during automated driving, notifies the driver of a termination request which requests termination of execution of the application program, based on information acquired from the controller on switching from the automated driving to the non-automated driving.

With this car configured as described above, the driver using the terminal can be notified effectively of the necessity to switch from the automated driving to the non-automated driving.

In another aspect, a program to be executed on a terminal used in a car capable of switching between automated driving and non-automated driving is provided. The program notifies a driver of a termination request to request termination of execution of an application program, if the application program is being executed on the terminal during automated driving, based on information acquired from a controller of the car on switching from automated driving to non-automated driving.

With this program configured as described above, the driver using the terminal can be notified effectively of the necessity to switch from automated driving to non-automated driving.

DESCRIPTION OF EMBODIMENTS

First Embodiment

A description will be given hereafter of a first embodiment with reference made to the drawings.

Figure 1:
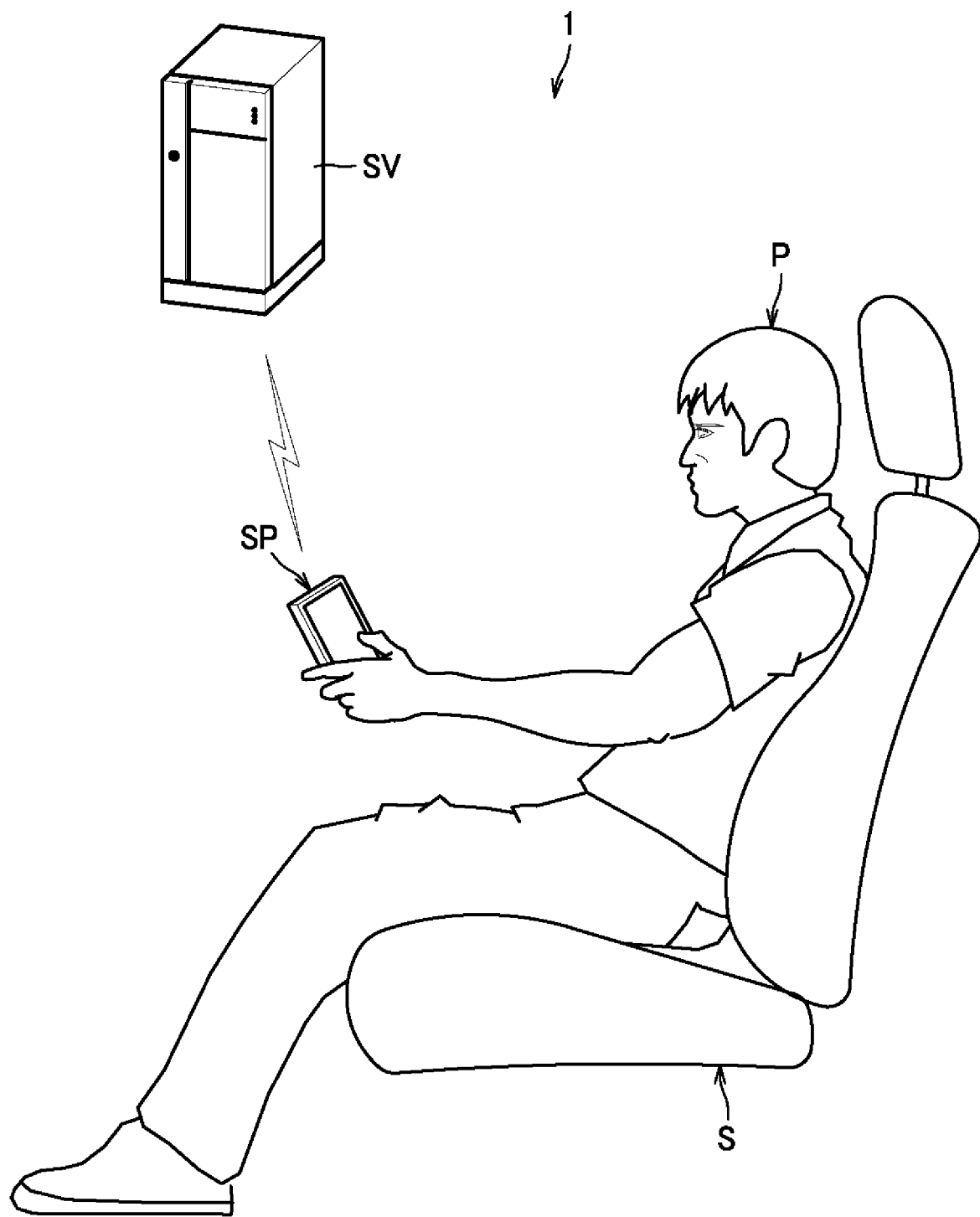
FIG. 1 is a diagram showing a seat system according to a first embodiment.

As shown in FIG. 1, a seat system 1 includes a seat S, a server SV, and a smartphone SP as an example of a terminal.

The seat S illustrated herein by way of example is a vehicle seat installed in a vehicle such as a car. In the following description, the front/rear (forward/backward), left/right (lateral), upper/lower (upward/downward) directions or positions are designated with respect to an occupant P seated on the seat S.

Figure 2:
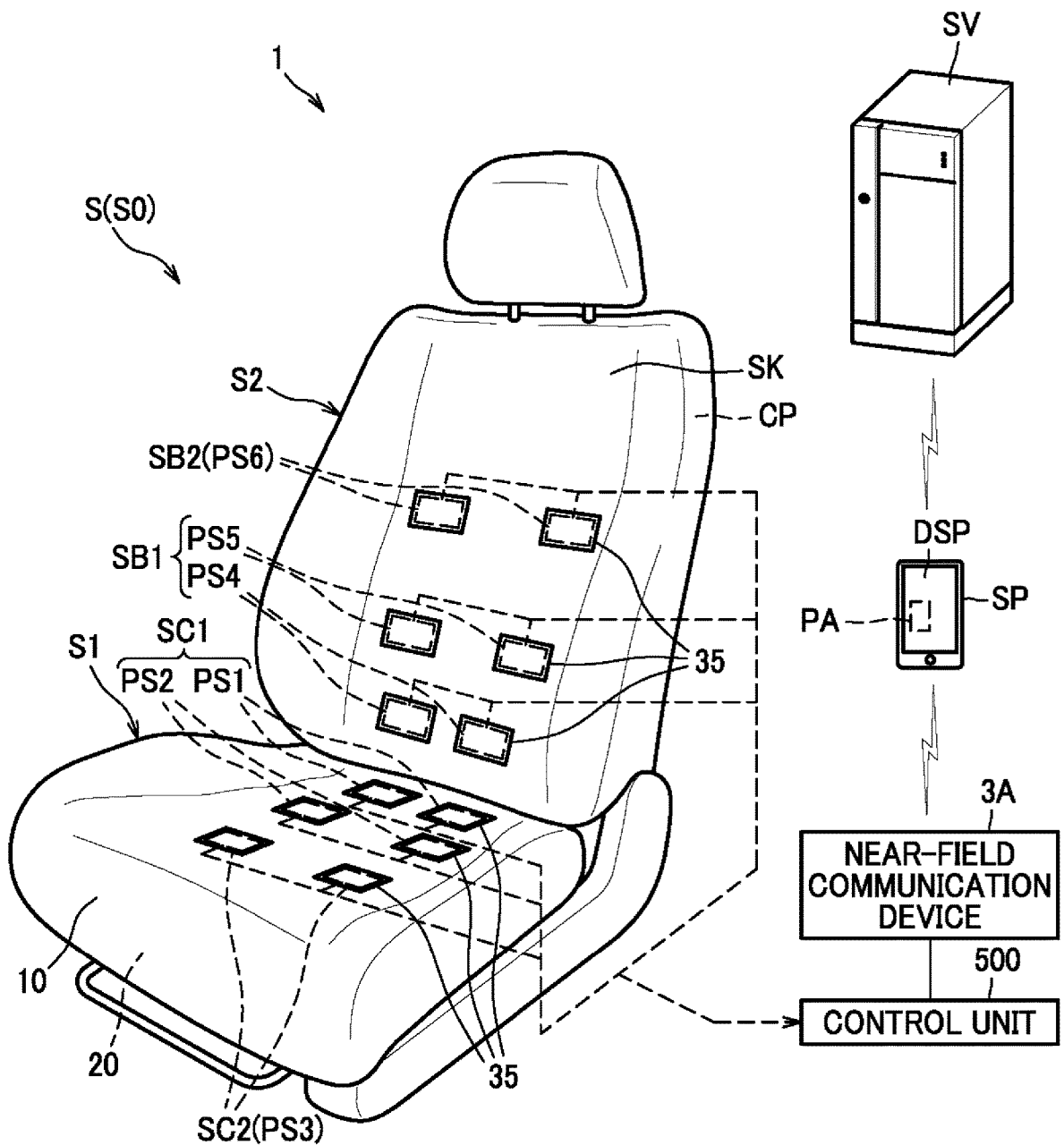
FIG. 2 is a diagram for explaining a configuration of the seat system.

As shown in FIG. 2, the seat S comprises a seat body S0 and a control unit 500. The seat body S0 includes a seat bottom S1 and a seat back S2. The seat bottom S1 and the seat back S2 each comprise a cushion pad CP and an outer covering SK with which the cushion pad CP is covered. The cushion pad CP is made of urethane foam or the like, and supported by a frame (not shown). The outer covering SK is made of synthetic leather, fabrics or the like.

For the seat bottom S1 and the seat back S2, a plurality of pressure sensors PS1 to PS6 are provided under the outer coverings SK. The pressure sensors PS1 to PS6 are examples of a sensor, and configured to acquire measurement values that are information for use in identifying a physical state of an occupant P seated on the seat body S0. The pressure sensors PS1 to PS6 are so arranged as to be allowed to detect a state of a seat surface that faces an occupant P seated on the seat body S0, to acquire values of pressure from the occupant P seated on the seat body S0.

The respective pressure sensors PS1 to PS6 are provided in pairs, i.e., each located left and right, symmetric with respect to a laterally central position of the seat S.

To be more specific, the pressure sensors PS1 to PS3 are provided in the seat bottom S1. The pressure sensors PS1 and the pressure sensors PS2 are located in positions, corresponding to the buttocks of an occupant P, of the seat bottom S1. The pressure sensors PS1 and the pressure sensors PS2 make up a first bottom sensor SC1 configured to measure pressure from the buttocks of the occupant P. The pressure sensors PS2 are located a little frontward of the pressure sensors PS1. It is to be understood that the first bottom sensor SC1 may only comprise either one pair of the pressure sensors PS1 or the pressure sensors PS2.

The pressure sensors PS3 are located under the thighs of the occupant P. The pressure sensors PS3 make up a second bottom sensor SC2 configured to determine values of pressure from the thighs of the occupant P. The pressure sensors PS3 are located frontward of and distanced far from the pressure sensors PS1 and the pressure sensors PS2.

The pressure sensors PS4 to PS6 are provided in the seat back S2. The pressure sensors PS4 are provided in positions corresponding to the back of the lumbar region of the occupant P. The pressure sensors PS5 are located in positions a little higher than the positions of the pressure sensors PS4. Both of the pressure sensors PS4 and the pressure sensors PS5 make up a first back sensor SB1 configured to measure pressure from the lumbar region of the occupant P. It is to be understood that the first back sensor SB1 may only comprise either one pair of the pressure sensors PS4 or the pressure sensors PS5.

The pressure sensors PS6 are located above and distanced far from the pressure sensors PS4 and the pressure sensors PS5. The pressure sensors PS6 are located in positions corresponding to an upper region of the back of the occupant P. The pressure sensors PS6 make up a second back sensor SB2 configured to determine values of pressure from the scapulae of the occupant P.

The pressure sensors PS1 to PS6 are each configured, for example, as an element whose electrical resistance varies with external pressure applied thereto, wherein the larger the pressure value, the higher (or the lower, as the case may be) the voltage of the detection signal becomes.

A coating 35 as an example of a location marker is applied to an outer surface of the outer covering SK, in a position corresponding to each of the pressure sensors PS1 to PS6. The coating 35 is, by virtue of being applied to the outer surface of the outer covering SK, exposed on the outside of the outer covering SK. The coating 35 has a color different from a color of the outer surface of the outer covering SK. To be more specific, for example, in cases where the outer surface of the outer covering SK is black, the color of the coating 35 may be yellow or other colors which stand out from the black color.

This coating 35 marks a location of each of the pressure sensors PS1 to PS6 in such a way as to render the location visually recognizable from outside the seat body S0.

The control unit 500 is connected to the pressure sensors PS1 to PS6 and allowed to acquire pressure values from the respective pressure sensors PS1 to PS6. The control unit 500 is configured to be capable of transmitting information detected by the respective pressure sensors PS1 to PS6 to the smartphone SP.

To be more specific, the control unit 500 is connected to a near-field communication device 3A which enables near-field wireless communication, such as Bluetooth (registered trademark), Wi-Fi (registered trademark), etc. The control unit 500 is configured to be capable of communicating with the smartphone SP via the near-field communication device 3A. The smartphone SP is configured to be capable of communicating with the server SV via the Internet.

The control unit 500, the smartphone SP, and the server SV each include a CPU, a ROM, a RAM, a rewritable nonvolatile memory, etc. (not shown), and are configured to execute pre-stored programs. The smartphone SP further includes a display DSP and a location information acquisition unit PA.

The smartphone SP has a function of acquiring a pressure value from each of the pressure sensors PS1 to PS6 via the control unit 500. The smartphone SP has a seat app installed therein for providing games executable based on signals (pressure values) transmitted from the seat S, to the occupant P.

The seat app in the present embodiment is configured to be capable of providing a 100-meter dash game to the occupant P. The 100-meter dash game is a game in which animated characters shown in the display DSP are caused to run a race based on pressure values transmitted from the seat S. The 100-meter dash game is an example of an exercise program for prompting the occupant P on the seat to do physical exercises based on the pressure values from the pressure sensors PS1 to PS3.

To be more specific, to execute the 100-meter dash game, the smartphone SP acquires pressure values $P3_R$, $P3_L$ of the right and left pressure sensors PS3 in the seat S. The smartphone SP then determines a normal pressure $P3_n$ that is an average pressure of the occupant P currently seated thereon and a threshold value P3th for detection of peaks of pressure values, and computes a normal step cycle $TS_n$ that is an average of time intervals in each of which a sequence of motions of the legs of the occupant P is completed.

Figures 3, 4:
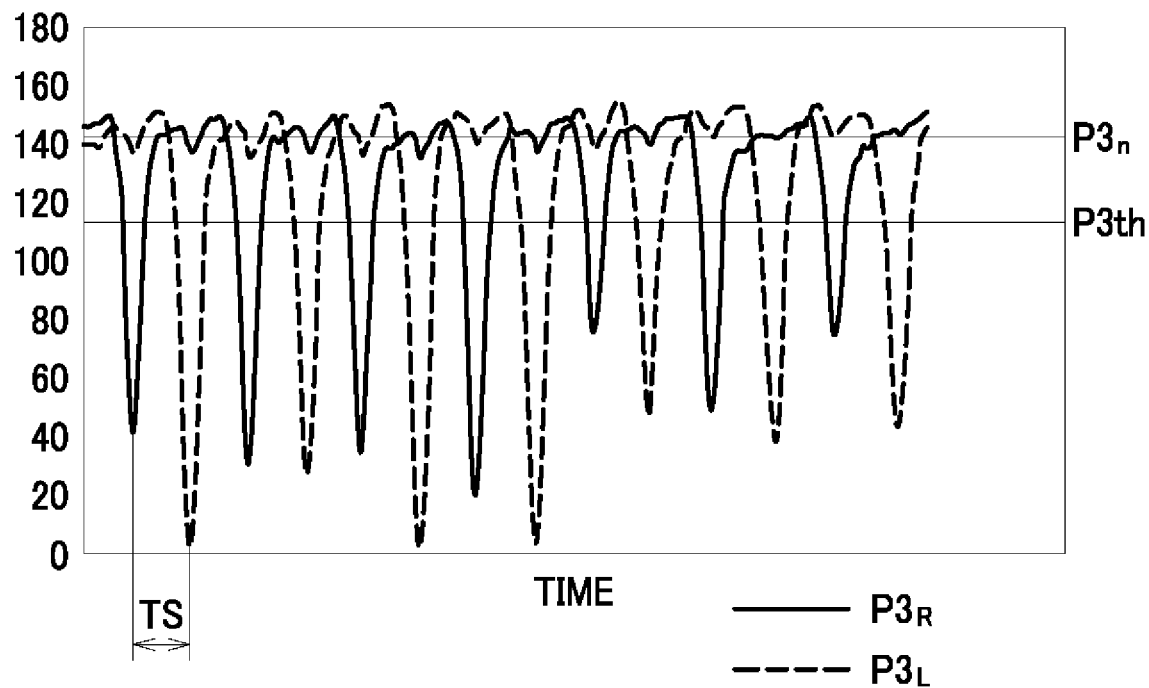
FIG. 3 is a graph showing change of pressure acquired in a 100-meter dash game.
FIG. 4 is a table for choosing advertising information from average time.

Specifically, when an occupant P lifts his/her legs alternately, the pressure values $P3_R$, $P3_L$ change as shown in FIG. 3, for example. In FIG. 3, a term in which the pressure goes down sharply indicates that the occupant P has lifted his/her leg up and the pressure at an area detected by the pressure sensor PS3 has become small accordingly. In fact, the pressure values that have not gone down but kept at about 140 will be reckoned as a normal pressure $P3_n$ that is an average of pressure values detected when the legs are not lifted up. To compute the normal pressure $P3_n$, for example, you may identify such absolute values as found not greater than a predetermined value (i.e., the values of which variations are small enough) among the absolute values of the differences between the last value and the present value of the pressure values $P3_R$, $P3_L$ (remainders each determined by subtraction of the last value P3(n−1) from the present value P3(n)), and sum up and average the present values used to obtain the identified absolute values.

The threshold value P3th is a threshold value for determining that a leg is currently being lifted up; for example, as is the case of FIG. 3, values ranging generally from 100 to 120 may be used. For this purpose, the threshold value P3th may be a value obtained by multiplying the normal pressure $P3_n$ by a predetermined value. For example, the value obtained by multiplying the normal pressure $P3_n$ by a predetermined value ranging generally from 0.6 to 0.9 may be feasible for the threshold value P3th.

The normal step cycle $TS_n$ is an average value of the step cycles TS that are time intervals between peaks of the pressure values $P3_R$, $P3_L$.

Peak detection of the pressure values $P3_R$, $P3_L$ may be determined to occur when the difference between the last value and the present value changes from the negative to the positive under the condition that each pressure value $P3_R$, $P3_L$ is smaller than the threshold value P3th (i.e., the pressure value has crossed the threshold value from above to below), and the last value P3(n−1) detected at this time is assumed to be a peak value Pm.

Upon detection of peaks of the pressure values $P3_R$, $P3_L$ varying according to the motions of the occupant P, the smartphone SP computes a peak value Pm, and computes a step intensity F ($F_R$, $R_L$) that is a leg-lift motion scale based on the peak value Pm and the normal pressure $P3_n$. The step intensity F may be indicated by the magnitude of the peak, i.e., a value obtained by subtraction of the peak value Pm from the normal pressure $P3_n$. In this embodiment, the obtained value is normalized by the normal pressure $P3_n$ so as to eliminate variations caused by largeness of the build of an occupant P. For example, the step intensity F may be given as follows:

$$F=(P3_n-Pm)/P3_n$$

During the 100-meter dash game, the smartphone SP computes the step intensity F, and causes the animated character in the display DSP to move toward the finish line. The distance to be traveled is determined herein according to the magnitude of the step intensity F. The smartphone SP causes the animated character to move, for example, the distance of F[m] toward the finish line.

Upon completion of the 100-meter dash game, the smartphone SP acquires a record time (time recorded at the finish of the 100-meter race) as an example of an evaluation value, and computes an average of the times recorded for the past period of a predetermined duration. The time may be measured by a timer which starts the measurement at the start of the game, and stops the measurement when the step intensity F multiplied by the number of computations of the step intensity F reaches 100 or more. Since the step intensity F is computed based upon the pressure value as described above, the smartphone SP computes the time (evaluation value related to physical exercise) based on the pressure value (information). The average of the times for the last period of a predetermined duration may be, for example, an average of the times for the past one month, an average of the times for the past one year, etc.

Upon completion of the 100-meter dash game, the smartphone SP shows, on the display DSP, the time acquired this time and the average time computed therefrom. Further, upon completion of the 100-meter dash game, if communication with the server SV can be established, the smartphone SP transmits the time acquired this time and the average time computed therefrom, to the server SV.

The smartphone SP is configured to be capable of acquiring its own location (of the smartphone SP itself) from the location information acquisition unit PA using a satellite positioning, navigation and timing system. Therefore, when an occupant P seated on the seat S is operating the smartphone SP, the smartphone SP can acquire the location of the seat S (hereinafter referred to as location information).

The smartphone SP has a function of acquiring, as location information of the seat S, location information from the location information acquisition unit PA when communication with the seat S is available. The smartphone SP is configured to transmit the location information of the seat S to the server SV.

The server SV has a plurality of pieces of advertising information stored therein and associated with their attributes. In the present embodiment, as shown in FIG. 4, the plurality of pieces of advertising information are associated with average times of the 100-meter dash game described above (i.e., athletic ability of the occupant P).

Two or more pieces of advertising information for each attribute (e.g., advertisements for gyms) are present and associated with locations of advertisers corresponding thereto. Herein, the locations of advertisers include a location of a shop for providing services corresponding to the advertising information, a location of a shop for selling articles corresponding to the advertising information, and the like.

The server SV has a function of choosing, based on the average time and location information transmitted from the smartphone SP, pieces of advertising information related to the average time (athletic ability of the occupant P) and location information from among the plurality of pieces of advertising information. To be more specific, if the average time is shorter than 11 seconds, the server SV chooses, as pieces of advertising information, advertisements for a gym fit for the occupant P having athletic ability as high as that of a competitive athlete.

If the average time is not shorter than 11 seconds but shorter than 14 seconds, the server SV chooses, as pieces of advertising information, advertisements for a yoga class to get moderate exercise fit for the occupant P having relatively high athletic ability. If the average time is not shorter than 14 seconds but shorter than 17 seconds, the server SV chooses, as pieces of advertising information, advertisements for a trekking guide fit for the occupant P having not-so-high athletic ability to be able to take exercise less demanding than the exercise taken in the yoga class. If the average time is not shorter than 17 seconds, the server SV chooses, as pieces of advertising information, advertisements for an exercise program for a senior citizen fit for the occupant P who should probably be an elderly person.

After choosing a plurality of pieces of advertising information corresponding to the attribute (e.g., advertisements for a gym) from the table of FIG. 4, the server SV chooses a predetermined number of advertisements from among the plurality of advertisements based on the location information indicative of the location of the seat S. Specifically, for example, the server SV chooses pieces of advertising information corresponding to the locations of advertisers found in an advertisement choosing area including the location of the seat S specified by the location information.

The server SV having chosen pieces of advertising information based on the average time and the location information transmits the chosen pieces of advertising information to the smartphone SP. The server SV notifies the occupant P of the pieces of advertising information via the smartphone SP by transmitting the pieces of advertising information to the smartphone SP.

The smartphone SP has a function of showing on the display DSP, and notifying the occupant P of, the pieces of advertising information transmitted from the server SV on condition that during execution of the 100-meter dash game, a predetermined set of exercises (one round of the 100-meter race) has been completed. Further, the smartphone SP has a function of determining, based on the pieces of advertising information transmitted from the server SV, the locations of advertisers of the relevant pieces of advertising information, and showing on the display DSP, and notifying the occupant P of, the pieces of advertising information on condition that the location specified by the location information is in a predetermined area including the locations of the advertisers.

To be more specific, the smartphone SP transmits an average time and location information to the server SV after one round of the 100-meter race has been completed. Subsequently, the smartphone SP, upon receipt of the pieces of advertising information chosen based on the average time and the location information from the server SV, makes a determination as to whether or not the location of the seat S is in the predetermined area, and if it is, shows the pieces of advertising information on the display DSP. The predetermined area herein may be an area of an inside of a circle of which a center coincides with the location of each advertiser and which has a predetermined radius and a dimension equal to or smaller than the aforementioned advertisement choosing area (the area for use in the server SV to choose pieces of advertising information based on the location information).

Next, a detailed description will be given of operations of the smartphone SP and the server SV (to be more specific, of the controllers in the smartphone SP and the server SV).

Figure 5:
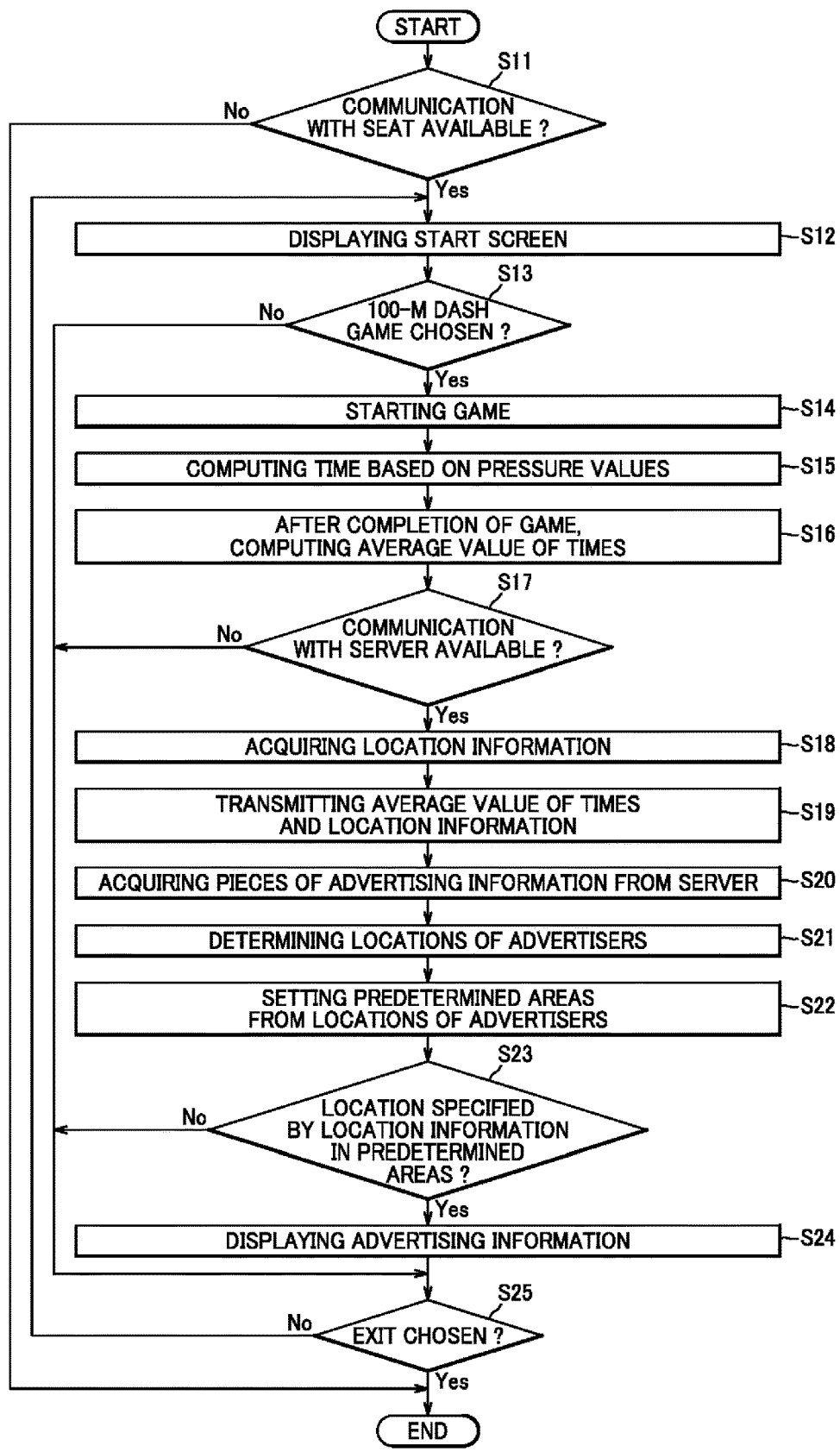
FIG. 5 is a flowchart showing a process in a smartphone.

When the occupant P launches a seat app, the smartphone SP starts the process shown in FIG. 5 (START). In this process, first, the smartphone SP makes a determination as to whether or not communication with the control unit 500 is available (S11).

If it is determined in step S11 that the communication is not available (No), then the smartphone SP brings the process to an end. If it is determined in step S11 that the communication is available (Yes), then the smartphone SP shows a start screen for the 100-meter dash game (see FIG. 7) on the display DSP (S12).

After step S12, the smartphone SP makes a determination as to whether or not the 100-meter dash game has been chosen (S13). If it is determined in step S13 that the 100-meter dash game has been chosen (Yes), then the smartphone SP starts the 100-meter dash game (S14).

After step S14, more specifically, during the 100-meter dash game, the smartphone SP computes a time based on pressure values transmitted from the seat S (S15). After step S15, more specifically, after completion of the 100-meter dash game, the smartphone SP determines the time measured this time and an average value of times for the past predetermined period of time (S16). After computing the average value of the times, the smartphone SP shows the time measured this time and the average value of the times on the display DSP (see FIG. 8).

After step S16, the smartphone SP makes a determination as to whether or not communication with the server SV is available (S17). If it is determined in step S17 that the communication is available (Yes), then the smartphone SP acquires location information indicative of the location of the seat S from the location information acquisition unit PA (S18).

After step S18, the smartphone SP transmits the average value of the times and the location information to the server SV (S19). After step S19, the smartphone SP acquires pieces of advertising information including information on locations of advertisers, transmitted from the server SV (S20).

After step S20, the smartphone SP determines the locations of the advertisers based on the acquired pieces of advertising information (S21), and sets predetermined areas from the locations of the advertisers (S22). After step S22, the smartphone SP makes a determination as to whether or not the location specified by the location information is in the predetermined areas (S23).

If it is determined in step S23 that it is in the predetermined areas (Yes), then the smartphone SP shows the advertising information on the display DSP (S24). After step S24, if it is determined in step S13 that the 100-meter dash game has not been chosen (No) or if it is determined in step S17 that the communication with the server SV is not available (No), then the smartphone SP makes a determination as to whether or not the exit from the seat app has been chosen in the start screen (FIG. 7) (S25).

If it is determined in step S25 that the exit has not been chosen (No), then the smartphone SP returns to the process of step S12. If it is determined in step S25 that the exit has been chosen (Yes), then the smartphone SP brings the process to an end.

Figure 6:
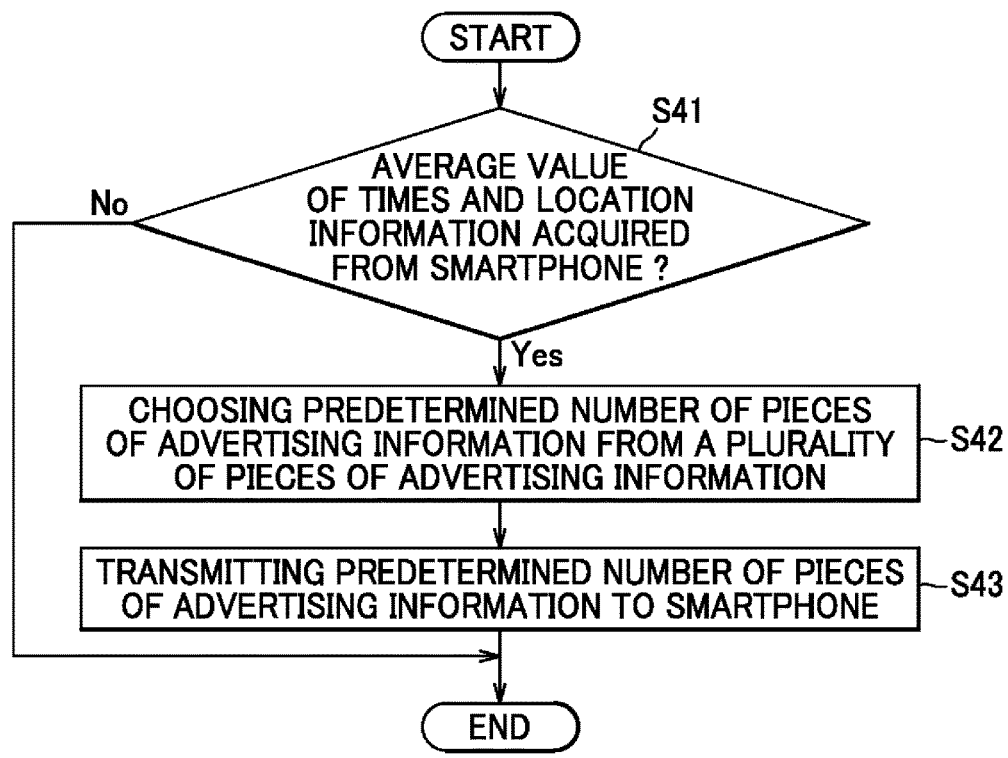
FIG. 6 is a flowchart showing a process in a server.

The server SV is always executing the process shown in FIG. 6.

As shown in FIG. 6, the server SV makes a determination as to whether or not an average value of times and location information have been acquired from the smartphone SP (S41). If it is determined in step S41 that they have not been acquired (No), then the server SV brings this round of the process to an end.

If it is determined in step S41 that they have been acquired (Yes), then the server SV chooses a predetermined number of pieces of advertising information from among a plurality of pieces of advertising information based on the average value of the times and the location information (S42). After step S42, the server SV transmits the predetermined number of chosen advertisement pieces to the smartphone SP (S43), and brings this round of the process to an end.

Next a detailed description will be given of one example of a specific operation of the seat system 1.

Figure 7:
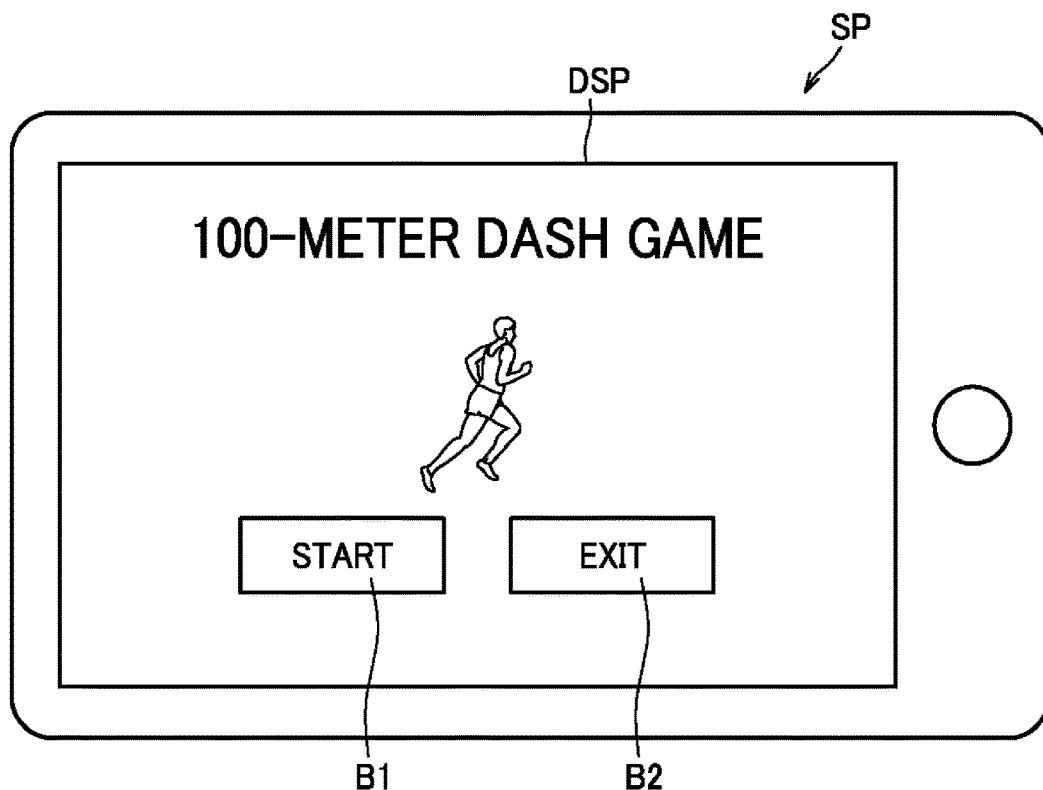
FIG. 7 is a diagram showing a start screen of a seat app.

In a state as shown in FIG. 1, where the communication capability of each of the components (S, SV, SP) constituting the seat system 1 is enabled, when the occupant P operates the smartphone SP and launches the seat app, the process steps S11 (Yes) to S12 in the process shown in FIG. 5 are executed sequentially. As a result, the start screen shown in FIG. 7 is shown on the display DSP.

In the start screen, a button B1 for starting the 100-meter dash game and a button B2 for exiting the seat app are shown. If the occupant P touches the button B1, the determination in step S13 turns out to take the affirmative (Yes), and the 100-meter dash game is executed (S14 to S16).

Figure 8:
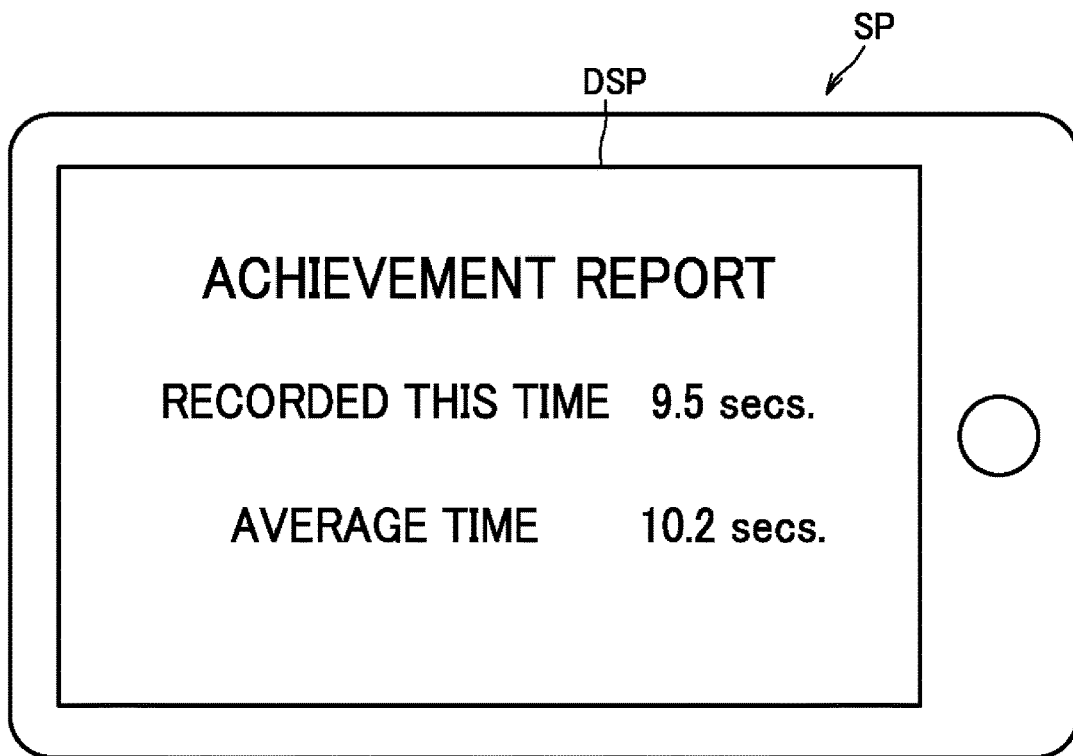
FIG. 8 is a diagram showing a screen displaying a result of the 100-meter dash game.

When the 100-meter dash game comes to an end, the smartphone SP computes an average value of times (S16), and shows the time measured this time and the average value of the times on the display DSP (see FIG. 8). Herein, the average value of the times in this example is 10.2 seconds as shown in FIG. 8. Thereafter, the smartphone SP executes the process steps S17 (Yes) to S18 and S19 to acquire location information indicative of the location of the seat S, and transmits the acquired location information and the average value of the times to the server SV.

As shown in FIG. 6, the server SV acquires the average value of the times and the location information from the smartphone SP (S41: Yes), and chooses, in step S42, a plurality of pieces of advertising information based on the average value of the times and the table shown in FIG. 4. To be more specific, the server SV chooses a plurality of advertisements of gyms from the table based upon the acquired average value of the times of 10.2 seconds.

The server SV chooses, based on the location information, a predetermined number of advertisements of gyms corresponding to the location information from among the chosen plurality of advertisements. Thereafter, the server SV transmits the chosen predetermined number of advertisements of gyms to the smartphone SP (S43).

As shown in FIG. 5, the smartphone SP acquires the predetermined number of advertisements of gyms from the server SV (S20), determines the locations of the corresponding advertisers of the respective predetermined number of advertisements of gyms (S21), and sets a predetermined area for each of the predetermined number of advertisers (S22).

Figure 9:
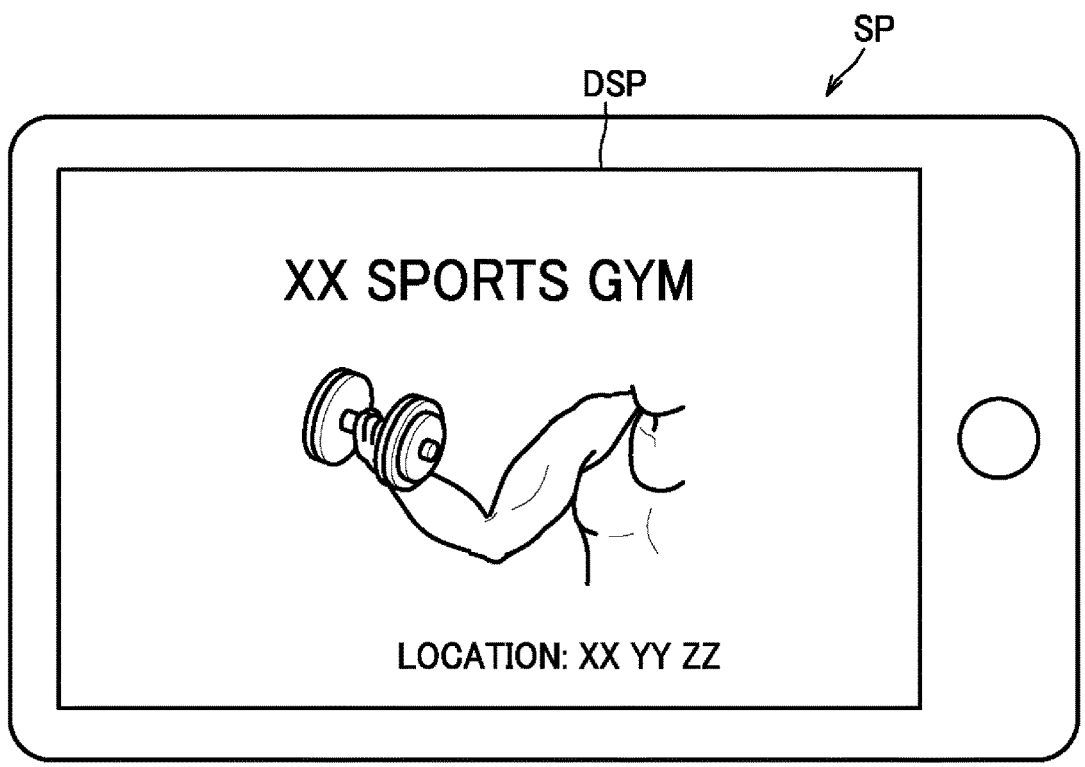
FIG. 9 is a diagram showing a screen displaying advertising information.

If the location specified by the location information is in the predetermined area for a specific advertiser "XX SPORTS GYM" (S23: Yes), then the smartphone SP shows the advertisement for the "XX SPORTS GYM" on the display DSP as shown in FIG. 9 (S24). Consequently, the occupant P can be notified that "XX SPORTS GYM" exists near the place where he/she is at present, and can request a driver to drive the vehicle toward its location.

With the seat system 1 configured as described above according to the present embodiment, the following advantageous effects can be achieved.

Since pieces of advertising information are chosen based on the average value of times as determined based on pressure values acquired by the pressure sensors PS1 to PS3 provided in the seat body S0, for the occupant P to be notified thereof, notification of advertising information fit for the physical state of the occupant P seated on the seat S with the pressure sensors PS1 to PS3 can be provided.

Since the pieces of advertising information are chosen with reference made not only to the average value of the times based on the pressure values as information corresponding to the physical state but also to the location information, notification of advertising information fit for the current location of the occupant P and the physical state of the occupant P can be provided.

Since the notification of the piece of advertising information is provided on condition that the location specified by the location information is within the predetermined area, the occupant can swiftly move to a place for receiving articles or services presented in the piece of advertising information, and can receive the services or the like offered therein without delay.

Since the pieces of advertising information are chosen based on the average value of the times as an evaluation value, a facility fit for the athletic ability of the occupant P can be recommended to the occupant P.

Since the occupant P is notified of the chosen piece of advertising information on condition that one round of the 100-meter dash game has been completed, the occupant P can be notified of the piece of advertising information fit for the achievement in the executed 100-meter dash game.

The first embodiment as described above may be modified where appropriate for practical application, as in the other embodiments which will be described below.

In the above-described embodiment, pieces of advertising information are chosen in the server SV, but the pieces of advertising information may be chosen in the smartphone SP.

In the above-described embodiment, the pieces of advertising information are chosen based on the average value of times as an evaluation value based on the information, but the pieces of advertising information may be chosen, for example, based on the pressure values as information. Specifically, for example, as the pressure values acquired by the pressure sensors PS1 to PS3 are substantially proportional to the weights of the occupants P, an alternative configuration may be such that advertising information for diet food or the like is chosen if the pressure values are not smaller than a predetermined value, while advertising information for restaurants or the like is chosen if the pressure values are smaller than the predetermined value.

In the above-described embodiment, the pressure values are taken as an example of information, but information may, for example, be blood pressures, heart rates, body temperatures, amounts of perspiration, or the like. It is to be understood that the sensor may be any sensor capable of detecting such information.

For example, an alternative configuration where the blood pressures are used as the information may be such that advertising information for hospitals or the like is chosen on condition that the blood pressures are not lower than a predetermined value, while advertising information for gyms or the like is chosen on condition that the blood pressures are lower than the predetermined value. Another alternative configuration where the information is the amounts of aspiration may be such that advertising information for beverages such as isotonic sports drinks fit for intake of water and supplemental salt is chosen on condition that the amounts of aspiration are not lower than a first threshold value, while advertising information for regular beverages such as juice, soda, tea, or the like fit for intake of water is chosen on condition that the amounts of aspiration are lower than the first threshold value.

In the above-described embodiment, the average value of times is taken as an example of the evaluation value related to physical exercise, but the evaluation value related to physical exercise may be, for example, the time recorded this time, or the number of steps taken, or the like.

In the above-described embodiment, the location information acquisition unit PA using the satellite positioning, navigation and timing system is taken as an example, but the location information acquisition unit may, for example, be a unit which not only receives radio waves from the positioning satellite, but also uses radio waves received from and transmitted to base stations installed on the ground to acquire location information. The location information acquisition unit may be configured to acquire location information from an ECU or a navigation system provided in the vehicle.

In the above-described embodiment, the 100-meter dash game is taken as an example of the exercise program, but the exercise program may be, for example, Zazen (seated meditation) game for inviting the occupant to sit still on the seat S in a cross-legged position. The Zazen game may be configured as a game such that the occupant P is invited to keep his/her posture in which pressures applied on the left side and the right side of the seat bottom S1 are almost equated while pressures applied on the front side and the rear side of the seat bottom S1 are almost equated. If the achievement of the executed Zazen game has turned out to be good, i.e., an excellent Zazen posture is being kept successfully, then advertising information for a facility in which a sport like a slacklining fit for a person excellent in adjusting his/her posture for balance can be done may be chosen, while if the achievement has turned out to be below expectations, then advertising information for a balance ball or the like may be chosen.

In the above-described embodiment, the occupant P is notified of the advertising information by visual representation on the display DSP, but the occupant may alternatively be notified of the advertising information, for example, by voice or the like.

In the above-described embodiment, as an example of the seat S, a car seat for use in an automobile is illustrated, but the seat may alternatively be, for example, a seat for use in other vehicles such as a ship, an aircraft, etc. The seat is not limited to a vehicle seat, but may be a legless chair with a backrest (as used in a Japanese-style room).

In the above-described embodiment, the smartphone SP is taken as an example of a terminal, but the present invention is not limited thereto; the terminal may be a mobile terminal other than the smartphone SP, such as a tablet. The terminal may be a terminal fixed to the seat or a built-in terminal fitted integrally in the seat.

Second Embodiment

A second embodiment will be described below with reference to the drawings.

Figure 10:
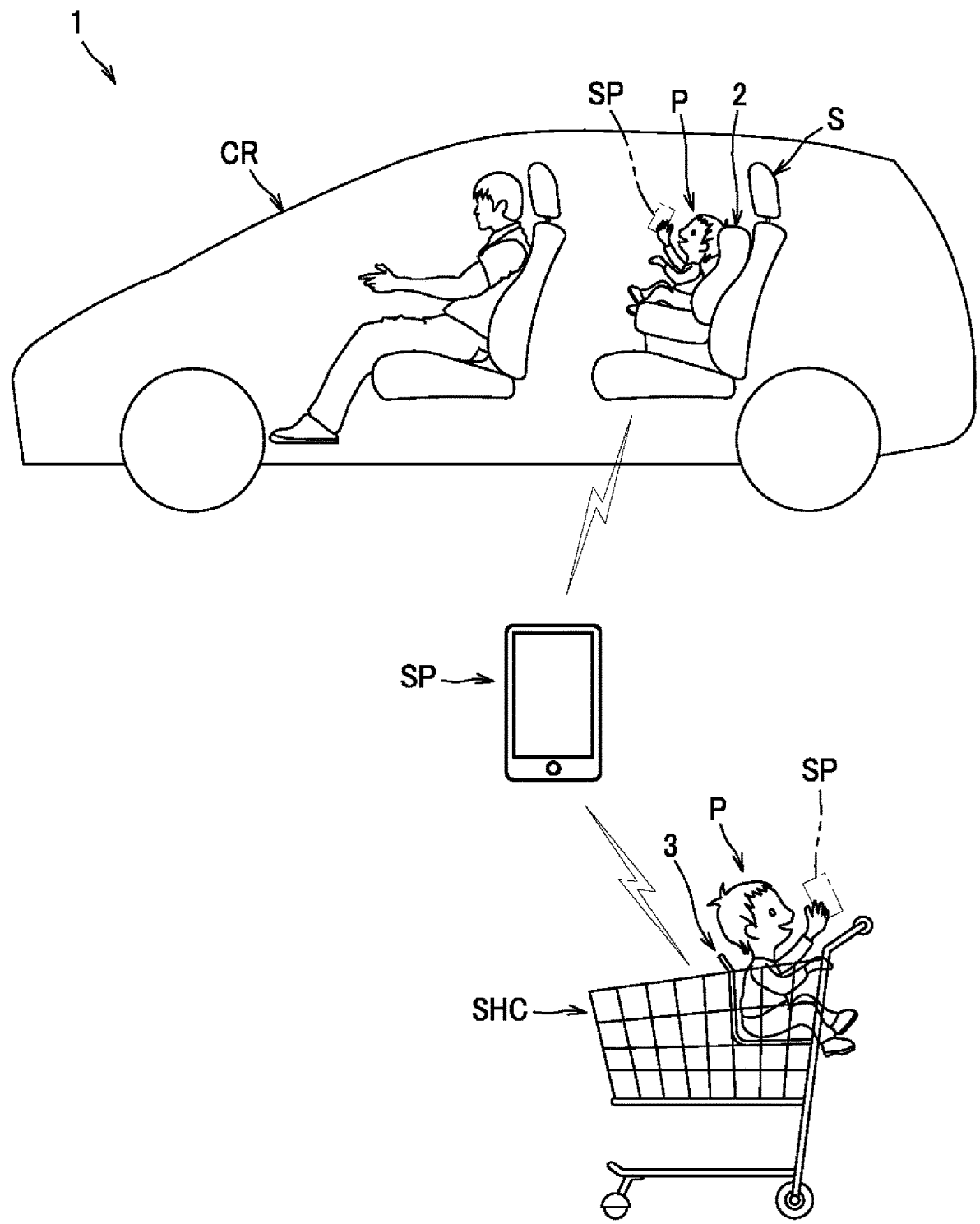
FIG. 10 is diagram showing a seat system according to a second embodiment.

As shown in FIG. 10, a seat system 1 includes a child safety seat 2 as an example of a first seat, a shopping cart seat 3 as an example of a second seat, and a smartphone SP as an example of a mobile terminal.

The child safety seat 2 is a seat for a child to be attached to the seat S installed in a car CR. The shopping cart seat 3 is a seat for a child which is provided in a shopping cart SHC commonly available in supermarkets, home centers and the like. In the following description, front/rear (forward/backward), left/right (lateral), upper/lower (upward/downward) directions or positions are designated with respect to an occupant P seated on the child safety seat 2 or the shopping cart seat 3.

Figure 11:
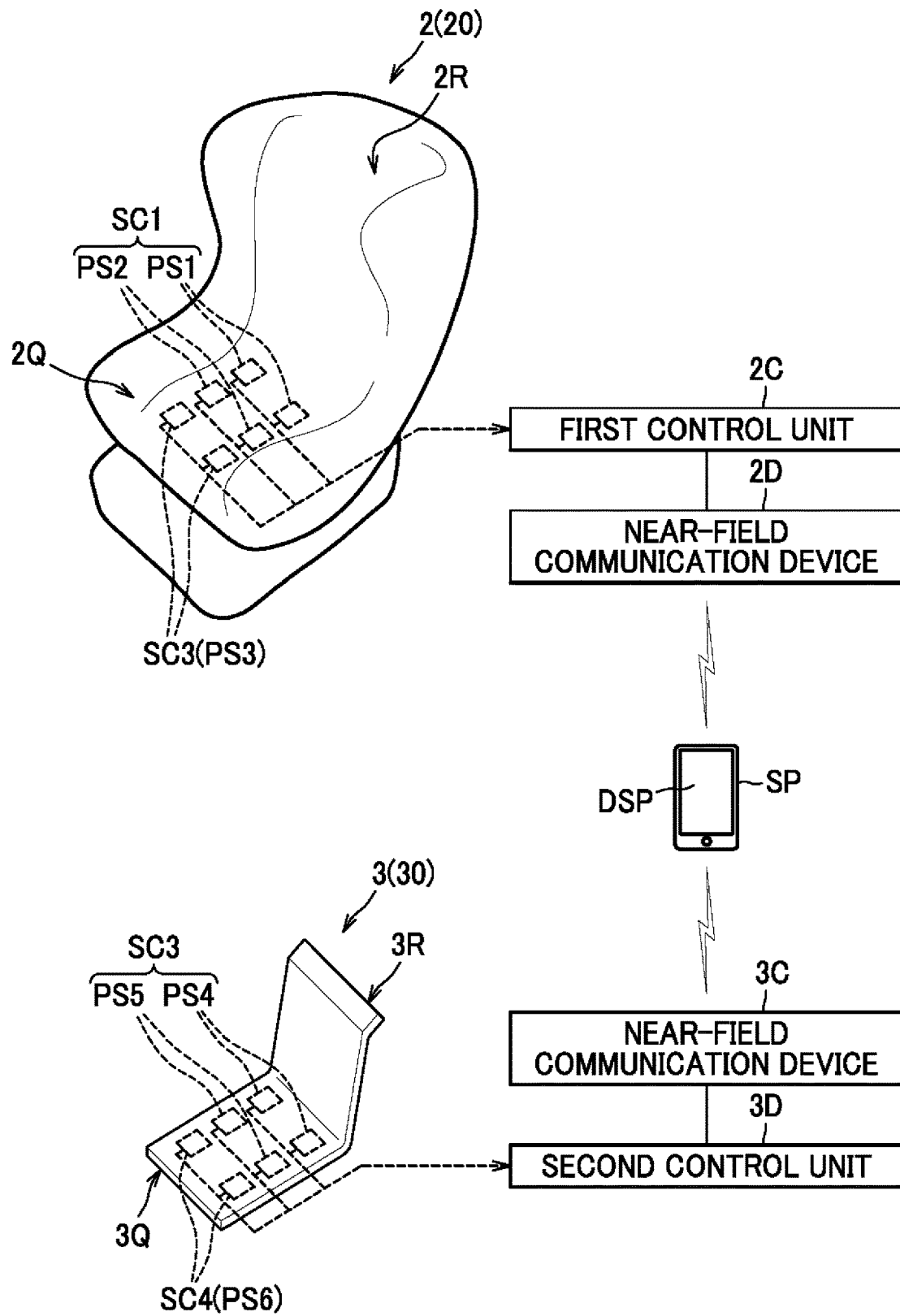
FIG. 11 is a diagram for explaining a configuration of the seat system.

As shown in FIG. 11, the child safety seat 2 comprises a first seat body 20 and a first control unit 2C. The first seat body 20 includes a seat bottom 2Q and a seat back 2R. The seat bottom 2Q and the seat back 2R each comprise a cushion pad and an outer covering with which the seat bottom 2Q is covered. The cushion pad is made of urethane foam or the like, and supported by a frame (not shown). The outer covering is made of fabrics or the like.

For the seat bottom 2Q, a plurality of pressure sensors PS1 to PS3 are provided under the outer covering. The pressure sensors PS1 to PS3 are examples of a first sensor, and configured to acquire measurement values that are first information for use in detecting a physical state, specifically, a motion, of an occupant P seated on the first seat body 20. The pressure sensors P1 to P3 are so arranged as to be allowed to detect a state of a seat surface that faces an occupant P seated on the first seat body 20, to acquire values of pressure from the occupant P seated on the first seat body 20.

The respective pressure sensors PS1 to PS3 are provided in pairs, i.e., each located left and right, symmetric with respect to a laterally central position of the child safety seat 2.

To be more specific, the pressure sensors PS1 and the pressure sensors PS2 are located in positions, corresponding to the buttocks of an occupant P, of the seat bottom 2Q. The pressure sensors PS1 and the pressure sensors PS2 make up a first bottom sensor SC1 configured to measure pressure from the buttocks of the occupant P. The pressure sensors PS2 are located frontward of the pressure sensors PS1. It is to be understood that the first bottom sensor SC1 may only comprise either one pair of the pressure sensors PS1 or the pressure sensors PS2.

The pressure sensors PS3 are located under the thighs of the occupant P. The pressure sensors PS3 make up a second bottom sensor SC2 configured to determine values of pressure from the thighs of the occupant P. The pressure sensors PS3 are located frontward of the pressure sensors PS2.

The pressure sensors PS1 to PS3 are each configured, for example, as an element whose electrical resistance varies with external pressure applied thereto, wherein the larger the pressure value, the higher (or the lower, as the case may be) the voltage of the detection signal becomes.

The first control unit 2C is connected to the pressure sensors PS1 to PS3 and allowed to acquire pressure values from the respective pressure sensors PS1 to PS3. The first control unit 2C is configured to be capable of transmitting information detected by the respective pressure sensors PS1 to PS3 to the smartphone SP.

To be more specific, the first control unit 2C is connected to a near-field communication device 2D which enables near-field wireless communication, such as Bluetooth (registered trademark), Wi-Fi (registered trademark), etc. The first control unit 2C is configured to be capable of communicating with the smartphone SP via the near-field communication device 2D.

The shopping cart seat 3 comprises a second seat body 30 and a second control unit 3D. The second seat body 30 includes a seat bottom 3Q and a seat back 3R. The seat bottom 3Q and the seat back 3R are made of plastic.

For the seat bottom 3Q, a plurality of pressure sensors PS4 to PS6 are provided. The pressure sensors PS4 to PS6 are examples of a second sensor, and configured to acquire measurement values that are second information for use in detecting a physical state, specifically, a motion, of an occupant P seated on the second seat body 30. The pressure sensors P4 to P6 acquire values of pressure from the occupant P seated on the seat body 30.

The respective pressure sensors P4 to P6 are provided in pairs, i.e., each located left and right, symmetric with respect to a laterally central position of the shopping cart seat 3.

To be more specific, the pressure sensors PS4 and the pressure sensors PS5 are located in positions, corresponding to the buttocks of an occupant P, of the seat bottom 3Q. The pressure sensors PS4 and the pressure sensors PS5 make up a third bottom sensor SC3 configured to measure pressure from the buttocks of the occupant P. The pressure sensors PS5 are located frontward of the pressure sensors PS4. It is to be understood that the third bottom sensor SC3 may only comprise either one pair of the pressure sensors PS3 or the pressure sensors PS4.

The pressure sensors PS6 are located under the thighs of the occupant P. The pressure sensors PS6 make up a fourth bottom sensor SC4 configured to determine values of pressure from the thighs of the occupant P. The pressure sensors PS6 are located frontward of the pressure sensors PS5.

The pressure sensors PS4 to PS6 are each configured, for example, as an element whose electrical resistance varies with external pressure applied thereto, wherein the larger the pressure value, the higher (or the lower, as the case may be) the voltage of the detection signal becomes.

The second control unit 3D is connected to the pressure sensors PS1 to PS3 and allowed to acquire pressure values from the respective pressure sensors PS4 to PS6. The second control unit 3D is configured to be capable of transmitting information detected by the respective pressure sensors PS4 to PS6 to the smartphone SP.

To be more specific, the second control unit 3D is connected to a near-field communication device 3C which enables near-field wireless communication, such as Bluetooth (registered trademark), Wi-Fi (registered trademark), etc. The second control unit 3D is configured to be capable of communicating with the smartphone SP via the near-field communication device 3C.

The first control unit 2C, the second control unit 3D and the smartphone SP each include a CPU, a ROM, a RAM, a rewritable nonvolatile memory, etc. (not shown), and are configured to execute pre-stored programs. The smartphone SP further includes a display DSP.

The smartphone SP is configured to be capable of communicating with the child safety seat 2 and the shopping cart seat 3. To be more specific, the smartphone SP has a function of acquiring a pressure value from each of the pressure sensors PS1 to PS3 via the first control unit 2C, and acquiring a pressure value from each of the pressure sensors PS4 to PS6 via the second control unit 3D. The smartphone SP has a seat app installed therein for providing games executable based on signals (pressure values) transmitted from the child safety seat 2 and the shopping cart seat 3.

The seat app in the present embodiment is configured to be capable of providing a 100-meter dash game to the occupant P. The 100-meter dash game is a game in which animated characters shown in the display DSP are caused to run a race based on pressure values transmitted from the child safety seat 2 or the shopping cart seat 3.

Figure 12:
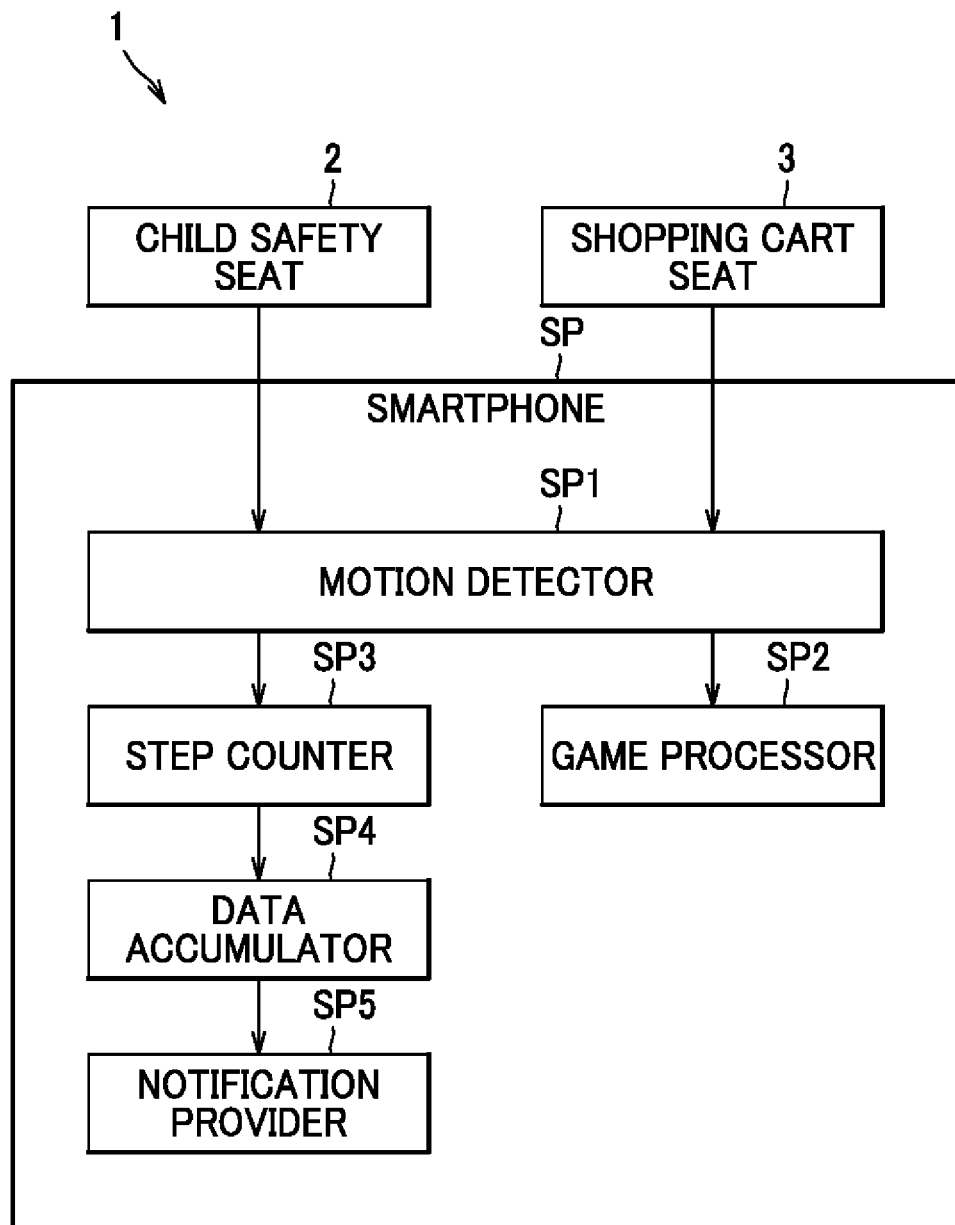
FIG. 12 is a block diagram for explaining a configuration of a mobile terminal.

As shown in FIG. 12, the smartphone SP comprises a motion detector SP1, a game processor SP2, a step counter SP3, a data accumulator SP4, and a notification provider SP5.

The motion detector SP1 has a function of acquiring a pressure value varying according to the motion of the occupant P from the child safety seat 2 and the shopping cart seat 3. The motion detector SP1 acquires a pressure value from the child safety seat 2 or the shopping cart seat 3, and outputs the acquired pressure value to the game processor SP2 and the step counter SP3.

The game processor SP2 has a function of executing the 100-meter dash game based on the pressure values. For example, when an occupant P seated on the child safety seat 2 plays the 100-meter dash game, the game processor SP2 acquires the pressure values $P3_R$, $P3_L$ of the right and left pressure sensors PS3 in the child safety seat 2. It is to be understood that the 100-meter dash game herein is executed in a manner essentially similar to that of which contents have been described above in detail with reference to FIG. 3, and thus a detailed description thereof will be omitted.

When the pressure values are acquired from the shopping cart seat 3, as well, the game processor SP2 executes the same process as described above. In the following description, the pressure value acquired from the child safety seat 2 is also referred to as "first pressure value", and the pressure value acquired from the shopping cart seat 3 is also referred to as "second pressure value".

Referring back to FIG. 12, the step counter SP3 is configured to be capable of computing as a first evaluation value a first step count that is an amount of exercise of the occupant P seated on the child safety seat 2 based on the first pressure value, and computing as a second evaluation value a second step count that is an amount of exercise of the occupant P seated on the shopping cart seat 3 based on the second pressure value. To be more specific, for example, the step counter SP3 counts the number of peaks Pm determined by the game processor SP2, and acquires it as the number of steps counted. The step counter SP3 outputs the number of steps as determined, to the data accumulator SP4.

The data accumulator SP4 has a function of accumulating, as integrated data, a first step count and a second step count outputted from the step counter SP3. To be more specific, the step counter SP3130 adds up the first step count and the second step count. In the present embodiment, accumulation of the number of steps in the data accumulator SP4 is renewed each day. In short, in the present embodiment, the total number of steps for each day is accumulated in the data accumulator SP4.

The notification provider SP5 has a function of notifying the occupant P of data accumulated in the data accumulator SP4. To be more specific, in the present embodiment, the notification provider SP5 shows the total number of steps accumulated in the data accumulator SP4 on the display DSP. The manner of notification by the notification provider SP5 is not limited thereto, and notification may be provided, for example, by voices/sounds, or the like.

Next, a detailed description will be given of operation of the smartphone SP (specifically, of the controller in the smartphone SP).

Figure 13:
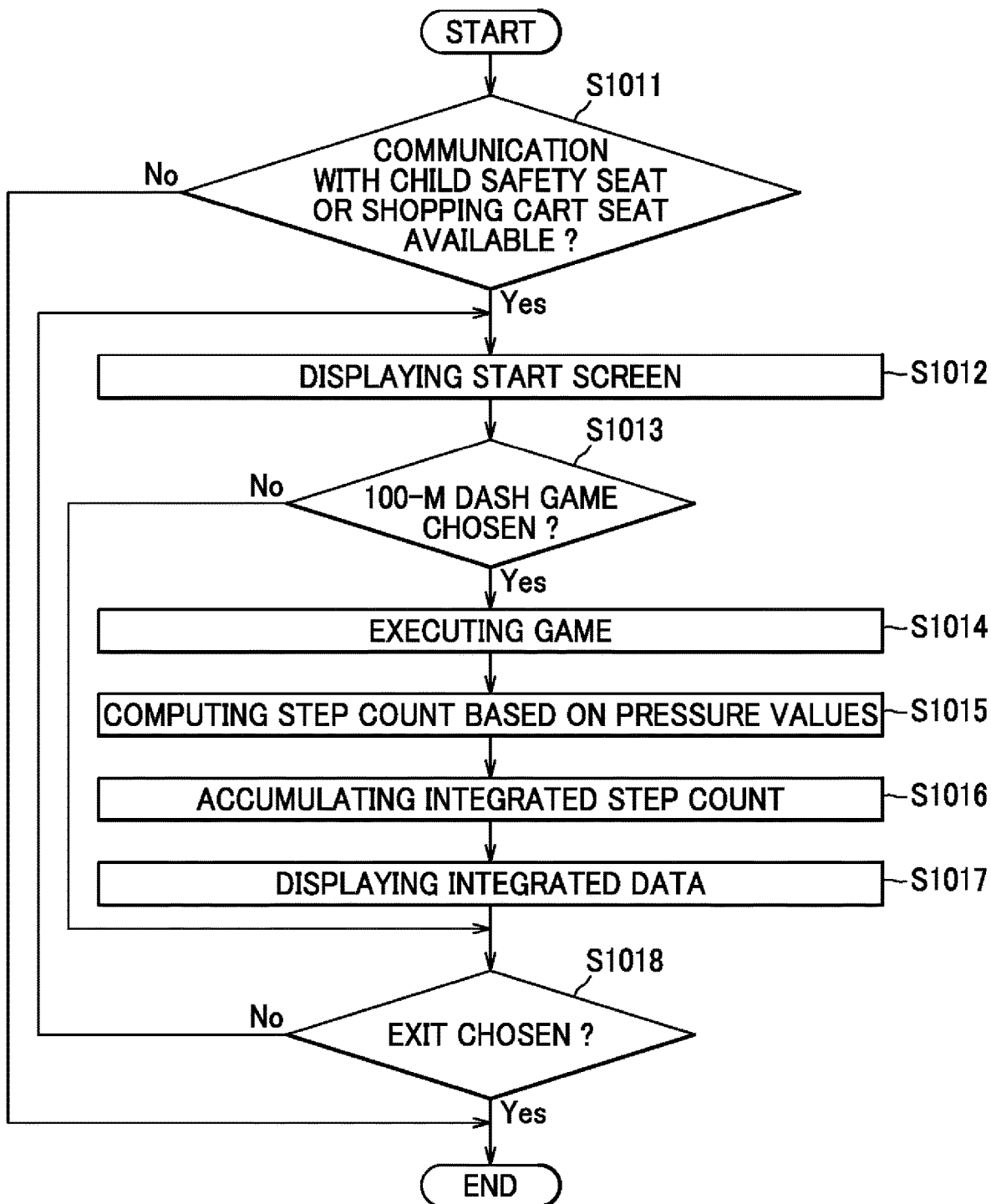
FIG. 13 is a flowchart showing a process in a smartphone.

When an occupant P launches a seat app, the smartphone SP starts a process shown in FIG. 13 (START). In this control process, the smartphone SP first makes a determination as to whether or not communication with the child safety seat 2 or the shopping cart seat 3 is available (S1011).

If it is determined in step S1011 that the communication is not available (No), then the smartphone SP brings the process to an end. If it is determined in step S1011 that the communication is available (Yes), then the smartphone SP shows a start screen for the 100-meter dash game (see FIG. 7) on the display DSP (S1012).

After step S1012, the smartphone SP makes a determination as to whether or not the 100-meter dash game has been chosen (S1013). If it is determined in step S1013 that the 100-meter dash game has been chosen (Yes), then the smartphone SP executes the 100-meter dash game (S1014).

After step S1014, more specifically, during the 100-meter dash game, the smartphone SP computes a step count based on the pressure values (S1015). After step S1015, more specifically, after completion of the 100-meter dash game, the smartphone SP adds up (integrates) the step count this time to the past step count that is the number of steps accumulated in the data accumulator SP4 (S1016).

After step S1016, the smartphone SP shows the integrated number of steps on the display DSP (S1017). After step S1017, the smartphone SP makes a determination as to whether or not the exit from the seat app has been chosen in the start screen (S1018).

If it is determined in step S1018 that the exit from the seat app has not been chosen (No), then the smartphone SP returns to the process in step S1012. If it is determined in step S1018 that the exit from the seat app has been chosen (Yes), then the smartphone SP brings the process to an end.

Next, a detailed description will be given of one specific example of operation of the smartphone SP.

As shown in FIG. 10, for example, when an occupant P (child) seated on the child safety seat 2 in the car CR going to a supermarket is allowed to launch the seat app of the smartphone SP for something enjoyable to keep him/her occupied, the process in FIG. 13 is started. If the smartphone SP is in a state where communication with the child safety seat 2 can be established (S1011: Yes), then a start screen for the 100-meter dash game is shown on the display DSP of the smartphone SP as shown in FIG. 7 (S1012).

In the start screen, a button B1 for starting the 100-meter dash game and a button B2 for exiting from the seat app are shown. If the occupant P chooses the button B1, the determination in step S1013 turns out to take the affirmative (Yes), and the 100-meter dash game is executed (S1014).

Figure 14:
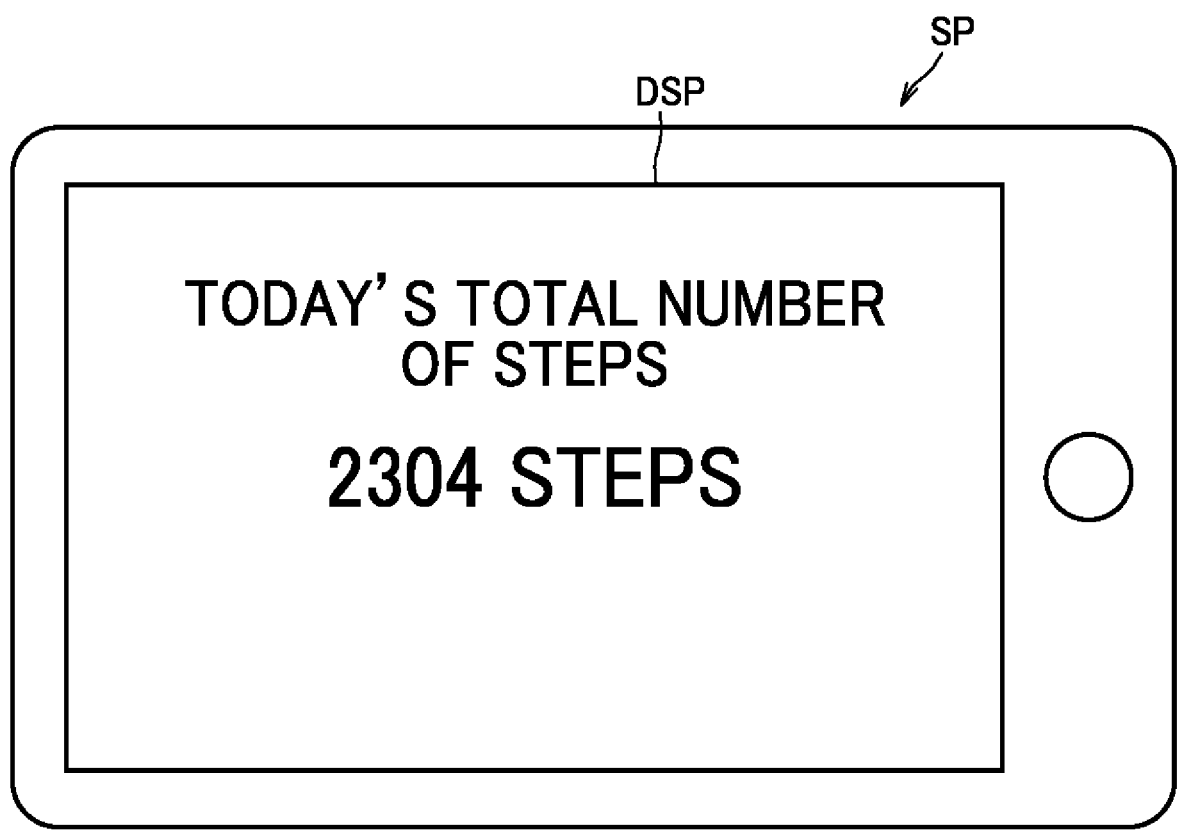
FIG. 14 is a diagram showing a screen displaying the total number of steps taken.

When the 100-meter dash game comes to an end, the smartphone SP computes and accumulates a step count for one round of the game in the data accumulator SP4 (S1015, S1016), and shows the total number of steps for this whole day accumulated in the data accumulator SP4 on the display DSP (S1017, see FIG. 14). If the occupant P in the car executes several rounds of the 100-meter dash game, the step count for one round of the game is recorded each time that round of the game comes to an end, and accumulated sequentially in the data accumulator SP4.

When the car CR arrives at the supermarket, and the occupant P chooses the exit button B2 in the start screen shown in FIG. 7, the smartphone SP brings the seat app to an end. During shopping in the supermarket, if the occupant seated on the shopping cart seat 3 of the shopping cart SHC is allowed to launch the seat app of the smartphone SP again for something enjoyable to keep him/her occupied, the process in FIG. 13 is started once again.

If the smartphone SP is in a state where communication with the shopping cart seat 3 can be established (S1011: Yes), then the start screen for the 100-meter dash game is shown on the display DSP of the smartphone SP as shown in FIG. 7 (S1012). Thereafter, as described above, each time the occupant P executes one round of the game, a step count for each round is sequentially accumulated in the data accumulator SP4. Therefore, the occupant P can be informed of the total number of steps as determined by adding up the step count in the car CR and the step count on the shopping cart SHC, so that information on how much exercise the occupant P has done can be made available at hand. Since the parents of the occupant P can also be informed of the number of steps (amount of exercise) for one day, a subsequent activity plan, food menu, etc. for the child can be determined with consideration given to the amount of exercise.

With the seat system 1 configured as described above according to the present embodiment, the following advantageous effects can be achieved.

Given the environment in which seats (2, 3) with pressure sensors included therein are placed in various locations, an occupant P seated on a predetermined seat can utilize information acquired in another seat.

Since the smartphone SP includes the data accumulator SP4, a server as will be described later is not necessitated, and the configuration of the seat system 1 can be simplified.

Since the step count as an indicator of an amount of exercise is used as an evaluation value, the occupant P can consult an integrated step count, and can grasp the physical state of the occupant P him/herself.

The second embodiment as described above may be modified where appropriate for practical application, as in the other embodiments which will be described below. In the following description, similar elements as in the above-described embodiment are designated by the same reference characters, and a description thereof will be omitted.

Figure 15:
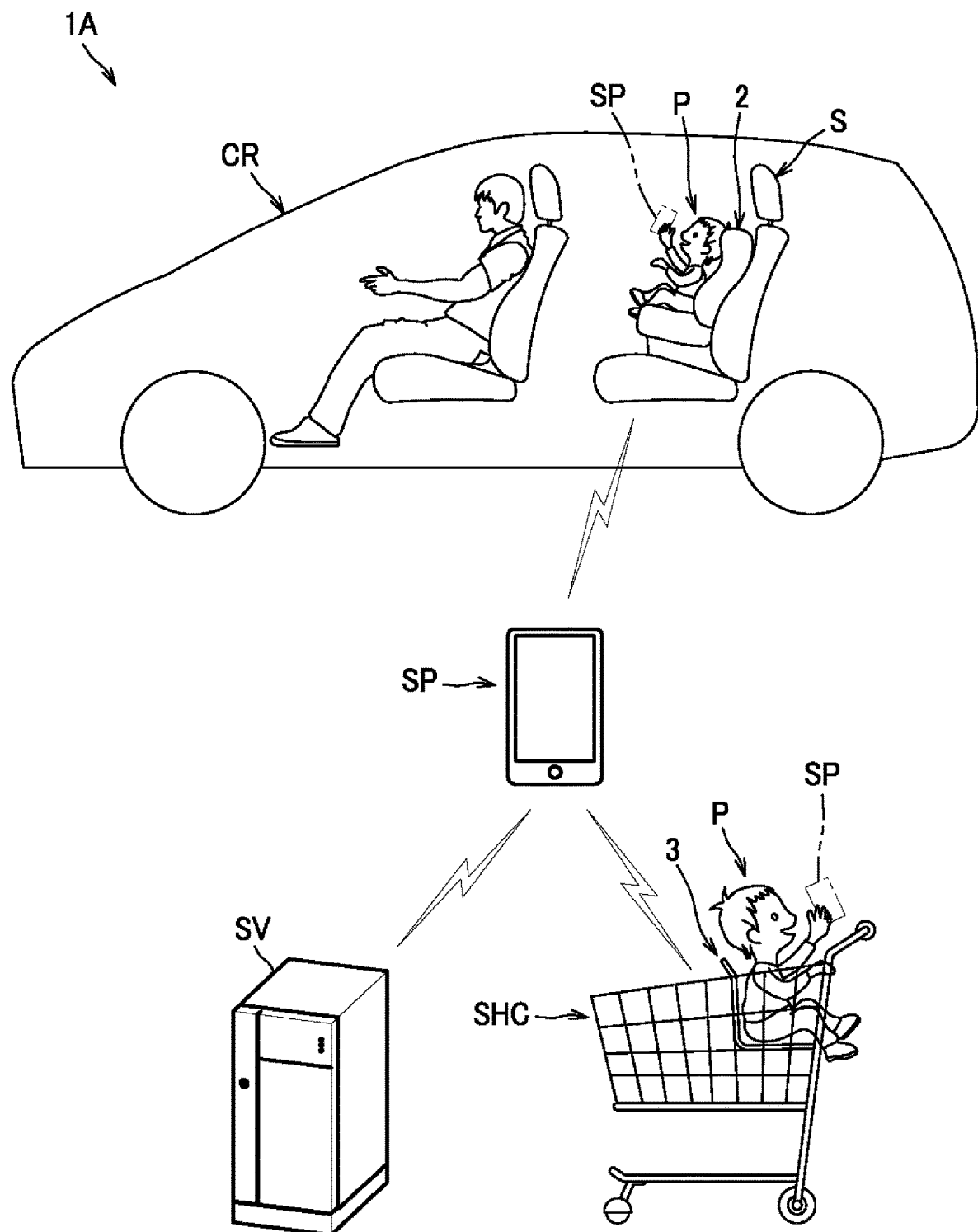
FIG. 15 is a diagram showing a seat system according to a first modified example.
Figure 16:
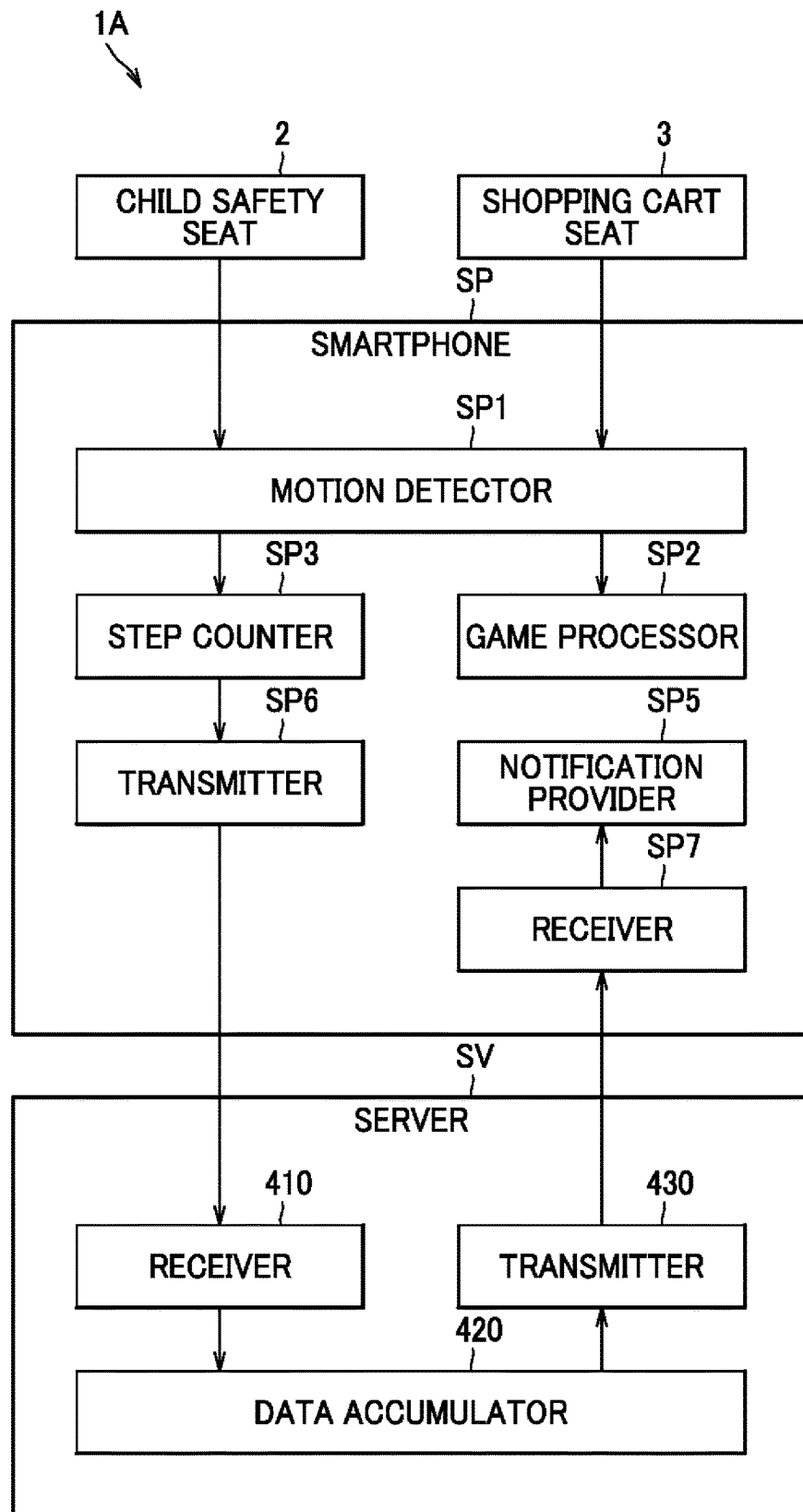
FIG. 16 is a block diagram for explaining a configuration of the seat system according to the first modified example.

In the above-described embodiment, the data accumulator SP4 is provided in the smartphone SP, but for example, as shown in FIGS. 15 and 16, a data accumulator 420 may be provided in a server SV capable of communicating with the smartphone SP. To be more specific, in the embodiment shown in FIG. 15, a seat system 1A comprises a server SV, in addition to the child safety seat 2, the shopping cart seat 3 and the smartphone SP described above.

As shown in FIG. 16, the smartphone SP includes a transmitter SP6 and a receiver SP7, instead of the data accumulator SP4 as in the above-described embodiment. The transmitter SP6 has a function of transmitting a step count for one round of the game computed in the step counter SP3, associated with identification information corresponding to the occupant P, to the server SV. The receiver SP7 has a function of receiving the total number of steps, as will be described below, transmitted from the server SV, and outputting the received total number of steps to the notification provider SP5. Accordingly, the smartphone SP is configured to acquire the data integrated in the server SV (of total number of steps) from the server SV, and notify the occupant P of the acquired data.

The server SV includes a receiver 410, a data accumulator 420, and a transmitter 430. The receiver 410 has a function of receiving a step count associated with identification information from the smartphone SP. Upon receipt of the step count associated with the identification information, the receiver 410 outputs the received step count together with the identification information to the data accumulator 420.

The data accumulator 420 has a function of adding up a step count acquired from the receiver 410 for each piece of identification information to accumulate the step count therein. The transmitter 430 has a function of transmitting to the smartphone SP the total step count corresponding to the occupant P as accumulated in the data accumulator 420.

Figure 17:
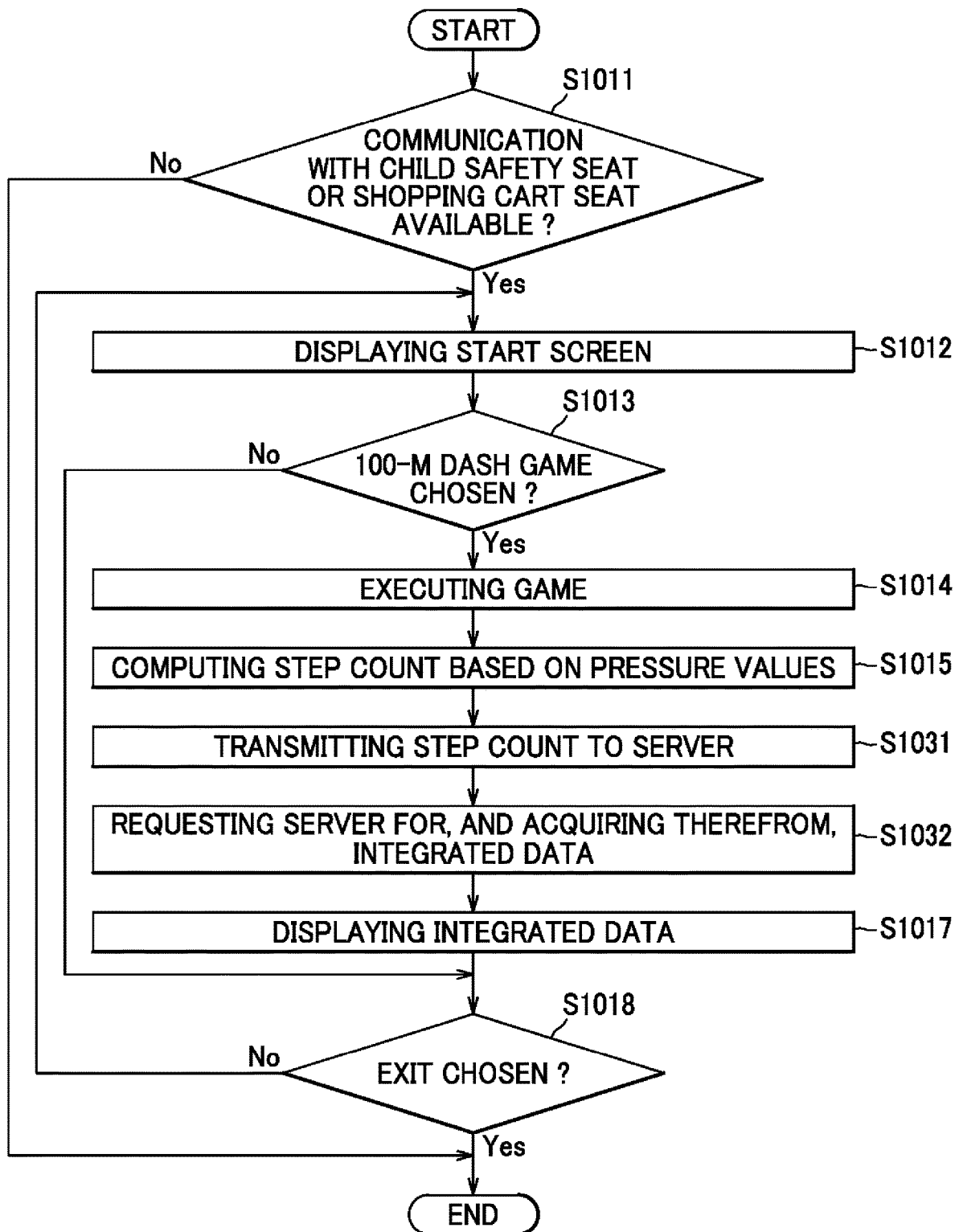
FIG. 17 is a flowchart showing a process in a smartphone according to the first modified example.
Figure 18:
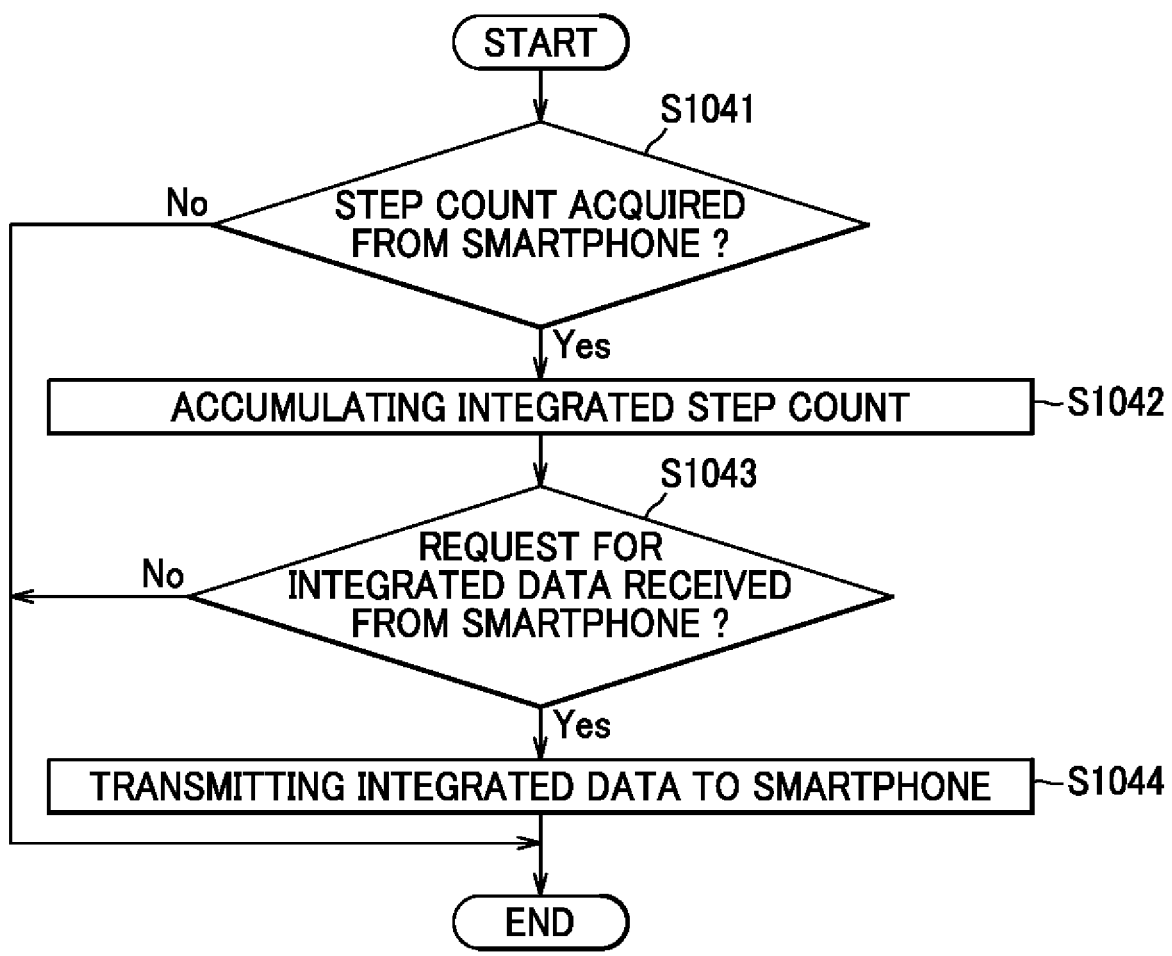
FIG. 18 is a flowchart showing a process in a server according to the first modified example.

In this embodiment, the smartphone SP is configured to execute the process shown in FIG. 17 and the server SV is configured to execute the process shown in FIG. 18. The process shown in FIG. 17 includes additional steps S1031 and S1032, instead of step S1016 included in the process shown in FIG. 13, and the other process steps are the same as the process steps of FIG. 13.

In the process shown in FIG. 17, the smartphone SP computes a step count in step S1015, and then transmits the computed step count to the server SV (S1031). After step S1031, the smartphone SP requests the server SV for and acquires therefrom the total step count as integrated data (S1032), and shows the acquired total step count on the display DSP (S1017).

As shown in FIG. 18, the server SV always makes a determination as to whether or not a step count has been acquired from the smartphone SP (S1041). If it is determined in step S1041 that no step count has been acquired (No), then the server SV brings the process to an end.

If it is determined in step S1041 that a step count has been acquired (Yes), then the server SV adds up (integrates) the acquired step count to the past step count accumulated in the data accumulator 420 (S1042). After step S1042, the server SV makes a determination as to whether or not a request for integrated data, i.e., the total step count has been received from the smartphone SP (S1043).

If it is determined in step S1043 that no request has been received (No), then the server SV brings the process to an end. If it is determined in step S1043 that a request has been received (Yes), then the server SV transmits the integrated total step count to the smartphone SP (S1044), and brings the process to an end.

With this embodiment configured as described above, the smartphone SP may not need to have the data accumulator provided therein, and the storage capacity of the smartphone SP can be freed accordingly.

Since notification of the total step count that is the number of steps integrated in the server SV is given to the occupant P through the smartphone SP, the occupant P can effectively utilize the total step count.

In the above-described embodiment, the total step count as integrated data is shown on the display DSP only; however, the integrated data may be utilized for various purposes, for example, an activity plan may be laid down based on the total step count.

Figure 19:
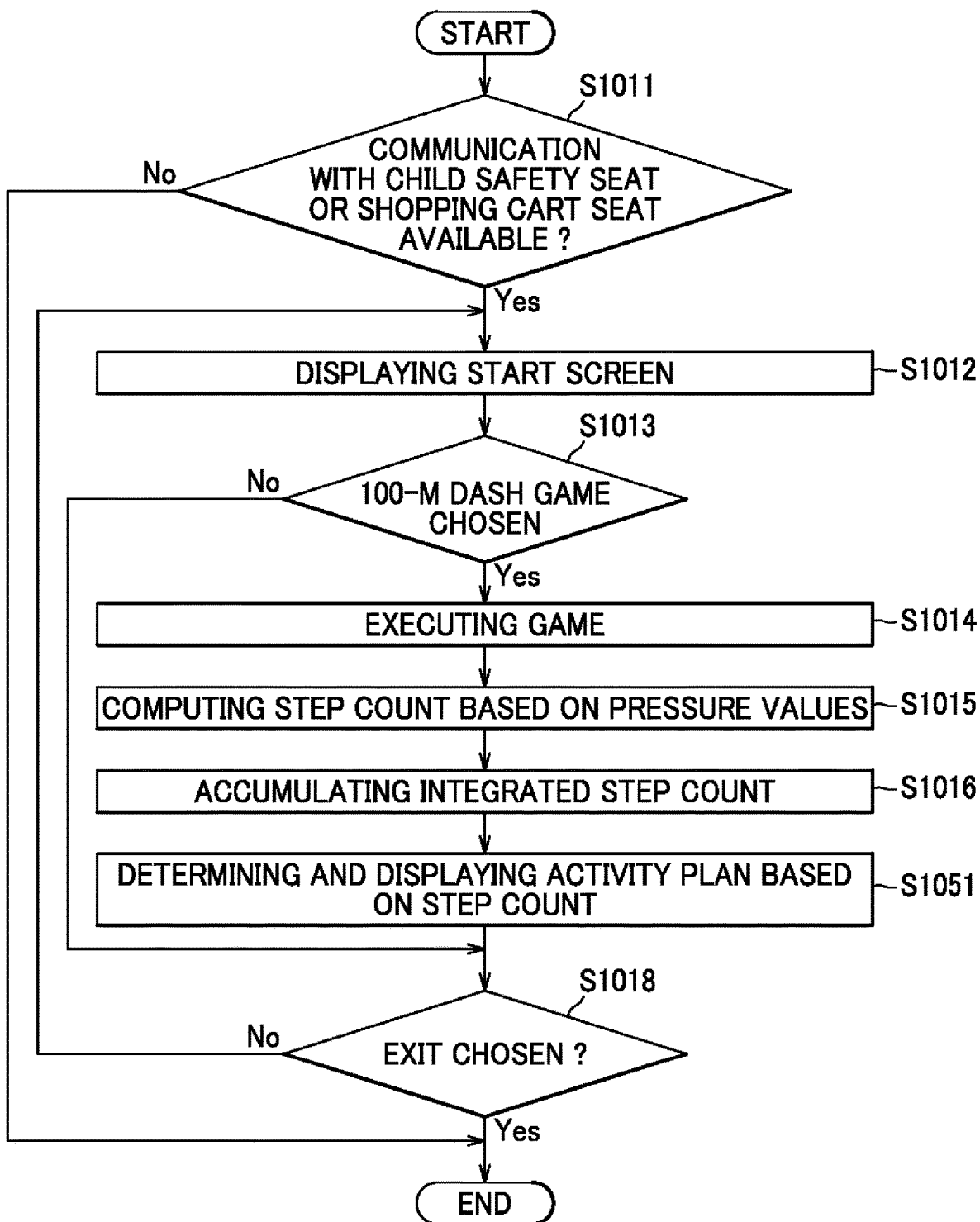
FIG. 19 is a flowchart showing a process in a smartphone according to a second modified example.

Specifically, the smartphone SP may be configured, for example, to execute the process shown in FIG. 19 in the seat system 1 shown in FIG. 10. The process shown in FIG. 19 includes an additional step S1051, instead of step S1017 in the process of FIG. 13, while the other process steps are the same as the process steps of FIG. 13.

In the process shown in FIG. 19, the smartphone SP integrates and accumulates the step count in the data accumulator SP4 (S1016), then determines an activity plan based on the integrated total step count, and shows the thus-determined activity plan on the display DSP (S1051). Hereupon, in this embodiment, the 100-meter dash game and a break (exit from seat app) are proposed as options of the activity plan.

Figure 20:
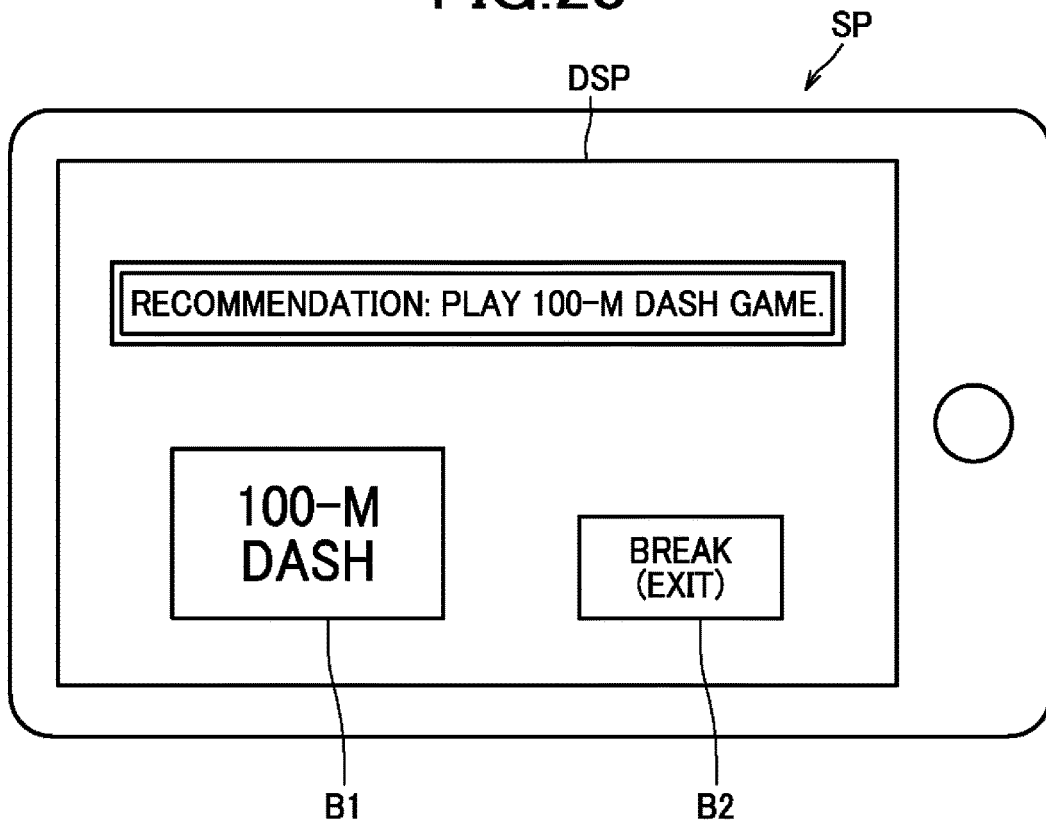
FIG. 20 is a diagram showing a start screen for presenting a 100-meter dash game according to the second modified example.

In step S1051, if the total step count is lower than a predetermined step count (e.g., 3,000 steps), the amount of exercise of the occupant P is insufficient, and thus the smartphone SP presents the activity plan for promoting exercise, that is the 100-meter dash game, as a recommended activity plan. To be more specific, as shown in FIG. 20, the smartphone SP shows, on the display DSP, a message of encouragement to play the 100-meter dash game, and the enlarged button B1 for executing the 100-meter dash game, with a size bigger than that of the button B2 for taking a break.

Figure 21:
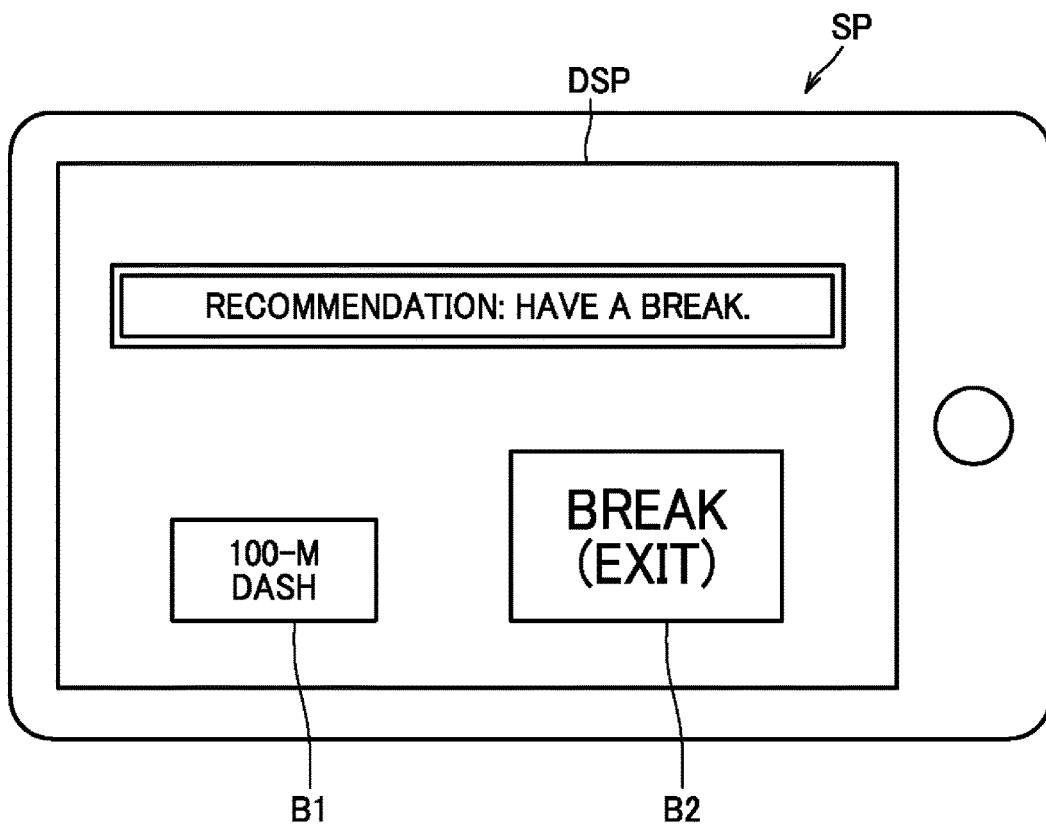
FIG. 21 is a diagram showing a start screen for proposing a break according to the second modified example.

In step S1051, if the total step count is equal to or higher than the predetermined step count, the occupant P tends to take too much exercise (game), and thus the smartphone SP presents the activity plan for taking a break, that is, exiting from the seat app, as the recommended activity plan. To be more specific, as shown in FIG. 21, the smartphone shows, on the display DSP, a message of encouragement to have a break, and the enlarged button B2 for taking a break, with a size bigger than that of the button B1 for executing the 100-meter dash game.

With this embodiment, an activity plan chosen based on the total step count (integrated data) is presented to the occupant P, so that the activity plan fit for the physical state of the occupant P can be presented to the occupant P. Furthermore, the parents of the occupant P may see the screen shown in FIG. 21, noticing that their child has been doing too much exercise (game), and have a chance of taking away the smartphone SP from the child.

In the above-described embodiment, the amount of exercise (step count) of the occupant P is adopted as the evaluation value (first evaluation value, second evaluation value) of the physical state of the occupant P; however, the evaluation value may be, for example, the body weight, sitting time, or the like. For example, if the evaluation value is the body weight, the smartphone SP may be configured to execute a body weight measurement app, specifically, the process shown in FIG. 22, in the seat system 1 shown in FIG. 10.

Figure 22:
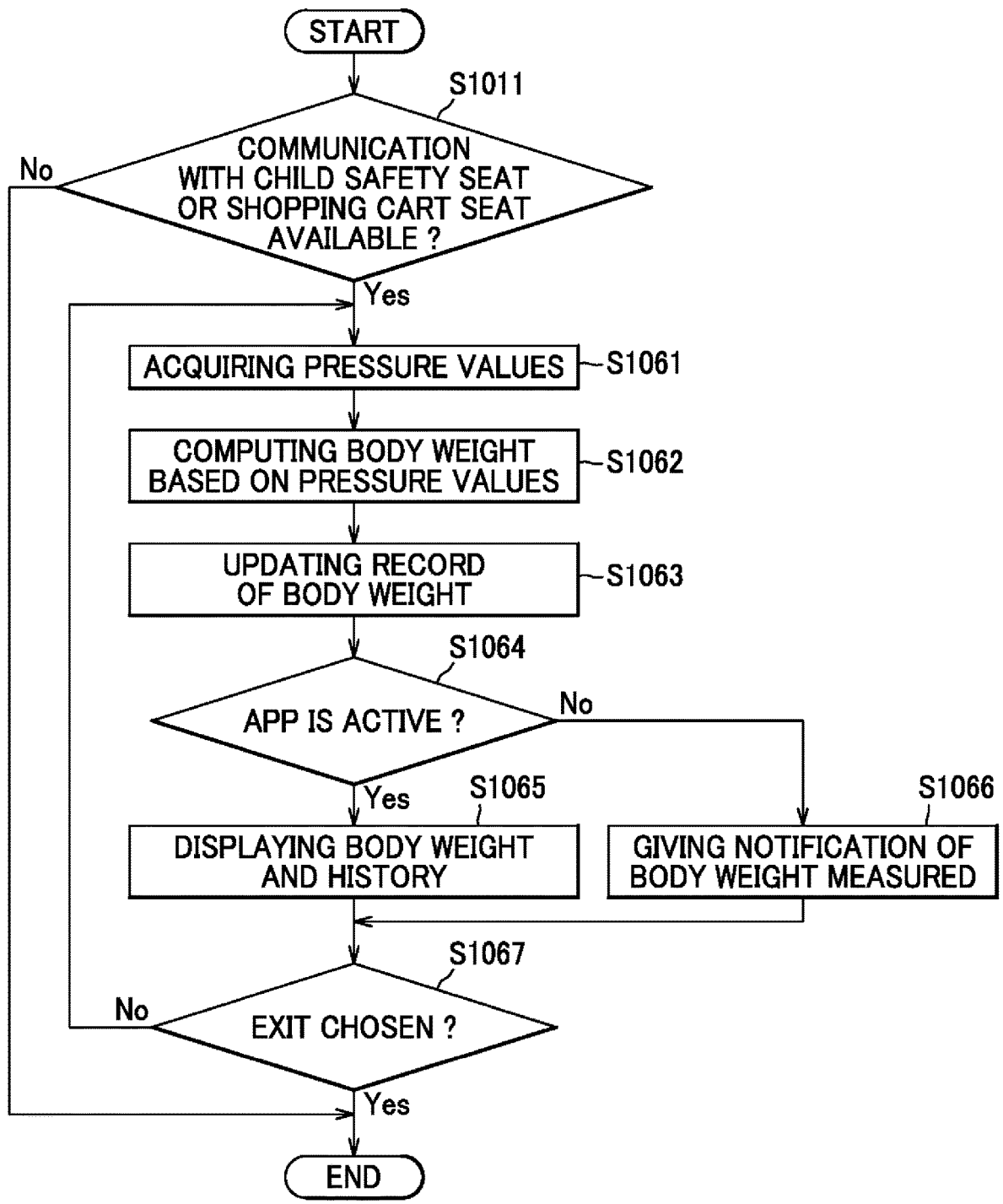
FIG. 22 is a flowchart showing a process in a smartphone according to a third modified example.

The process shown in FIG. 22 includes additional process steps S1061 to S1067, other than step S1011 of the process shown in FIG. 13. In the process shown in FIG. 22, if it is determined in step S1011 that communication is available (Yes), then the smartphone SP acquires pressure values from the child safety seat 2 or the shopping cart seat 3 (S61).

After step S61, the smartphone SP computes the body weight of the occupant P based on the pressure values (S1062). After step S1062, the smartphone SP updates the record of the body weight accumulated in the data accumulator SP4 (S1063). To be more specific, in step S1063, the smartphone SP accumulates data of the body weight measured this time associated with the date of record, together with the past data of the body weight and the date of record, in the data accumulator SP4. In other words, the smartphone SP does not integrate data by adding up a step count as in the above-described embodiment, but integrates data by recording each piece of data of the body weight and the date one by one.

Figure 23:
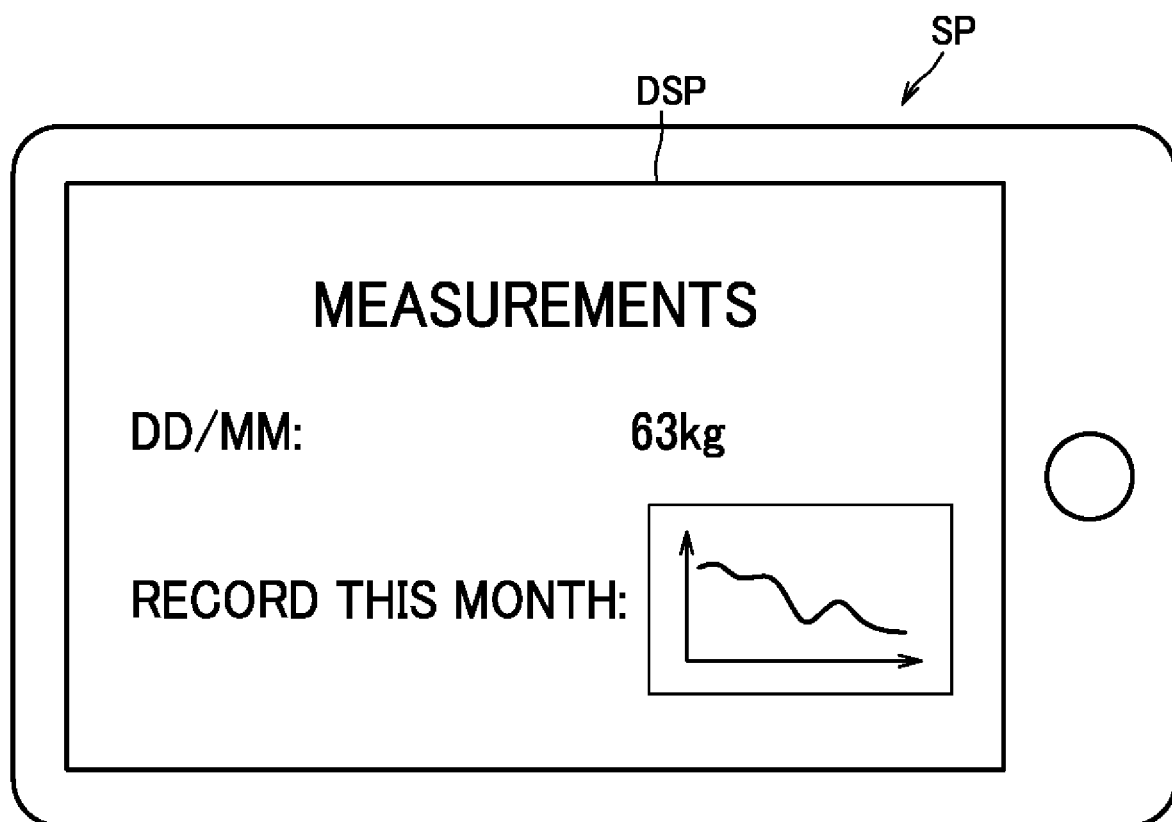
FIG. 23 is a diagram showing a weight measured this time and weights on record in the third modified example.

After step S1063, the smartphone SP makes a determination as to whether or not the app is in an active state (S1064). If the determination in step S1064 has confirmed its active state (Yes), then the smartphone SP shows the body weight measured this time and the history record of the body weights in the past (e.g., this month) in the app screen presented using the whole area of the display DSP, as shown in FIG. 23 (S1065).

Figure 24:
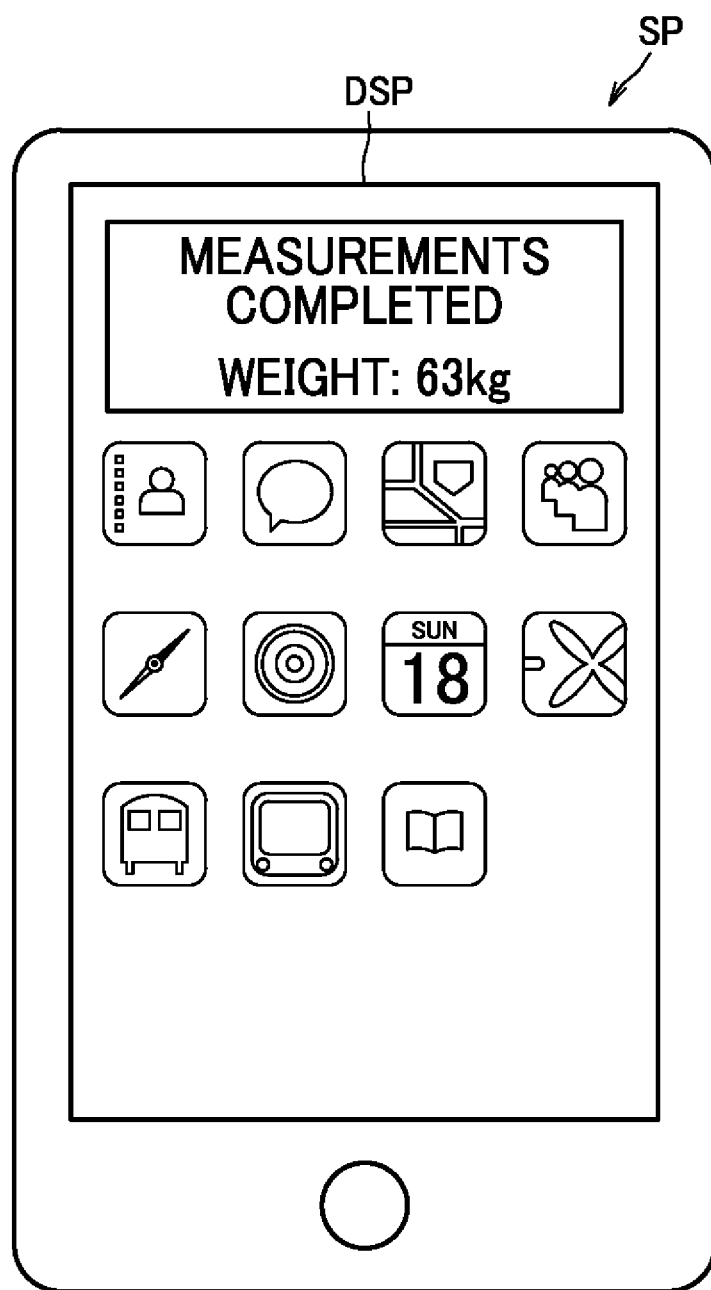
FIG. 24 is a diagram showing a home screen on which notification of a measured body weight is provided, in the third modified example.

If the determination in step S1064 has confirmed the state not active (No), then the smartphone SP gives notification of the body weight computed this time in the message frame displayed in part of the home screen as shown in FIG. 24 (S1066). After step S1065 or step S1066, the smartphone SP makes a determination as to whether or not the exit from the app has been chosen (S1067).

If it is determined in step S1067 that the exit has not been chosen (No), then the smartphone SP goes back to the process of step S61. If it is determined in step S1067 that the exit has been chosen (Yes), then the smartphone SP brings the process to an end.

According to this embodiment, the occupant P can be informed of the history of body weight (integrated data), so that the occupant P can achieve body weight control easily.

If the sitting time is adopted as an evaluation value, for example, advertisements, recommended apps, health care advices or the like can be presented to the occupant P, based on the sitting time. For example, if the sitting time is not shorter than the predetermined period of time, a determination is made that the throat is parched with thirst, and advertisements for drinks may be presented to the occupant P. It is to be understood that the sitting time may be computed as time elapsed since the pressure values become a predetermined threshold value or greater.

In the above-described embodiment, the pressure values are adopted as an example of first information and second information for detecting the physical state of an occupant; however, the first information and the second information may be electric current values corresponding to the body temperatures and/or the amounts of perspiration. The sensor may be a sensor capable of detecting such information. If the first information and the second information are, for example, electric current values corresponding to the amounts of perspiration, the evaluation values may be the amounts of perspiration computed from the electric current values, and data of the amounts of perspiration in the past and the present and the date of record may be accumulated as integrated data.

The number of seats which make up a seat system is not limited to two, but may be three or more. The seat may be a seat installed in a ship, an aircraft or other vehicles, or a chair or a seat placed at home or in public facilities, or a legless chair with a backrest (as used in a Japanese-style room), or the like.

In the above-described embodiment, the sensors are provided in the seat bottom only; however, the sensors may be provided in both of the seat bottom and the seat back, or in the seat back only.

In the above-described embodiment, the pressure sensors are adopted as a first sensor and a second sensor; however, the first sensor and the second sensor may be configured, for example, as photo-sensors, etc. In this alternative configuration, information as to whether or not light is detected by the photo-sensors may be used as the first information and the second information, and the step count or the like may be computed based on the thus-acquired first and second information.

In the above-described embodiment, the smartphone SP is adopted as an example of the mobile terminal; however, the mobile terminal may be any mobile terminal other than the smartphone SP, for example, a tablet, etc.

Third Embodiment

Next, a detailed description will be given of a third embodiment with reference made to the drawings where appropriate.

Figure 25:
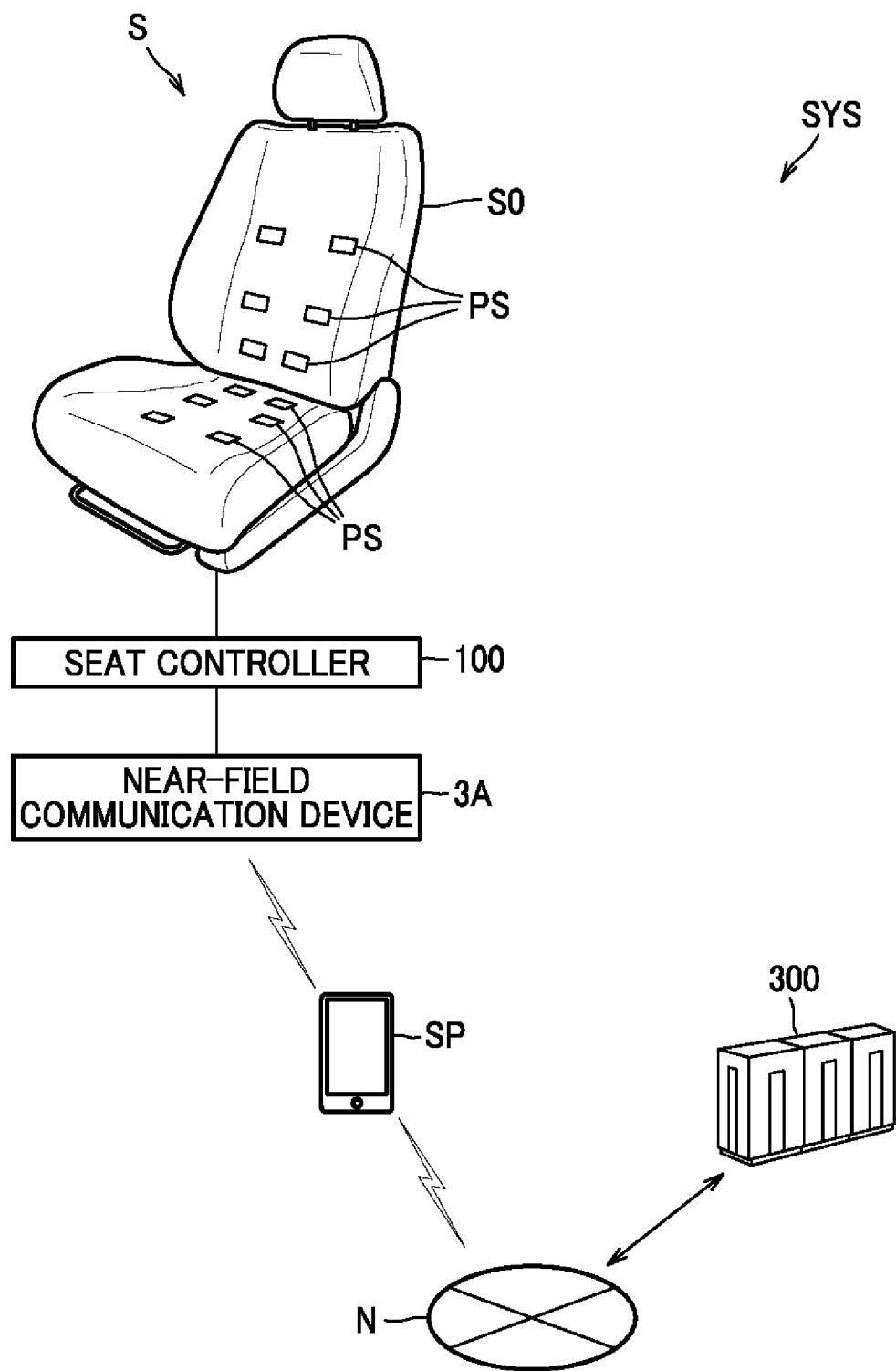
FIG. 25 is a diagram for explaining a general setup of an in-seat experience system according to a third embodiment.

As shown in FIG. 25, an in-seat experience system SYS of the present embodiment comprises a seat S, a seat controller 100, a smartphone SP as an example of an experience instruction device, and a server 300.

The seat S includes a seat body S0, pressure sensors PS (PS1 to PS6, see FIG. 27) as an example of a sensor provided in the seat body S0 and configured to acquire a measurement value for use in detecting motion of an occupant seated on the seat body S0, and a seat controller 100 connected to the pressure sensors PS and thereby allowed to acquire the measurement values from the pressure sensors PS.

The smartphone SP is connected to the seat controller 100 in a manner that allows the smartphone SP to communicate with seat controller 100 via a near-field communication protocol, configured to notify an occupant seated on the seat body S0 of a motion instruction, and to store user identification information for use in identifying the occupant.

Specifically, the smartphone SP is configured, for example, to be capable of providing a game to be played on the seat body S0 through execution of an application program (herein referred to "app") installed therein, and to notify an occupant of a motion instruction by means of images or/and voices/sounds during the game process. The smartphone SP is connected to the Internet N and thus capable of Internet communication with other devices outside.

The server 300 is connected to the Internet N, and capable of communicating with the smartphone SP through the Internet N.

Figure 26:
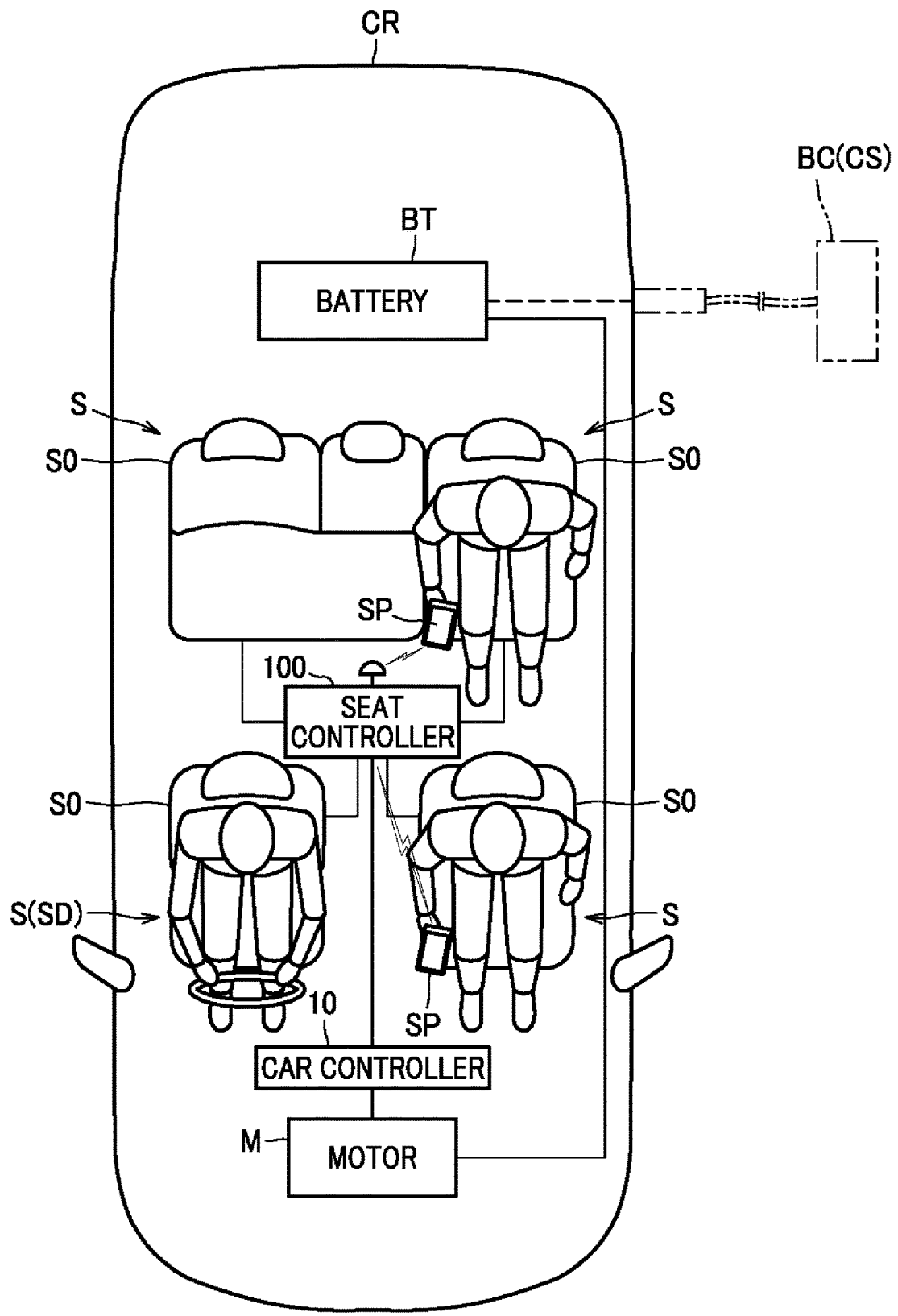
FIG. 26 is a diagram for explaining a general setup of a car according to an exemplified embodiment.

As shown in FIG. 26, the seat S according to the present embodiment is configured as a car seat installed in a car CR. The seat S includes a driver's seat SD on which a driver is to be seated. In the car CR, a plurality of seat bodies S0 are installed, and each of the seat bodies S0 is connected to a single seat controller 100. The car CR in the present embodiment includes a motor M as a driving source, a battery BT capable of supplying electric power to the motor M, seats S, smartphones SP which may be carried in the car CR and moved together with the car CR, and a car controller 10. It is to be understood that the car CR may be an electric car powered only by the motor M as a sole driving source, or a hybrid car having two or more driving sources including the motor M.

The car controller 10 includes a CPU, a ROM, a RAM, a rewritable nonvolatile memory, etc. (not shown), and is configured to execute pre-stored programs to control the car CR. The controller 10 has various kinds of information to be inputted to control the car CR, for example: information as to whether or not the car CR is running, information on the history record of recharging of the battery BT, information on the state of charge of the battery BT, and information on charging stations CS, if any, in which the battery BT has been recharged, etc. The charging station CS is a facility equipped with a battery charger BC capable of charging the battery BT; the information on charging stations CS may be acquired from the battery charger BC when the battery charger BC is connected to the battery BT, or may be acquired from location information of the charging station CS and the car CR. Information inputted to the car controller 10 is stored in a storage unit 19 (see FIG. 28).

In the present embodiment, the car CR is configured to be switchable in accordance with a driver's driving operation between a normal driving mode as an example of a first driving mode and an energy-efficient driving mode as an example of a second driving mode. The energy-efficient driving mode is a driving mode put in effect when a driver performs operations, e.g., depresses/releases the accelerator, or applies/releases the brake, in such a manner that power consumption in the battery BT is less than in the normal driving mode. The car controller 10 stores information on the driving mode that is being adopted, in the storage unit 19 (see FIG. 28).

Figure 27:
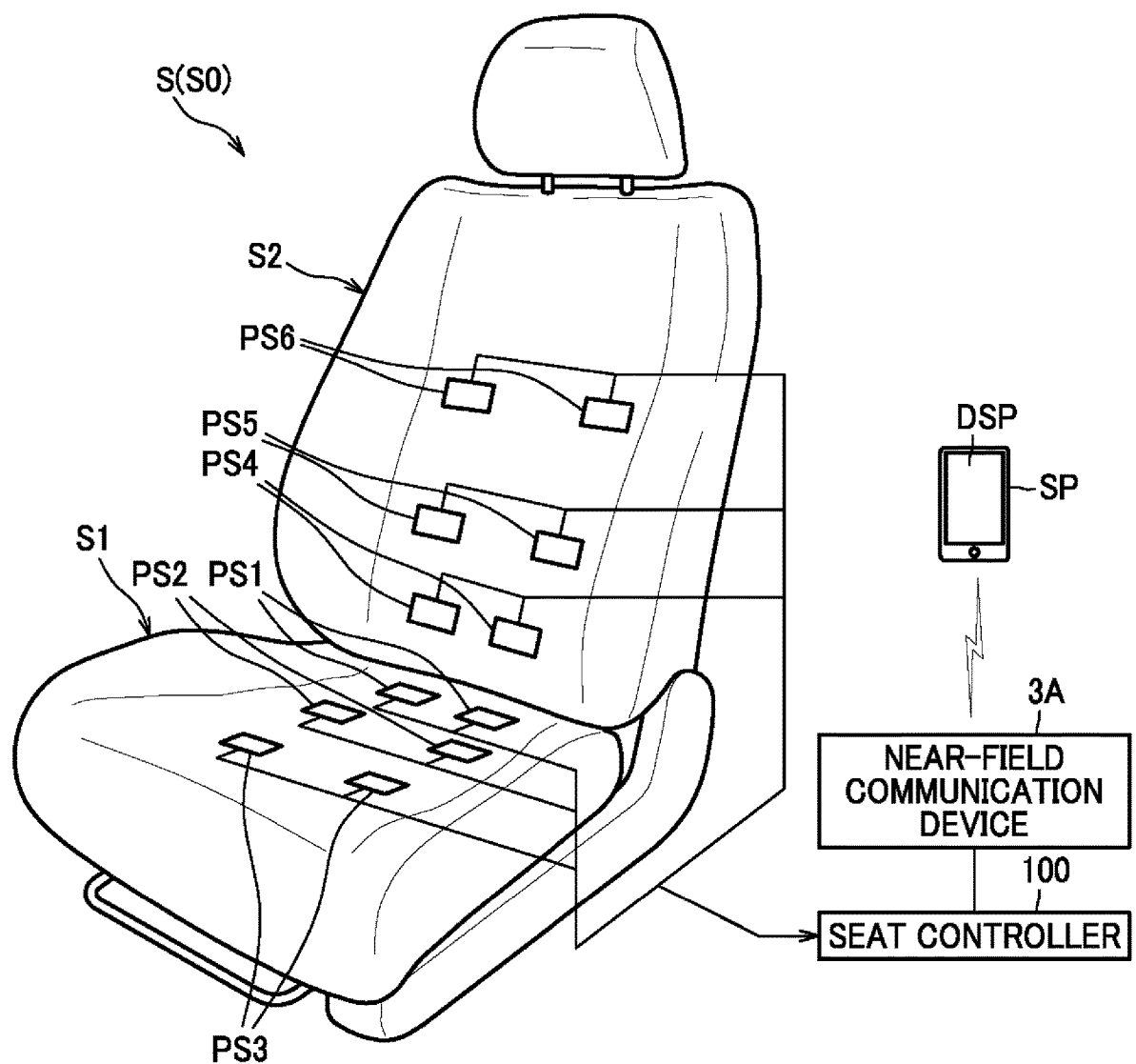
FIG. 27 is a diagram showing a configuration of a seat.

As shown in FIG. 27, the seat body S0 includes a seat bottom S1 and a seat back S2. The seat back S2 of each seat body S0 is supported rotatably frontward and rearward relative to the seat cushion S1 via a reclining mechanism (not shown). Accordingly, the seat body S0 is switchable to a reclining state in which the seat back S2 has been tilted back, and to a seating state in which the seat back S2 has been returned to an upright position for an occupant P to be seated thereon. For the driver's seat SD, the seating state corresponds to "driving state" that is a state suitable for a driver to take a posture for driving, while the reclining state correspondes to "non-driving state" in which at least part of the seat body S0 has been moved from a position thereof in the driving state. Herein, the reclining state (non-driving state) is a state in which the driver cannot perform driving operations, for example, such that the driver cannot reach the steering wheel.

Pressure sensors PS1 to PS3 are provided under an outer covering of the seat bottom S1, and pressure sensors PS4 to PS6 are provided under an outer covering of the seat back S2. The respective pressure sensors PS1 to PS6 are provided in pairs, each located left and right, symmetric with respect to a laterally central position of the seat body S0.

The pressure sensors PS1, PS2 are located in positions corresponding to the buttocks of an occupant in the seat bottom S1. To be more specific, the pressure sensors PS1 are provided in positions which correspond to the lowermost portions of ischial bones of the occupant and on which the load of the occupant is borne largest; the pressure sensors PS2 are located a little frontward of the pressure sensors PS1. The pressure sensors PS1, PS2 are configured to acquire measurement values of pressure (hereinafter referred to also as "pressure values") from the buttocks of the occupant.

The pressure sensors PS3 are located frontward of and distanced far from the pressure sensors PS1 and the pressure sensors PS2, specifically, in positions corresponding to the thighs of the occupant. The pressure sensors PS3 are configured to acquire measurement values of pressure from the thighs of the occupant.

The pressure sensors PS4, PS5 are located in a lower portion of the seat back S2. To be more specific, the pressure sensors PS4 are located in positions corresponding to the back of the lumbar region of the occupant; the pressure sensors PS5 are located in positions a little higher than the positions of the pressure sensors PS4. The pressure sensors PS4, PS5 are configured to acquire measurement values of pressure from the lumbar region of the occupant.

The pressure sensors PS6 are located above and distanced far from the pressure sensors PS4, PS5, specifically, in positions corresponding to an upper part of the back of the occupant. The pressure sensors PS6 are configured to acquire measurement values of pressure from the positions corresponding to the upper part of the back of the occupant.

Connected to the seat controller 100 is a near-field communication device 3A which enables near-field wireless communication, such as Bluetooth (registered trademark), Wi-Fi (registered trademark), etc. The seat controller 100 is configured to acquire pressure values from the pressure sensors PS1 to PS6 of each of the seat bodies S0 and transmit the same via the near-field communication device 3A to the smartphones SP.

The pressure sensors PS1 to PS6 are each configured, for example, as an element whose electrical resistance varies with external pressure applied thereto, wherein the larger the pressure value, the higher (or the lower, as the case may be) the voltage of the detection signal becomes. Accordingly, in practical applications, the magnitude of the pressure values are compared with reference made to the magnitude of the voltage values; however, for easy understanding, this specification is described as if comparison is made based on the magnitude of the pressure values.

Figure 28:
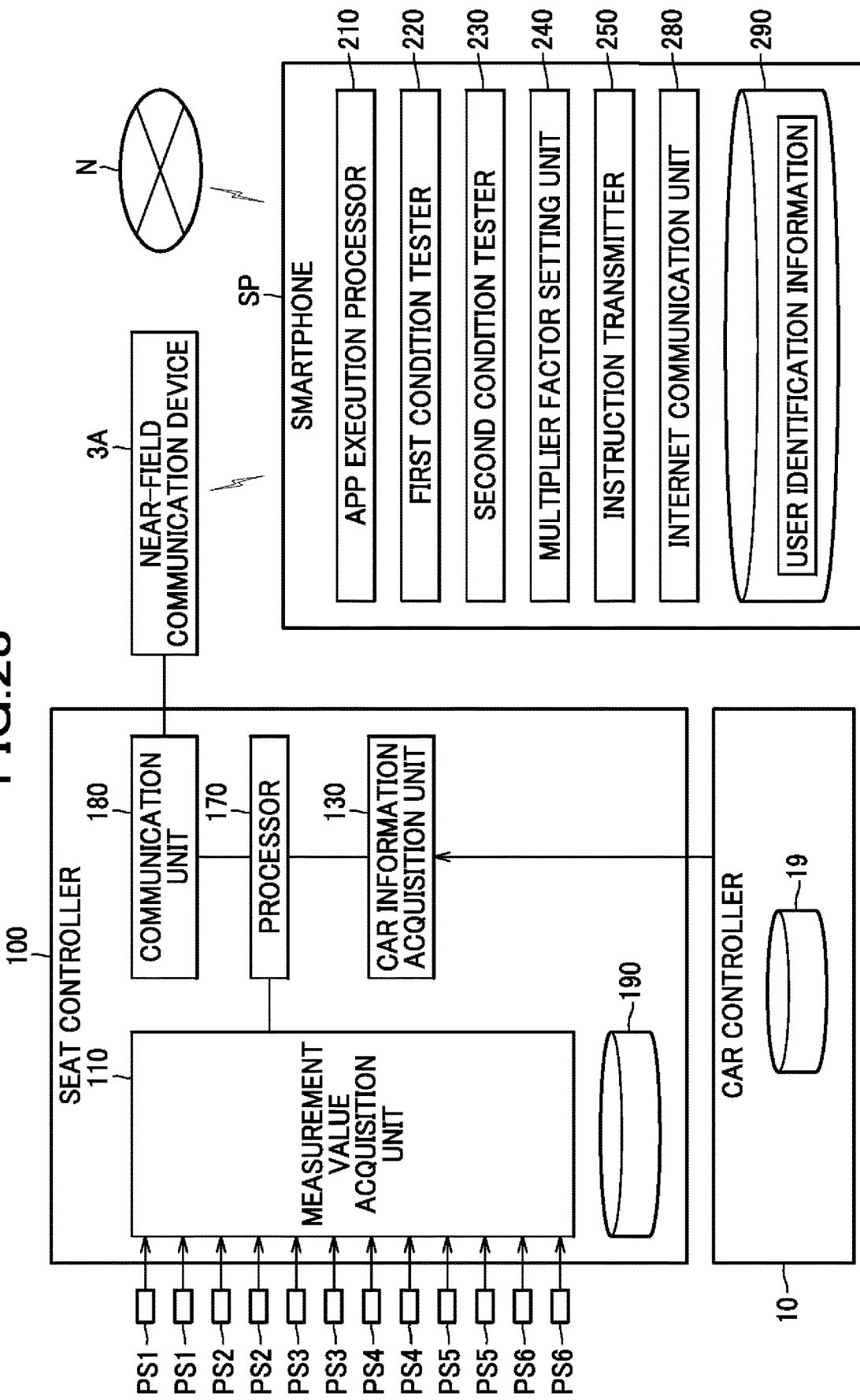
FIG. 28 is a block diagram for explaining configurations of a seat controller and a smartphone.

As shown in FIG. 28, the seat controller 100 comprises a measurement value acquisition unit 110, a car information acquisition unit 130, a processor 170, a communication unit 180, and a storage unit 190. The seat controller 100 includes a CPU, a ROM, a RAM, a rewritable nonvolatile memory, etc., which are not illustrated in the drawings; each functional unit is implemented through execution of pre-stored programs.

The measurement value acquisition unit 110 has a function of acquiring measurement values of pressure per given control cycle from the respective pressure sensors PS1 to PS6. The measurement values acquired by the measurement value acquisition unit 110 are stored in the storage unit 190 and used in the processor 170. The storage unit 190 is used to store data required for computation, processing, etc., on an as-appropriate basis.

The car information acquisition unit 130 has a function of acquiring information on the car CR from the car controller 10. In the present embodiment, the information on the car CR includes information as to whether or not the car CR is running, information on the history record of recharging of the battery BT, information on the state of charge of the battery BT, information on charging stations CS, information on driving modes, and so on. The information on the car CR acquired by the car information acquisition unit 130 is stored in the storage unit 190 and used in the processor 170.

The processor 170 subjects measurement values acquired by the measurement value acquisition unit 110 to analogue-to-digital conversion. The thus-digitized measurement values are transmitted via the communication unit 180 to the smartphone SP.

The smartphone SP comprises an app execution processor 210, a first condition tester 220, a second condition tester 230, a multiplier factor setting unit 240, and an instruction transmitter 250. The smartphone SP further comprises an internet communication unit 280 and a storage unit 290. The smartphone SP includes a CPU, a ROM, a RAM, a rewritable nonvolatile memory, etc., which are not illustrated in the drawings; each functional unit is implemented through execution of pre-stored programs. The smartphone SP has a near-field communication capability (not shown) and is thus capable of communicating with the seat controller 100. Furthermore, the smartphone SP can establish connection via the internet communication unit 280 to the Internet N, and is configured to be capable of communicating with the server 300 (see FIG. 25) based on predetermined communication settings.

The app execution processor 210 executes apps installed in the smartphone SP. Among apps, for example, the game app, once launched, executes the processing of the game until being exited. After the game ends, the smartphone SP causes the first condition tester 220 and the second condition tester 230 to make a determination as to whether to grant points based on conditions, and if the conditions for granting the points are satisfied, transmits to the server 300 an instruction to grant the points.

The game app installed in the smartphone SP, when executed in the app execution processor 210, provides a motion instruction via a display DSP (see FIG. 27) and a speaker (not shown) of the smartphone SP, to provide a game to an occupant. The motion instruction herein is not limited to any particular contents, and may include, for example: instructions to lift legs alternately, and to twist an upper body left or right, etc. The instruction may be provided at the beginning of the game by means of text characters or voices/sounds as guidance information, or may be shown on the display DSP at a specific time in the process of the game by means of an image indicating a body part to be moved.

In the present embodiment, as the contents, etc. of the game are not important, a simple example of a game is shown, in which an instruction to quickly lift legs alternately for 10 seconds is given and the number of steps (the number of times of lifting legs) for 10 seconds are counted for competition.

Figure 30:
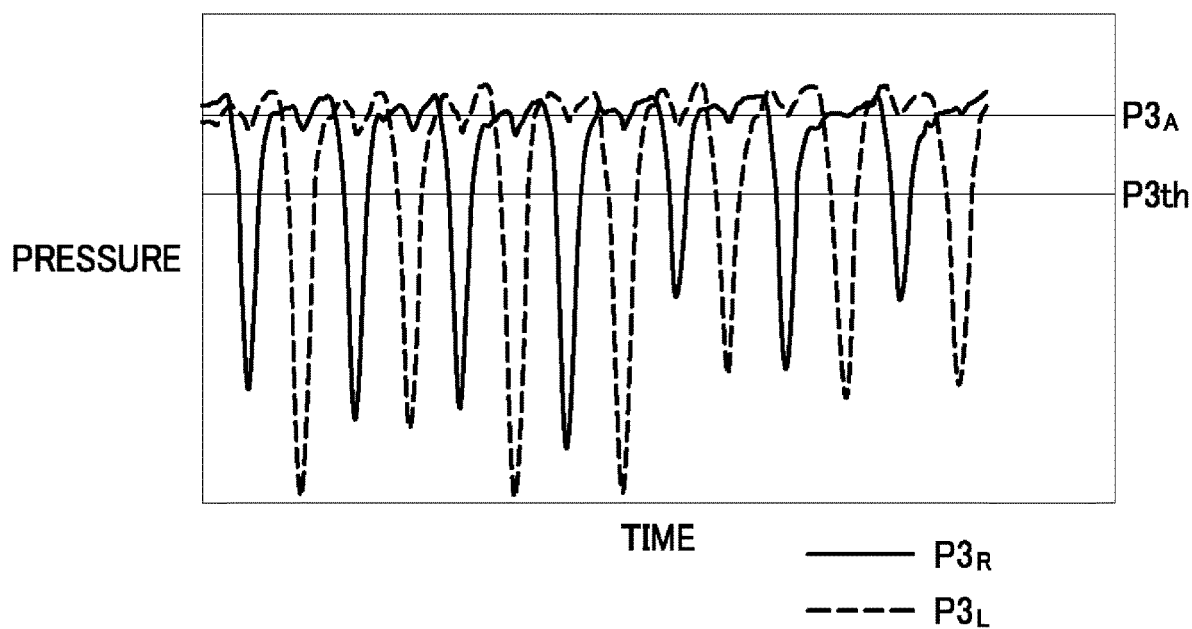
FIG. 30 is a graph showing change of pressure values acquired by pressure sensors when legs are lifted alternately.

FIG. 30 shows an example of measurement values of the pressure sensors PS3 acquired when an occupant lifts his/her legs alternately in the seat S. $P3_R$ indicates a pressure value of the right pressure sensor PS3, and $P3_L$ indicates a pressure value of the left pressure sensor PS3. As the measurement values represent, alternate lifting of the legs causes transitory drops of $P3_R$ and $P3_L$; therefore, peaks of $P3_R$ and $P3_L$ may be detected, so that a determination that one step is taken may be made when a peak is detected. Peak detection may be made, for example, in the following manner. A mean value $P3_A$ of $P3_R$ and $P3_L$ are calculated from measurement values acquired for that occupant when seated in the seat (before starting the competition of the game), and a threshold value P3th is set at a value reduced by a predetermined rate from the calculated mean value $P3_A$ as a preparation. The determination that the measurement value has reached a peak can be made at a time when $P3_R$ or $P3_L$ starts to increase after dropping below the threshold value P3th.

After the game app is launched, the app execution processor 210 provides a predetermined guide for the predetermined game by means of voices/sounds or an image, and notifies an occupant of a start of the competition with the voices/sounds and image signaling the start, while turning on a timer. After the timer starts counting up, the app execution processor 210 detects peaks for 10 seconds based on the pressure values received from the seat controller 100. Then, the number of steps, i.e., the number of peaks, is shown on the display DSP as "step count" that is the result of the game.

The first condition tester 220 makes a determination as to whether or not a first condition as a condition for granting points is satisfied, based on measurement values of the pressure sensors PS3. In the present embodiment, the first condition is that the step count as the result of the game is equal to or more than a predetermined step count (e.g., 40 steps or more). The first condition tester 220 causes the result of determination to be stored in the storage unit 190 as occasion arises.

The second condition tester 230 makes a determination as to whether or not a second condition different from the first condition is satisfied. In the present embodiment, the second condition is that a period of time during which motion of the occupant is smaller than a predetermined scale, as determined from the measurement values of the pressure sensors PS3, is equal to or longer than a predetermined period of time. To be more specific, this predetermined period of time is an accumulated period of time, and the second condition is that a criterial time period TJ determined as an accumulated period of time during which variations of the measurement values of the pressure sensors PS3 fall within a range narrower than a predetermined range is equal to or longer than the predetermined period of time (threshold value TJth).

Figure 31:
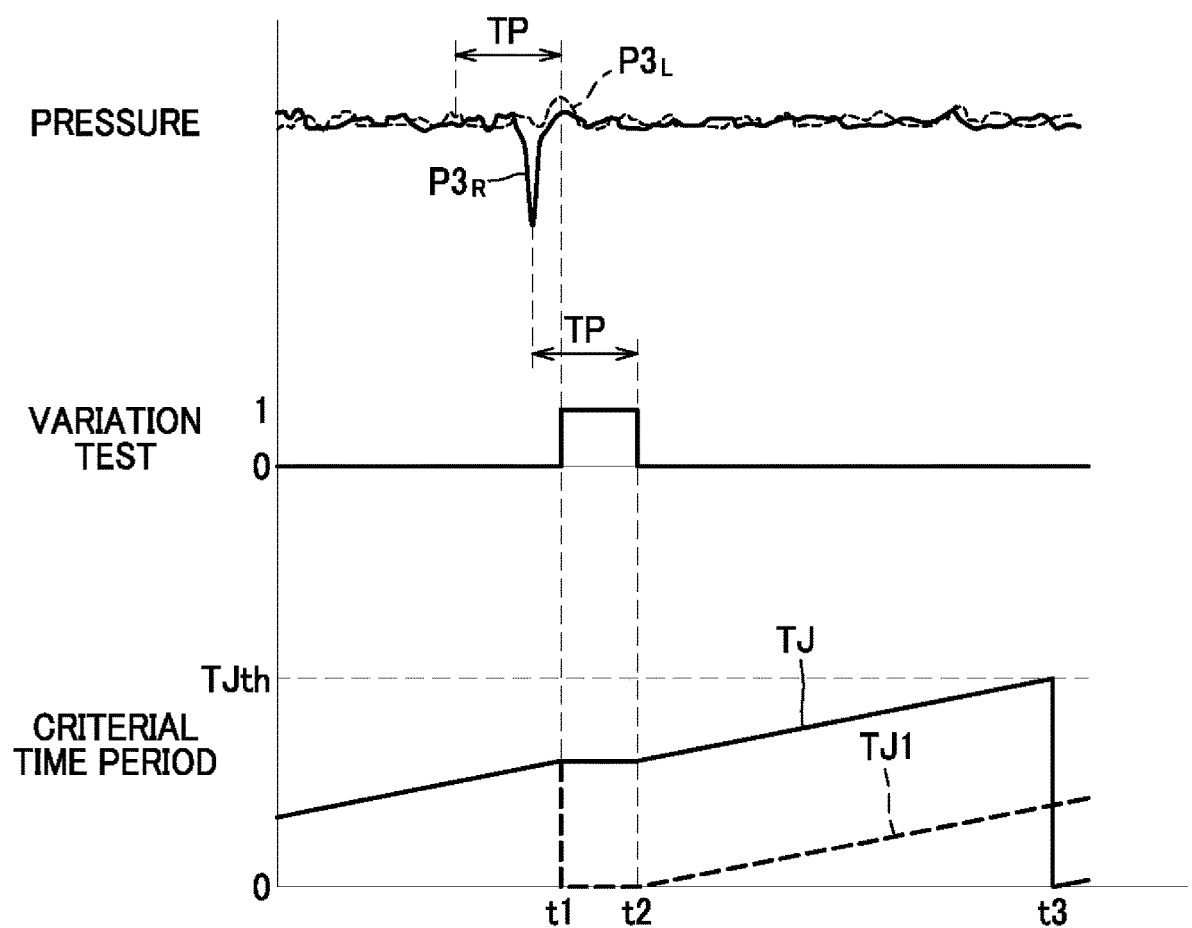
FIG. 31 is a timing diagram showing pressure values, results of determination on change of the pressure values, and times of determination made.

Determination of such variations can be made, for example, in the following manner. FIG. 31 is a timing diagram showing change of pressures $P3_R$ and $P3_L$ measured when an occupant is seated, a result of determination as to whether or not the variations are detected, and the criterial time period TJ. Whether or not the variations are detected can be determined by comparison made at a time of determination, i.e., for the immediately preceding time frame of a predetermined time period TP, of a difference between the maximum value and the minimum value of $P3_R$ and $P3_L$ with a predetermined value; if the difference is equal to or greater than the predetermined value, then it is determined that the variations are detected (the result evaluated as 1 in FIG. 31), while if the difference is smaller than the predetermined value, then it is determined that the variations are not detected (the result evaluated as 0 in FIG. 31). In the example shown in FIG. 31, at a time t1, the difference between the maximum value and the minimum value of $P3_R$ and $P3_L$ for the predetermined time period TP immediately preceding the time t1 becomes equal to or greater than the predetermined value, and the variation test result is set at 1; at a time t2, the difference between the maximum value and the minimum value of $P3_R$ and $P3_L$ for the predetermined time period TP immediately preceding the time t2 becomes smaller than the predetermined value, and the variation test result is set at 0.

The second condition tester 230 conducts this variation test, and if the variation test result shows 0, starts measuring a lapse of the criterial time period TJ, and if the variation test result shows 1, stops measuring a lapse of the criterial time period TJ. When the criterial time period TJ reaches the threshold value TJth, the second condition tester 230 makes a determination that the second condition is satisfied. After the server 300 grants points (increases point score), the second condition tester 230 resets the criterial time period TJ (t3).

The second condition tester 230 causes the variation test results and the determined criterial time period to be stored in the storage unit 290 as occasion arises.

The multiplier factor setting unit 240 sets a predetermined multiplier factor B by which a basic point score Pa is multiplied when points are granted in the server 300. To be more specific, the multiplier factor setting unit 240 makes the predetermined multiplier factor B greater if the battery BT has been recharged than if the battery BT has not been recharged. In the present embodiment, the multiplier factor setting unit 240 sets a multiplier factor B in the 1-to-1.5 range if the battery BT has not been recharged, and sets a multiplier factor B in the 2-to-3 range if the battery BT has been recharged. These specific values of the multiplier factor B in the present embodiment are each taken as an example only.

The multiplier factor setting unit 240 also changes the multiplier factor B in accordance with a type of a charging station CS in which the battery BT has been recharged. To be more specific, if the charging station CS is one other than a home charging station CS1 that is a charging station CS at a home of the user (including owner) of the car CR, i.e., external charging station CS2 located in a place other than his/her own home, the multiplier factor B is made greater than if the charging station CS is the home charging station CS1. In the present embodiment, the multiplier factor setting unit 240 is configured, by way of example, to set the multiplier factor B at 2 if the charging station CS is the home charging station CS1, and to set the multiplier factor B at 2.5 if the charging station CS is the external charging station CS2. In another example, the multiplier factor setting unit 240 is configured to set the multiplier factor B at 2.5 if the charging station CS is the home charging station CS1, and to set the multiplier factor B at 3 if the charging station CS is the external charging station CS2.

The multiplier factor setting unit 240 is configured such that if the battery BT has been recharged at the time of launching the game app, the multiplier factor B is made greater if the battery BT at the time of starting the recharging is in a state of charge equal to or greater than a first threshold value of the state of charge (e.g., 80%) than if the battery BT is in a state of charge smaller than the first threshold value of the state of charge. In the present embodiment, the multiplier factor setting unit 240 is configured to set the multiplier factor B at 2 if the state of charge is smaller than 80%, and to set the multiplier factor B at 2.5 if the state of charge is equal to or greater than 80%.

The multiplier factor setting unit 240 is configured such that if the car CR is running in the energy-efficient driving mode when the game app is launched, the multiplier factor B is made greater than if it is running in the normal driving mode. In the present embodiment, the multiplier factor setting unit 240 is configured to set the multiplier factor B at 1 if in the normal driving mode, and to set the multiplier factor B at 1.5 if in the energy-efficient driving mode.

When the first condition tester 220 and the second condition tester 230 determine that both of the first condition and the second condition are satisfied, the instruction transmitter 250 transmits to the server 300 an instruction to grant the points as a result of determination. When transmitting to the server 300 the instruction to grant the points, the instruction transmitter 250 also transmits user identification information for use in identifying users which is stored in the storage unit 290. The user identification information may be any unique user-identifiable data, without limitation, which may be in the form of simple numeric, alpha-numeric character string, e-mail address, telephone number, etc. When transmitting to the server 300 the instruction to grant the points, the instruction transmitter 250 also transmits information on the multiplier factor B set by the multiplier factor setting unit 240.

The instruction transmitter 250 transmits to the server 300 an instruction to grant bonus points on condition that the car CR has arrived at a charging station CS. To be more specific, the instruction transmitter 250 transmits to the server 300 an instruction to grant bonus points if a grantability determination flag F1 is 0 at a time of starting the charge of the battery BT at the charging station SC. After transmitting the instruction to grant the bonus points, the instruction transmitter 250 sets the grantability determination flag F1 at 1. The grantability determination flag F1 is, for example, reset at twelve o'clock midnight. In other words, the instruction transmitter 250 transmits to the server an instruction to grant bonus points only once a day when the car CR has arrived at a charging station CS and charging has been started.

In the present embodiment, the app execution processor 210 makes a determination, before executing an app chosen to be launched, as to whether or not the app shall be executed. Specifically, the app execution processor 210 is configured to prohibit a use of an app of which power consumption PW is equal to or greater than a power consumption threshold value PWth among apps executable on the smartphone SP, if the battery BT is in a state of charge equal to or smaller than a second threshold value of the state of charge (e.g., 30%). To be more specific, when the game app described above is chosen to be launched, if the battery BT is in a state of charge smaller than 30% and the power consumption PW of the game app is equal to or greater than the power consumption threshold value PWth, then the app execution processor 210 sets a properness determination flag F2 at 1, and prohibits the execution of the game app to prohibit its use.

The app execution processor 210 is also configured such that when the car CR is running, a use of an app which requires the driver's seat SD to be used in the reclining state, among apps executable on the smartphone SP, is prohibited. Such apps that require the driver's seat SD to be used in the reclining state include an app which prompts a driver to do stretching exercises, and the like. To be more specific, if such an app is chosen to be launched when the car CR is running, the app execution processor 210 sets the properness determination flag F2 at 1, and prohibits the execution of the app.

Conversely, the app execution processor 210 permits the use of apps which requires the driver's seat DS to be used in the reclining state, if the car CR is not running, e.g., when the battery BT is being recharged, or in like situations, by extension when the car CR is stopping for a time long enough. The app execution processor 210, when permitting the execution of an app, sets the properness determination flag F2 at 0, thereby allowing the app to start its operation.

Figure 29:
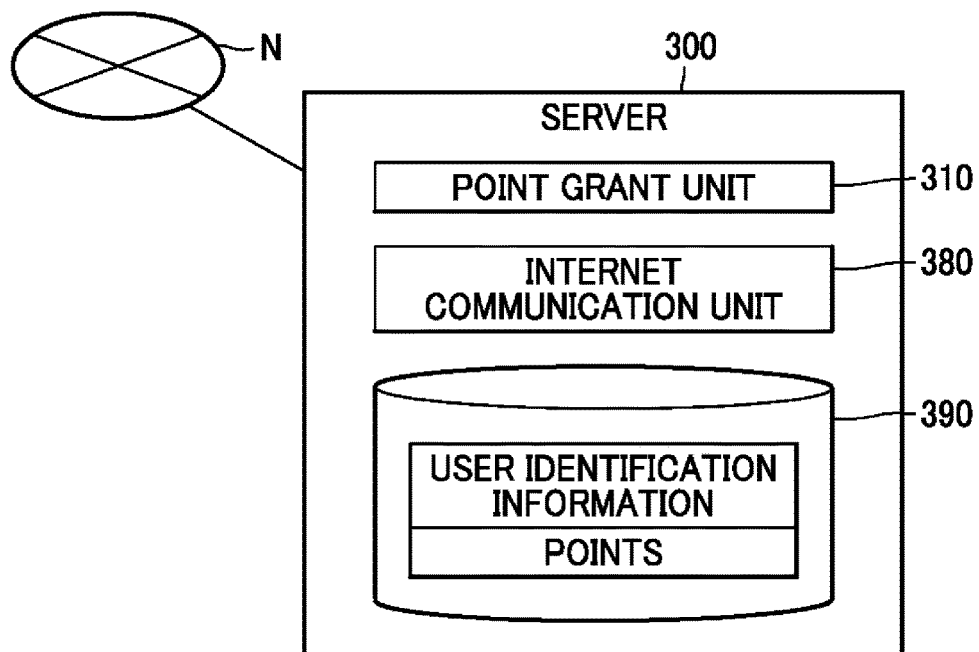
FIG. 29 is a block diagram for explaining a configuration of a server.

As shown in FIG. 29, the server 300 includes a point grant unit 310, an internet communication unit 380, and a storage unit 390. The server 300 is connected via the internet communication unit 380 to the Internet N, and capable of communicating with the smartphone SP via the Internet N. The storage unit 390 stores data necessary for operation of the server 300 on an as-appropriate basis, and also stores points associated with user identification information (the point score for each user specified by the corresponding user identification information).

Upon receipt of an instruction to grant points from the smartphone SP, the point grant unit 310 increases, in a predetermined increment, a point score corresponding to specific user identification information included in the instruction to grant the points.

The event that the server 300 receives an instruction to grant points takes place when the first condition is satisfied and the second condition is satisfied at the same time. The server 300 is allowed to add a point score obtained by multiplying a basic point score Pa based on the instruction to grant points by a multiplier factor B to and increase a point score stored for the corresponding user identification information on condition (necessary condition) that the result of the determination that at least the first condition is satisfied (instruction to grant points) is received from the smartphone SP. The basic point score Pa may be a fixed value, or may vary according to times, seasons, user types, etc. The basic point Pa based on the instruction to grant points means that the basic point score Pa may be a value varying according to information, such as the type of game app executed (category of game played), its difficulty level, etc., included in the instruction to grant points. The server 30 is configured to increase the point score if the first condition is satisfied and the second condition is satisfied at the same time (i.e., when the instruction to grant points is received), but not allowed to increase the point score if the first condition is satisfied but the second condition is not satisfied.

The server 300 is configured to add a predetermined bonus point score Pb to and increase the point score stored for corresponding user identification information on condition that the car CR has arrived at a charging station CS. To be more specific, upon receipt of an instruction to grant bonus points, the server 300 adds a bonus point score Pb to the point score stored for corresponding user identification information. The bonus point score Pb may be a fixed value, or may vary according to times, seasons, types of the charging station CS, distances traveled to the charging station CS, user types, etc.

When the point score stored for the corresponding user identification information is increased, the point grant unit 310 transmits to the smartphone SP a message signal to that effect.

A description will be given of a general operation of the in-seat experience system SYS configured as described above with reference to the flowchart of FIGS. 32 to 34.

Figure 32:
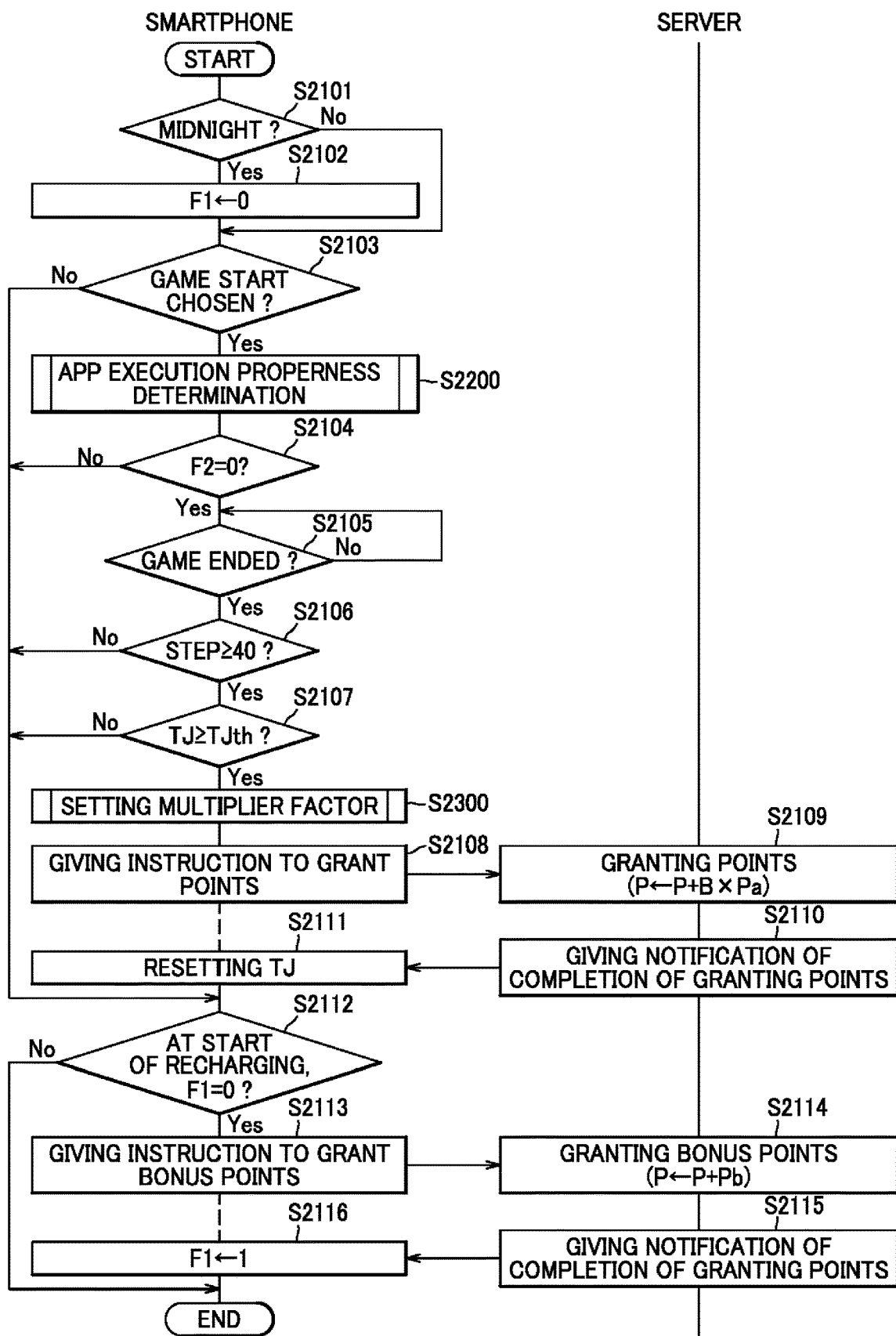
FIG. 32 is a flowchart showing processes in a smartphone and a server.

As shown in FIG. 32, when the time is twelve o'clock midnight (S2101, Yes), the smartphone SP resets the grantability determination flag F1 to 0 (S2102). The smartphone SP makes a determination as to whether or not a game app start option has been chosen by a user (S2103). If the game app start option has not been chosen (S2103, No), then the process goes to step S2112.

Figure 33:
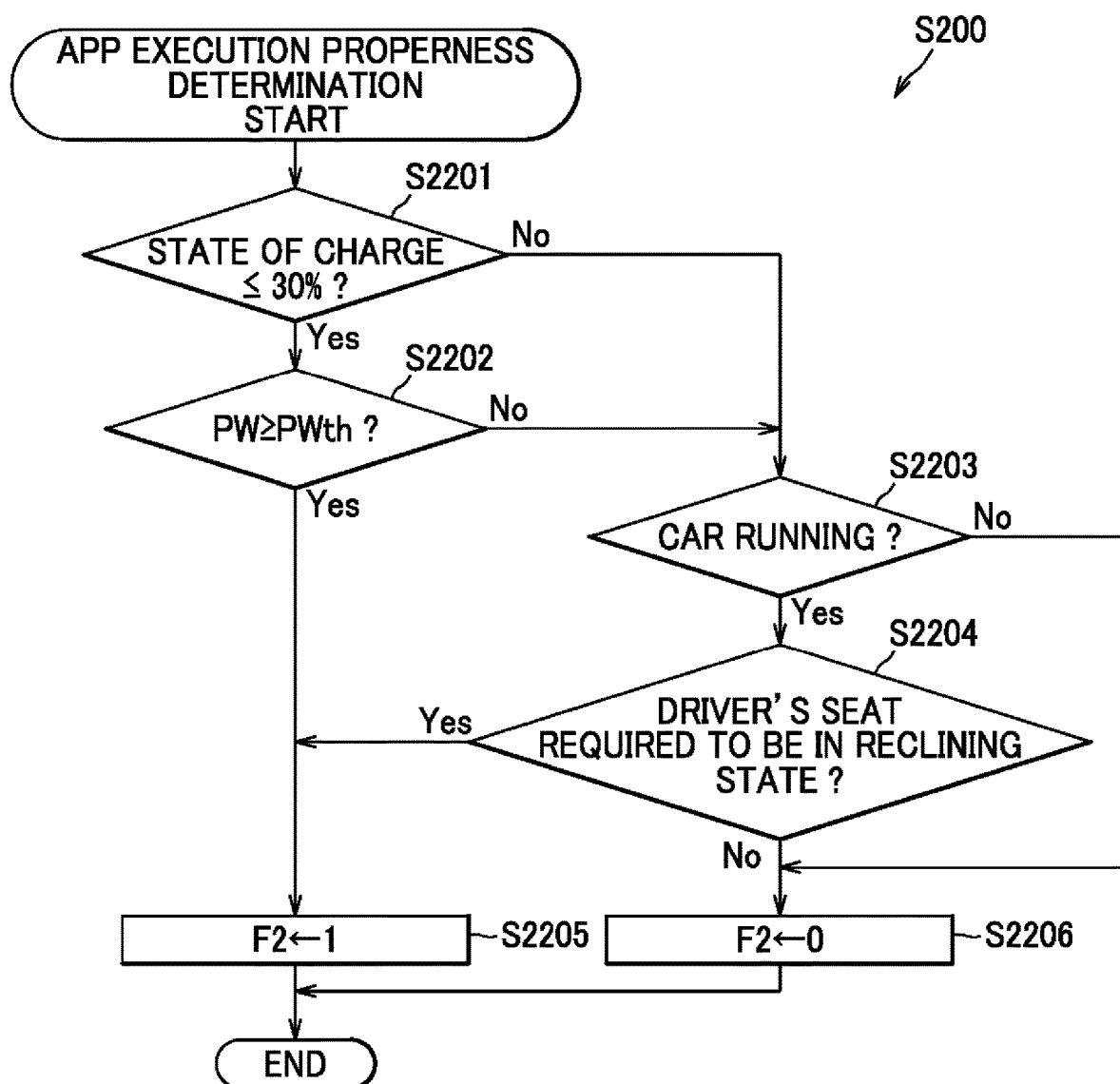
FIG. 33 is a flowchart showing a process of determination as to whether app is executable or not.

If the game app start option has been chosen (S2103, Yes), then the smartphone SP makes a determination as to whether or not execution of the game app is proper (S2200). As shown in FIG. 33, in the process of this app execution properness determination, the smartphone SP makes a determination as to whether or not the battery BT is in a state of charge equal to or smaller than 30% (S2201). If the state of charge is equal to or smaller than 30% (S2201, Yes), then the smartphone SP makes a determination as to whether or not the power consumption PW of the game app is equal to or greater than the power consumption threshold value PWth (S2202). If the power consumption PW of the game app is equal to or greater than the power consumption threshold value PWth (S2202, Yes), then the smartphone SP sets the properness determination flag F2 at 1 indicative of prohibition of execution of the game app (S2205), and brings the app execution properness determination process to an end.

If it is determined in step S2201 that the state of charge is greater than 30% (S2201, No), or if it is determined in step S2202 that the power consumption PW is smaller than the power consumption threshold value PWth (S2202, No), then the smartphone SP makes a determination as to whether or not the car CR is running (S2203). If the car CR is running (S2203, Yes), then the smartphone SP makes a determination as to whether or not the game app is an app which requires the driver's seat SD to be used in the reclining state (S2204). If the app requires the driver's seat SD to be used in the reclining state (S2204, Yes), then the smartphone SP sets the properness determination flag F2 at 1 (S2205), and brings the app execution properness determination process to an end.

If it is determined in step S2203 that the car CR is not running (S2203, No), or if it is determined in step S2204 that the app does not require the driver's seat SD to be used in the reclining state (S2204, No), then the smartphone SP sets the properness determination flag F2 at 0 (S2206), and brings the app execution properness determination process to an end.

Referring back to FIG. 32, the smartphone SP makes a determination as to whether or not the properness determination flag F2 is 0 (S2104). If the properness determination flag F2 is not 0 (i.e., F2=1) (S2104, No), then the smartphone SP does not start the game app, and proceeds to step S2112. If the properness determination flag F2 is 0 (S2104, Yes), then the smartphone SP starts the game app. Accordingly, the smartphone SP starts the process of the leg-lift exercise game as described above.

When the game comes to an end (S2105, Yes), the smartphone SP makes a determination as to whether or not the step count is equal to or more than 40 (whether or not the first condition is satisfied) (S2106). If the step count is less than 40 (S2106, No), then the process goes to step S2112. If the step count is equal to or greater than 40 (S2106, Yes), then the smartphone SP makes a determination as to whether or not the criterial time period TJ is equal to or greater than the threshold value TJth (S2107). If the criterial time period TJ is smaller than the threshold value TJth (S2107, No), then the process goes to step S2112. If the criterial time period TJ is equal to or greater than the threshold value TJth (S2107, Yes), then the smartphone SP proceeds to set a multiplier factor B (S2300).

Figure 34:
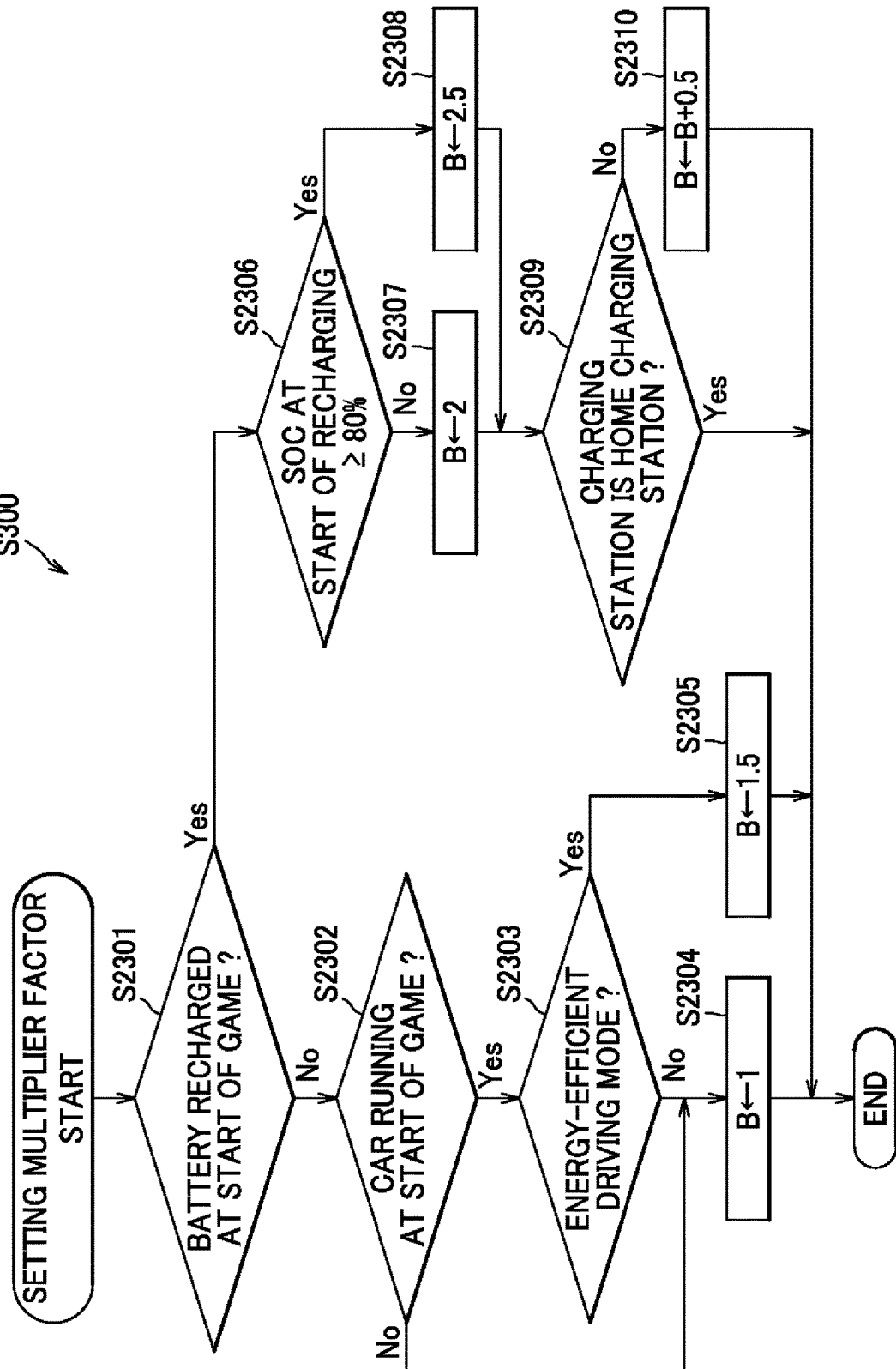
FIG. 34 is a flowchart showing a process of setting a multiplier factor.

As shown in FIG. 34, in the process of setting a multiplier factor, the smartphone SP makes a determination, based on information on the history record of recharging of the battery BT as acquired via the seat controller 100 from the car controller 10, whether or not the battery BT has been recharged at the time of launching the game app (S2301). If recharging has not been done (S2301, No), then the smartphone SP makes a determination as to whether or not the car CR is running at the time of launching the game app (S2302). If the car CR is not running (S2302, No), then the smartphone SP sets the multiplier factor B at 1 (S2304), and brings the multiplier factor setting process to an end.

If it is determined in step S2302 that the car CR is running (S2302, Yes), then the smartphone SP makes a determination as to whether or not the energy-efficient driving mode is in effect (S2302). If the energy-efficient driving mode is not in effect (i.e., normal driving mode is in effect) (S2302, No), then the smartphone SP sets the multiplier factor B at 1, and brings the multiplier factor setting process to an end. If it is determined in step S2302 that the energy-efficient driving mode is in effect (S2302, Yes), then the smartphone SP sets the multiplier factor B at 1.5 (S2305), and brings the multiplier factor setting process to an end.

If it is determined in step S2301 that the battery BT has been recharged at the time of launching the game app (S2301, Yes), then the smartphone SP makes a determination as to whether or not the battery BT at the time of starting the recharging is in a state of charge equal to or greater than 80% (S2306). If the state of charge is not equal to or greater than 80% (S2306, No), then the smartphone SP sets the multiplier factor B at 2 (S2307), and proceeds to step S2309. If it is determined in step S2306 that the state of charge is equal to or greater than 80% (S2306, Yes), then the smartphone SP sets the multiplier factor B at 2.5 (S2308), and proceeds to step S2309.

In step S2309, the smartphone SP makes a determination as to whether or not the charging station CS is the home charging station CS1 (S2309). If the charging station CS is the home charging station CS1 (S2309, Yes), then the multiplier factor setting process comes to an end. If the charging station CS is not the home charging station CS1 (but the external charging station CS2) (S2309, No), then the smartphone SP adds 0.5 to the multiplier factor B (S2310), and brings the multiplier factor setting process to an end. Accordingly, if the state of charge at the time of recharging is smaller than 80%, then the multiplier factor B is set at 2.5 (2+0.5), while if the state of charge at the time of recharging is equal to or greater than 80%, then the multiplier factor B is set at 3 (2.5+0.5).

Referring back to FIG. 32, the smartphone SP transmits to the server 300 an instruction to grant points (S2108). At the same time, the smartphone SP also transmits the user identification information and the set multiplier factor B to the server 300. Upon receipt of the instruction to grant points, the server 300 adds a point score obtained by multiplying the basic point score Pa by the multiplier factor B to and increases the point score stored for the corresponding user identification information (S2109). The server 300 then transmits to the smartphone SP notification of completion of granting points (S2110). The smartphone SP, upon receipt of the notification of completion of granting points, resets the criterial time period TJ (S2111), and proceeds to step S2112.

In step S2112, the smartphone SP makes a determination as to whether or not the grantability determination flag F1 at the time of starting the recharging is 0 (S2112). If the grantability determination flag F1 is not 0 (i.e., F1=1) (S2112, No), then the process comes to an end. If the grantability determination flag F1 is 0 (S2112, Yes), then the smartphone SP transmits to the server 300 an instruction to grant bonus points (S2113). The server 300 receives the instruction to grant bonus points, and adds the bonus point score Pb to and increases the point score stored for the corresponding user identification information (S2114). The server 300 then transmits notification of completion of granting points to the smartphone SP (S2115). The smartphone SP, upon receipt of the notification of completion of granting points, sets the grantability determination flag F1 at 1 (S2116), and brings the process to an end.

As described above, according to the in-seat experience system SYS of the present embodiment, the multiplier factor B used if the battery BT has been recharged is made greater than if the battery BT has not been recharged, so that a point score awarded if the battery BT has been recharged is increased. Accordingly, an incentive to take action of recharging can be given to the user.

Since the multiplier factor B is changed in accordance with the type of a charging station CS, the predetermined factor B can be made greater or smaller in accordance with the type of the charging station CS. Therefore, it is possible to guide the user to a specific charging station CS.

Since the multiplier factor B is made greater if the charging station CS is an external charging station CS2 than if it is a home charging station CS2, it is possible to motivate the user to willingly take action of recharging even while on the road.

Since the multiplier factor B is made greater if the battery BT is in a higher state of charge than if the battery BT is in a lower state of charge, the point score to be awarded can be increased by keeping the state of charge of the battery BT high. Accordingly, the user's motivation to take action of recharging can be greatly enhanced.

Since the multiplier factor B is made greater if the energy-efficient driving mode is in effect than if the normal driving mode is in effect, the user can be motivated to drive in such a manner to reduce power consumption in the battery BT.

Since a point score stored for corresponding user identification information is increased with a bonus point score Pb added thereto on condition that the car CR has arrived at a charging station CS, the point score can be awarded for an action of going to the charging station CS. Accordingly, the user can be motivated to take action of recharging.

Since the use of app of which power consumption PW is great is prohibited if the state of charge in the battery BT is low, the user can be motivated to take action of recharging to keep the state of charge of the battery BT high enough.

Since the use of an app to be used when the driver's seat SD is in a reclining state is prohibited when the car CR is running, and allowed if the battery BT is being recharged, even the driver is allowed to use an app chosen from a list of increased number of the apps during recharging. Accordingly, the user (driver) can be motivated to take action of recharging. Moreover, since a variety of apps are made available during recharging, a lot of fun can be enjoyed.

Since the server 300 increases a point score stored for the corresponding user identification information on condition that the result of determination that the first condition is satisfied is received from the smartphone SP, the occupant can be motivated to willingly utilize the smartphone SP for the purpose of earning points. Accordingly, the seat S with pressure sensors PS provided therein can be utilized in its full potential.

The occupant motivated by award point incentives would possibly continue to use the smartphone SP so as to earn allotted award points, but can be constrained from excessive use of the smartphone SP more than necessitated because, in order to have points granted, the second condition is required to be satisfied.

On the contrary, since the occupant after a while seated still is allowed to earn points, the occupant can become willing to play the leg-lift game in order to earn points; therefore, poor blood circulation which would be caused by keeping the same posture in the car for a long time can be made unlikely to occur to the advantage of promotion of health.

According to the present embodiment, in which the second condition is tested based on the measurement values of the pressure sensors PS, a determination as to whether to grant points can be made based on the sitting state or motion of the occupant on the seat body S0. Therefore, the motion of the occupant in the car can be controlled indirectly by enhancing the occupant's motivation to have points granted, to the advantage of promotion of health.

Although the embodiment has been described above, this embodiment may be implemented with partial modifications made to its configuration.

For example, the above-described embodiment describes, as an example of a configuration in which multiplier factor B is changed in accordance with the type of the charging station CS, an exemplary configuration that the multiplier factor B is made greater if the charging station CS is an external charging station CS2 than if it is the home charging station CS1; however, a feasible configuration is not limited thereto.

As an alternative example, where a partner company having a tie-up with a company which operates the in-seat experience system SYS operates a charging station CS (CS3), the smartphone SP may be configured to make the multiplier factor B greater if the charging station CS is the charging station CS3 operated by the partner company than if it is a charging station CS4 operated by a company other than the partner company. With this configuration, it is possible to guide the user to the charging station CS3 operated by the partner company.

When a crowded charging station CS5 and a less crowded charging station CS6 as charging stations CS are in an accessible location, the smartphone SP may be configured to make the multiplier factor B greater if the charging station CS is the less crowded charging station CS6 than if the charging station CS is the crowded station CS5. With this configuration, it is possible to guide the user to the less crowded charging station CS6; therefore, the charging stations CS can be effectively utilized on the whole.

In the above-described embodiment, only the apps to be used when the driver's seat SD is in a reclining state are prohibited from use when the car CR is running; however, the prohibition laid on the use of apps when the car CR is running may cover, for example, all the apps on the smartphone SP to be used by the driver.

In the above-described embodiment, the reclining state is taken as an example of the non-driving state, but the non-driving state in which at least part of the seat body has been moved from a position thereof in the driving state may be, for example, a state in which the whole seat body has been turned 180 degrees backward.

Another feasible configuration may be such that an application program of which power consumption PW is equal to or greater than a second power consumption threshold value PWth2 is prohibited from use if the battery is being recharged.

Since an app which gives a motion instruction and makes a determination based on measurement values of a sensor provided in a seat as to whether or not a condition for granting points is satisfied also consumes power in the battery of the car, both of the state of charge in the battery of the car and the power consumption of the app may be displayed. In this configuration, the distance coverable if the app is used and the distance coverable if the app is not used may also be displayed.

In the above-described embodiment, bonus points are granted if the car CR has arrived at a charging station CS and charging has been started; an alternative configuration may be such that when the car has arrived at a charging station, bonus points are granted for example based on location information of the car and the charging station. In the above-described embodiment, bonus points are granted only once a day on condition of arrival at a charging station; however, for example, when the car has pulled into more than one charging station in a day, further bonus points may be granted upon arrival at a charging station different form a charging station(s) at which bonus points have already been granted.

In the above-described embodiment, the normal driving mode is taken as an example of the first driving mode and the energy-efficient driving mode is taken as an example of the second driving mode; however, the first driving mode may be a mode in which greater importance is placed on acceleration performance of the car, or the like rather than power saving performance, while the second driving mode may be the normal driving mode, for example.

In the above-described embodiment, the user identification information is stored in the smartphone SP as an example of an experience instruction device, but the user identification information may not necessarily be stored in the experience instruction device. For example, the user identification information may be information such as a user ID and a password entered into the experience identification device and transmitted to the server for gaining access to the point grant system in the server. With this configuration, points can be granted for each user even if a user who uses one specific experience instruction device is changed to another user, for example.

In the above-described embodiment, the multiplier factor is set by the smartphone SP as an example of the experience instruction device, but the multiplier factor may be set by the server 300. Specifically, the server may set a multiplier factor based on information on the state of charge in the battery or the like received from an experience instruction device or the like.

Although the determination that the second condition is satisfied is made in this embodiment if the criterial time period TJ determined as an accumulated period of time during which variations of the measurement values of the pressure sensors PS3 fall within a range narrower than a predetermined range is equal to or longer than the predetermined period of time (threshold value TJth), the criterial time period TJ may be determined as a continuous period of time during which variations of the measurement values of the pressure sensors PS3 fall within a range narrower than a predetermined range, and the determination that the second condition is satisfied may be made if this criterial time period TJ is equal to or longer than the predetermined period of time. In this alternative configuration, the smartphone SP resets the criterial time period TJ when the variation test results in 1, as FIG. 31 shows in the graph (broken line) of the criterial time period TJ.

Although the determination as to whether or not the first condition is satisfied (the process of the game) and the determination as to whether the second condition is satisfied in this embodiment are made by using the pressure sensors PS3 only, the other pressure sensors PS1, PS2, PS4 to PS6 may be used.

Although the determination as to whether or not the second condition is satisfied in this embodiment is executed by the smartphone SP as an experience instruction device, an alternative configuration may be feasible such that the information necessary to test the second condition is transmitted from the experience instruction device to the server 300 and the server 300 executes the determination as to whether or not the second condition is satisfied. In this alternative configuration, the criterial time period TJ may be reset by the server 300.

Although the determination as to whether or not the second condition is satisfied in this embodiment is made based on the measurement values of the sensors, the smartphone SP may be configured to make a determination as to whether or not the second condition is satisfied, based on location information of the seat S.

For testing the second condition based on the location information, for example, the smartphone SP may be configured to compute a distance traveled of the seat S based on the location information, and to make the determination that the second condition is satisfied, if the distance traveled is equal to or longer than a predetermined distance.

The location information may be acquired from a GPS (global positioning system) with which a commonly-used smartphone may be equipped. It is also quite likely that the car CR or the seat body S0 is equipped with GPS from which the location information may be acquired.

The smartphone SP then stores location information acquired on the last occasion of giving an instruction to grant points (this location information is hereinafter referred to as the last location information G), and computes, as a travel distance D, a distance between the current location determined when the game comes to an end and the stored last location G. If the travel distance D is equal to or greater than a predetermined threshold value Dth, the second condition tester 230 makes a determination that the second condition is satisfied.

Figure 35:
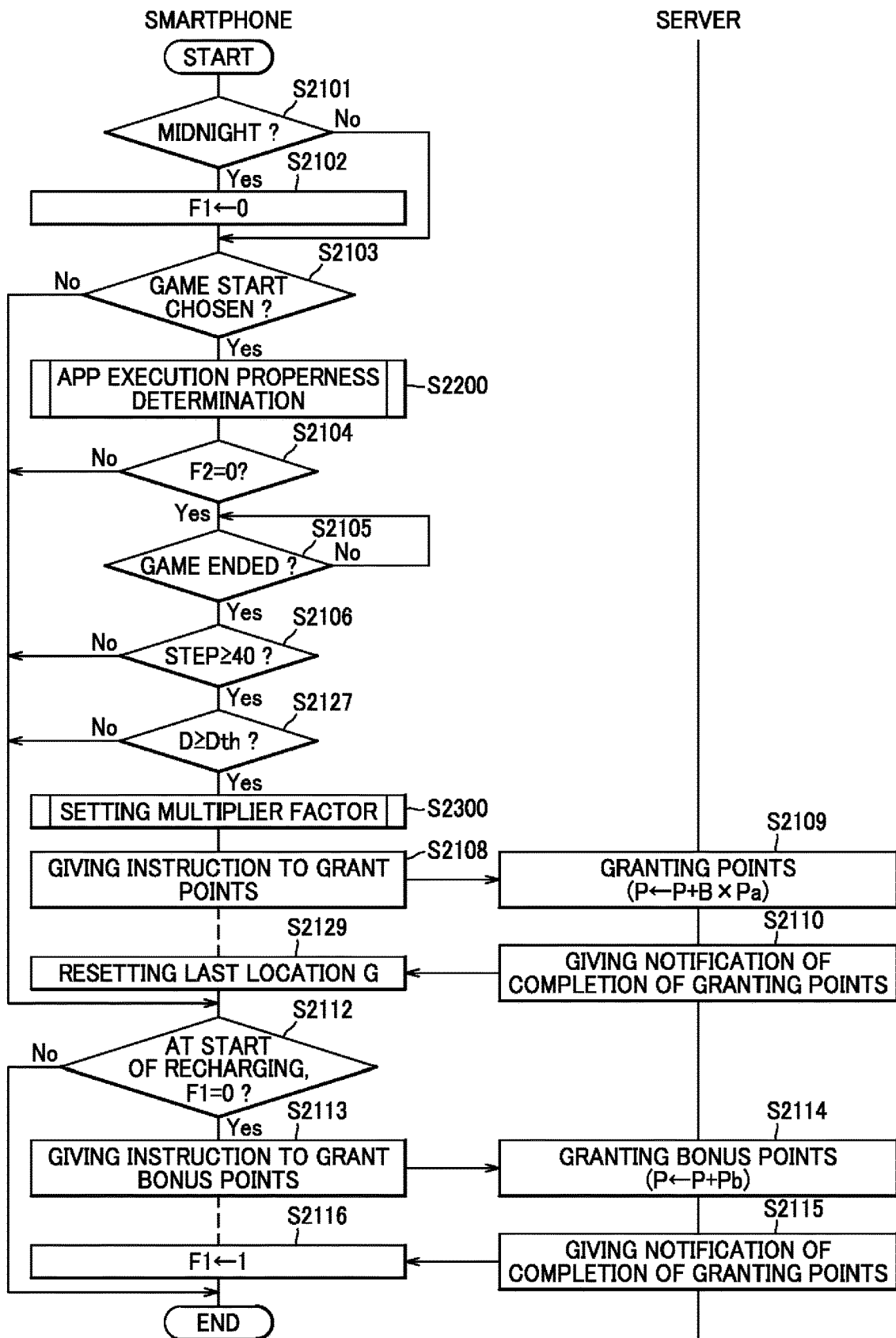
FIG. 35 is a flowchart showing a process of determination of a second condition based on location information.

The flowchart of this configuration is shown in FIG. 35.

The flowchart of FIG. 35 shows a modified example in which steps S2107 and S2111 in the flowchart of FIG. 32 are changed.

When the game comes to an end in the smartphone SP (S2105, Yes) and the first condition tester 220 makes a determination that the step count is equal to or more than 40 (S2106, Yes), then the second condition tester 230 computes a travel distance D as a distance in a straight line between the last location G and the current location, and makes a determination as to whether or not the travel distance D is equal to or greater than the threshold value Dth (S2127). If D<Dth (S2127, No), then the process goes to step S2112, while if D≥Dth (S2127, Yes), then a multiplier factor B is set (S2300).

Thereafter, the server 300 transmits to the smartphone SP notification of completion of granting points (S2110), and the smartphone SP, upon receipt of the notification of completion of granting points, resets the last location G, i.e., overwrites the current location with it, and stores the current location in the storage unit 290 (S2129).

In this way, the second condition may be defined based on the location information as satisfied when a distance traveled from the last location G is equal to or longer than a distance of the threshold value Dth, and the grant of points may be provided conditionally on satisfaction of both of the first condition and the second condition. Accordingly, excessive use more than necessitated of the smartphone SP for the purpose of earning more points can be restricted. Furthermore, the traffic of persons can be made brisker, and the development of economy can be stimulated.

In this configuration, the travel distance D computed may not be a distance in a straight line but a distance measured along a path. In this alternative example, the smartphone SP may be configured to compute, at specific time intervals, travel distance (distance in a straight line between a last location as measured the specific time interval before and a present location) and add up the travel distances computed to obtain the travel distance D.

In this configuration, computation of the distance and determination may not be performed by the experience instruction device (smartphone SP) but may be performed by the server. For example, the server may be configured to acquire location information periodically from the experience instruction device to compute a travel distance D, and to make a determination as to whether or not the travel distance D is equal to or greater than the threshold value Dth (whether or not the second condition is satisfied).

In this configuration, the second condition is defined as satisfied when a travel distance D is equal to or longer than a predetermined distance, but the second condition defined based on location information such as satisfied when an occupant (seat S) is located in a specific geographical area may also be feasible. In this way, setting the second condition based on the location of the seat S would entice potential customers to come into a specified region, so that local development can be promoted.

Other configurations may further be implemented in practical application.

For example, the second condition may be defined based on location information as satisfied when the car is stuck on a gridlocked highway. With this configuration, one who is stuck on a gridlocked highway and has too much time hanging heavy on hands can take advantage of this opportunity to get physical exercise to thereby improve health.

Alternatively, the second condition may be defined as requiring a use of the seat for a specific objective, e.g., use as a training machine. With this configuration as well, improvement of health can be achieved by the use of a seat.

Alternatively, the app of the experience instruction device may be configured to instruct a user to move his/her legs, and the second condition may be defined as satisfied when the number of steps for one day set for each user is reached. In this alternative configuration as well, an occupant can be motivated to move his/her legs willingly, so that improvement of health can eventually be achieved.

The server may be configured to grant points when the second condition is not satisfied. Even with this configuration, an occupant who expects to have points granted if the first condition is satisfied can be motivated to make full use of the seat with a sensor provided therein.

An additional configuration may be feasible in which still another condition for having points granted is required to be satisfied. For example, the condition that the in-seat experience is enjoyed simultaneously by fellows may be required. Such additional condition(s) may be attached not as requirements for granting points but as requirements for adding extra points. To this end, association data, indicating correlations between one experience instruction device of one user (user identification information) and other experience instruction devices of his/her fellow users (user identification information), i.e., data correlated in terms of fellowship recognized by the users, may be stored in the server.

Although the sensor is exemplified by pressure sensors in the above-described embodiment, the sensor may be any other types of sensors, e.g., capacitance sensors or the like. Alternatively, the sensor may be a temperature sensor.

Although the seat controller and the smartphone in the above-described embodiment are connected via radio communication, they may be connected by wire.

Although the smartphone SP is taken as an example of an experience instruction device in the above-described embodiment, the experience instruction device may be a tablet computer, a notebook computer, or the like. Alternatively, the experience instruction device may not be a mobile terminal, but may be a navigation system fixedly installed in the car. That is, the existing navigation system may be modified to have a game function of giving a motion instruction and used as an experience instruction device. The experience instruction device may comprise a plurality of devices capable of communicating with each other. The experience instruction device may be configured partly or entirely to be integral with the seat controller in appearance.

The car seat installed in a car such as an automobile is illustrated by way of example in the above-described embodiment; however, the seat may be a vehicle seat for a vehicle other than a car, such as a ship, an aircraft, etc.

Fourth Embodiment

Next, a description will be given of a fourth embodiment with reference to accompanying drawings.

Figure 36:
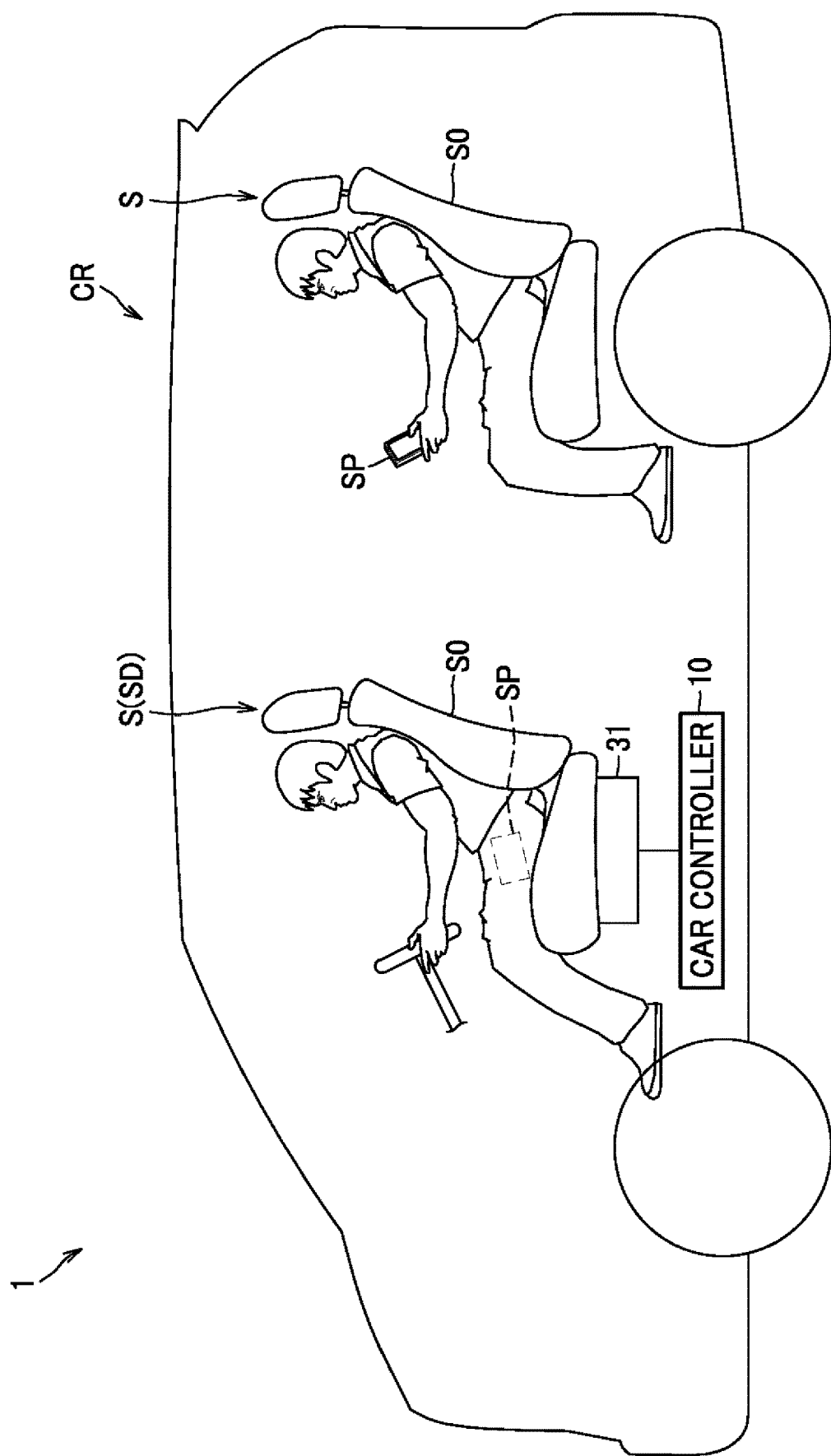
FIG. 36 is a diagram for explaining a general setup of a seat system according to a fourth embodiment.

As shown in FIG. 36, a seat system 1 comprises seats S and smartphones SP as an example of a terminal which may be used in a car CR.

The seat S is a car seat installed in a car CR such as an automobile. As shown in FIG. 27, the seat S includes a seat body S0, pressure sensors PS1 to PS6 as an example of a sensor provided in the seat body S0 and configured to acquire a measurement value for use in detecting motion of an occupant (including a driver) seated on the seat body S0, and a seat controller 100 connected to the pressure sensors PS and thereby allowed to acquire the measurement values from the pressure sensors PS1 to PS6.

The smartphone SP is connected to the seat controller 100 via a near-field communication device 3A which enables near-field wireless communication, such as Bluetooth (registered trademark), Wi-Fi (registered trademark), etc., and configured to acquire measurement values from the pressure sensors PS1 to PS6. The smartphone SP has a plurality of application programs (hereinafter referred to as "apps") installed therein and is capable of executing the installed apps. The apps include, for example, a game app for providing a game, a mail app for transmitting and receiving emails, a motion picture player app for playing a motion picture, a camera app for shooting a photograph or a video, and so forth. The game app includes an app using measurement values of the pressure sensors PS1 to PS6. The smartphone SP is configured to be capable of providing, for example, a game using the seat body S0, etc. by executing the app. In the car CR (see FIG. 36), a plurality of seats S are installed, and each seat S is connected to one and the same seat controller 100.

The seat body S0 includes a seat bottom S1 and a seat back S2, and the pressure sensors PS1 to PS3 are provided under an outer covering of the seat bottom S1, and pressure sensors PS4 to PS6 are provided under an outer covering of the seat back S2. The respective pressure sensors PS1 to PS6 are provided in pairs, each located left and right symmetric with respect to a laterally central position of the seat body S0.

The pressure sensors PS1, PS2 are located in positions corresponding to the buttocks of an occupant in the seat bottom S1. To be more specific, the pressure sensors PS1 are provided in positions which correspond to the lowermost portions of ischial bones of the occupant and on which the load of the occupant is borne largest; the pressure sensors PS2 are located a little frontward of the pressure sensors PS1. The pressure sensors PS1, PS2 are configured to acquire measurement values of pressure (hereinafter referred to also as "pressure values") from the buttocks of the occupant.

The pressure sensors PS3 are located frontward of and distanced far from the pressure sensors PS1, PS2, specifically, in positions corresponding to the thighs of the occupant. The pressure sensors PS3 are configured to acquire measurement values of pressure from the thighs of the occupant.

The pressure sensors PS4, PS5 are located in a lower portion of the seat back S2. To be more specific, the pressure sensors PS4 are located in positions corresponding to the back of the lumbar region of the occupant; the pressure sensors PS5 are located in positions a little higher than the positions of the pressure sensors PS4. The pressure sensors PS4, PS5 are configured to acquire measurement values of pressure from the lumbar region of the occupant.

The pressure sensors PS6 are located above and distanced far from the pressure sensors PS4, PS5, specifically, in positions corresponding to an upper part of the back of the occupant. The pressure sensors PS6 are configured to acquire measurement values of pressure from the position corresponding to the upper part of the back of the occupant.

The pressure sensors PS1 to PS6 are each configured, for example, as an element whose electrical resistance varies with external pressure applied thereto, wherein the larger the pressure value, the higher or the lower the voltage of the detection signal becomes.

Figure 37:
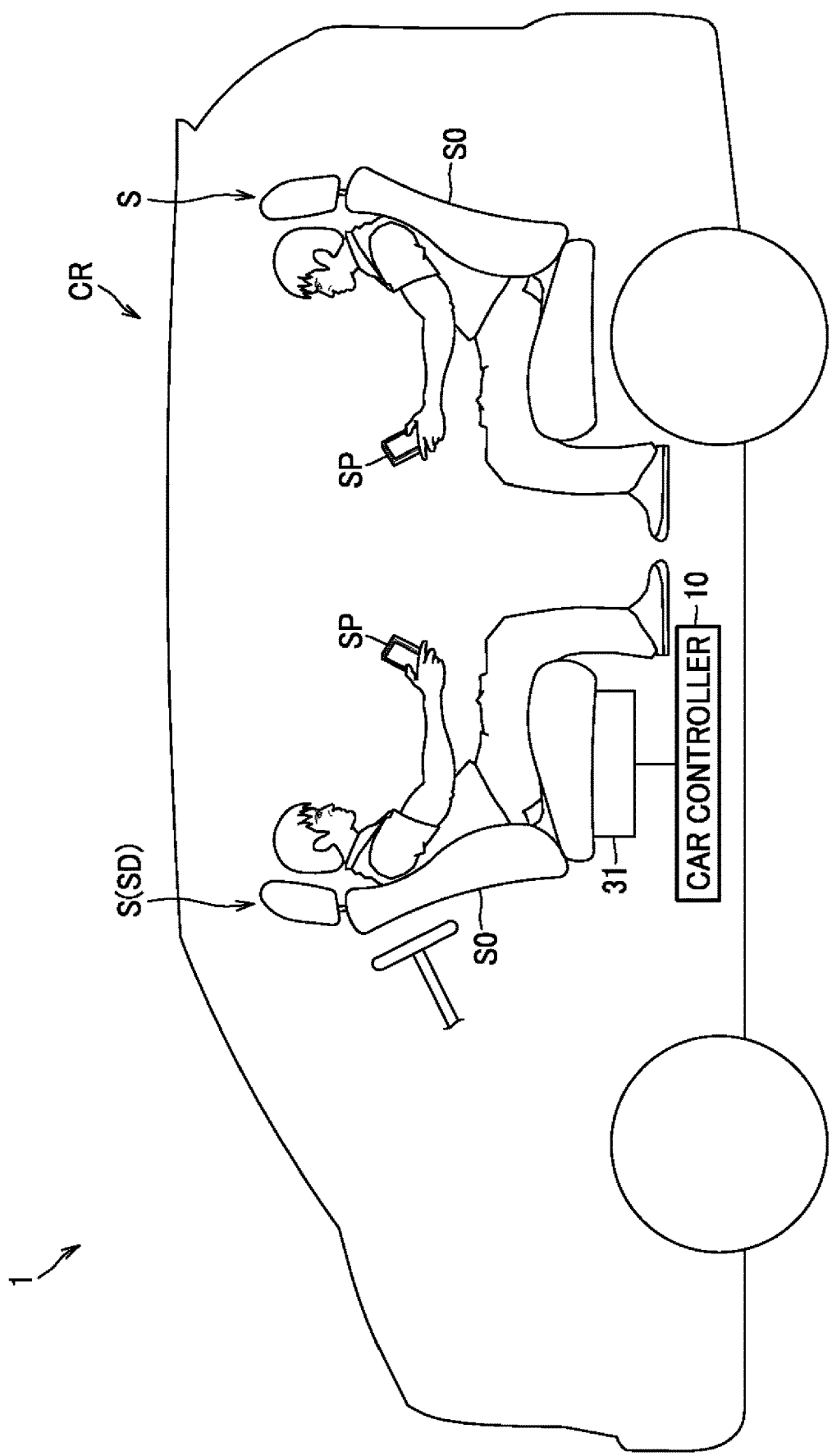
FIG. 37 is a diagram showing a seat body of a driver's seat in a non-driving state.

As shown in FIG. 36, the seats S include a driver's seat SD on which a driver is to be seated. The seat body S0 of the driver's seat SD is switchable to a driving state to be assumed when the driver performs a driving operation as shown in FIG. 36, and to a non-driving state as shown in FIG. 37. The non-driving state is a state in which at least part of the seat body S0 has been moved from its position in the driving state. In the present embodiment, the non-driving state is a state in which the seat body S0 has been turned 180 degrees backward from the position in the driving state.

The seat system 1 of the present embodiment comprises a seat actuator 31 as an actuator provided in the car CR, and is configured such that the seat body S0 can be moved, specifically, rotated, by the seat actuator 31 to its position in the driving state and to its position in the non-driving state. The seat actuator 31 is activated by a driver operating a seat orientation selector switch 21 (see FIG. 38) during automated driving and thus caused to rotate the seat body S0 from the driving state to the non-driving state, or from the non-driving state to the driving state. In some cases, as will be described later in detail, the seat actuator 31 is configured to cause the seat body S0 to rotate from the non-driving state to the driving state in response to an instruction from a smartphone SP even without driver's operation.

The car CR includes seats S, smartphones SP which may be carried in the car CR and moved together with the car CR, and a car controller 10 as a control unit, and is configured to be switchable between automated driving during which acceleration, braking and steering are automatically controlled without driver's intervention, and non-automated driving during which the acceleration, braking and steering are operated manually by the driver.

Figure 38:
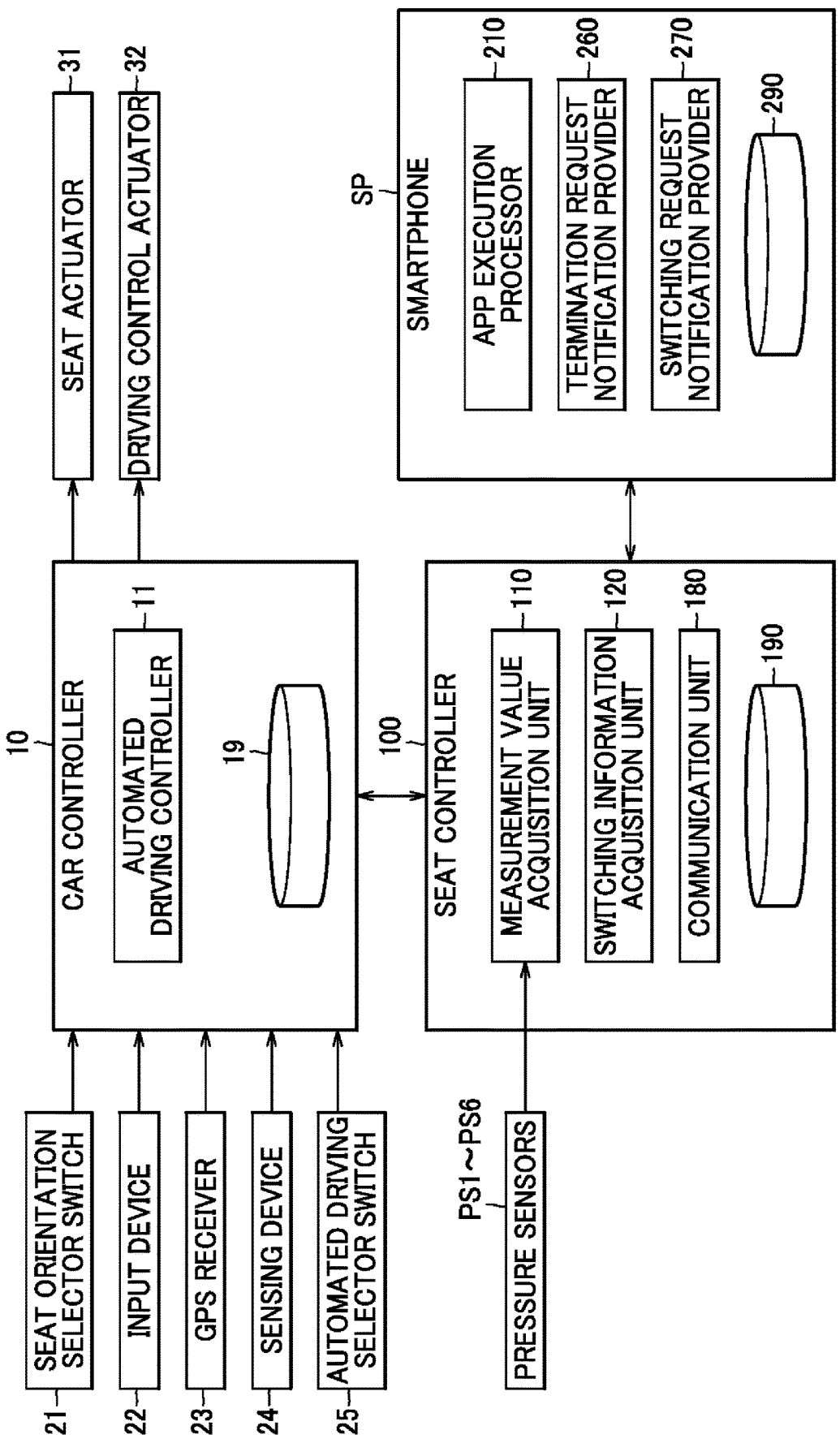
FIG. 38 is a block diagram for explaining configurations of a car controller, a seat controller, and a smartphone.

As shown in FIG. 38, the car controller 10 includes an automated driving controller 11 that controls automated driving. When a destination is set by input received through an input device 22 such as a touch panel, the automated driving controller 11 sets a route to the destination based on map information stored in a storage 19, location information acquired from a GPS receiver 23, road information or information on local circumstances acquired via a network such as the Internet. The automated driving controller 11 then sets an automated driving section in which automated driving is possible and a non-automated driving section in which a driver's operation is required. The automated driving section and the non-automated driving section are updated on an as-needed basis.

The car controller 10, in response to an instruction to start automated driving, given during driving in the automated driving section by a driver through manual operation of the automated driving selector switch 25, controls a driving control actuator 32 of the car CR, including an actuator for acceleration control, an actuator for braking control and an actuator for steering control, etc., based on inputs from a sensing device 24 such as sensors of various kinds, a radar, a camera, etc., and causes the car CR to run. If the driver gives an instruction to terminate automated driving through manual operation of the automated driving selector switch 25, the car controller 10 switches from the automated driving to the non-automated driving at an appropriate time.

The seat controller 100 includes a measurement value acquisition unit 110, a switching information acquisition unit 120, a communication unit 180, and a storage unit 190. The seat controller 100 includes a CPU, a ROM, a RAM, a rewritable nonvolatile memory, etc., which are not illustrated in the drawings; each functional unit is implemented through execution of pre-stored programs.

The measurement value acquisition unit 110 acquires measurement values of pressure per given control cycle from the respective pressure sensors PS1 to PS6. The measurement values acquired by the measurement value acquisition unit 110 are subjected to analogue-to-digital conversion, stored in the storage unit 190, and transmitted to the smartphone SP.

The switching information acquisition unit 120 acquires, from the car controller 10, information on switching from automated driving to non-automated driving. To be more specific, the switching information acquisition unit 120 acquires, from the car controller 10, a switching time ts that is a time for switching from the automated driving to the non-automated driving. If the automated driving section and the non-automated driving section are set, the car controller 10 computes, as the switching time ts, a time for ending the automated driving section or a time for starting the non-automated driving section.

Moreover, the switching information acquisition unit 120 acquires, from the car controller 10, information on the state of the seat body S0 of the driver's seat SD. To be more specific, the switching information acquisition unit 120 acquires information as to whether the seat body S0 of the driver's seat SD is in the driving state or in the non-driving state, from information on the control history of the seat actuator 31, etc.

Information acquired by the switching information acquisition unit 120 is stored in the storage unit 190 and transmitted via the communication unit 180 to the smartphone SP.

The smartphone SP includes an app execution processor 210, a termination request notification provider 260, a switching request notification provider 270, and a storage unit 290. The smartphone SP includes a CPU, a ROM, a RAM, a rewritable nonvolatile memory, etc., which are not illustrated in the drawings; each functional unit is implemented through execution of pre-stored programs.

It is to be understood that in the present embodiment, the termination request notification provider 260 and the switching request notification provider 270 are implemented only in the smartphone SP to be used by the driver. In other words, in the present embodiment, the smartphones SP to be used by occupants other than the driver do not have the functions of the termination request notification provider 260 and the switching request notification provider 270.

The app execution processor 210 executes apps installed in the smartphone SP. Described herein as an example of an app using measurement values of the pressure sensors PS1 to PS6 is a game app for the 100-meter dash game.

When the game app for the 100-meter dash game is executed in the app execution processor 210, animated characters are shown on the display DSP (see FIG. 27) of the smartphone SP, and a game is offered to the occupant, who is thus prompted to lift his/her legs alternately on the seat body S0 so as to cause the animated characters to run toward the finish line.

More specifically, the smartphone SP acquires the pressure values $P3_R$, $P3_L$ from the right and left pressure sensors PS3 (see FIG. 27). The smartphone SP then determines a normal pressure $P3_n$ that is an average pressure of the occupant and a threshold value P3th for detection of peaks of pressure values, and computes a normal step cycle $TS_n$ that is an average of time intervals in each of which a sequence of motions of the legs of the occupant is completed.

When an occupant lifts his/her legs alternately, the pressure values $P3_R$, $P3_L$ change as shown in FIG. 3, for example. In FIG. 3, a term in which the pressure goes down sharply indicates that the occupant has lifted his/her leg up and the pressure at an area detected by the pressure sensor PS3 has become small accordingly. In fact, the pressure values that have not gone down but kept at about 140 will be reckoned as a normal pressure $P3_n$ that is an average of pressure values detected when the legs are not lifted up. To compute the normal pressure $P3_n$, for example, you may identify such absolute values as found not greater than a predetermined value, i.e., the values of which variations are small enough, among the absolute values of the differences between the last value and the present value of the pressure values $P3_R$, $P3_L$ (remainders each determined by subtraction of the last value from the present value), and sum up and average the present values used to obtain the identified absolute values. In practical applications, the magnitude of the pressure values are compared with reference made to the magnitude of the voltage values; however, a description is herein made as if comparison is made based on the magnitude of the pressure values.

The threshold value P3th is a threshold value for determining that a leg is currently being lifted up; for example, a value obtained by multiplying the normal pressure $P3_n$ by a predetermined value may be used therefor.

The normal step cycle $TS_n$ is an average value of the step cycles TS that is a time interval between peaks of the pressure values $P3_R$, $P3_L$.

Peak detection of the pressure values $P3_R$, $P3_L$ may be determined to occur when the difference between the last value and the present value changes from the negative to the positive under the condition that each pressure value $P3_R$, $P3_L$ is smaller than the threshold value P3th (i.e., the pressure value has crossed the threshold value P3th from above to below), and the last value P3(n−1) detected at this time is assumed to be a peak value Pm.

Upon detection of peaks of the pressure values $P3_R$, $P3_L$ varying according to the motions of the occupant, the smartphone SP computes a peak value Pm, and computes a step intensity F ($F_R$, $R_L$) that is a leg-lift motion scale based on the peak value Pm and the normal pressure $P3_n$. The step intensity F may be indicated by the magnitude of the peak, i.e., a value obtained by subtraction of the peak value Pm from the normal pressure $P3_n$. To eliminate variations caused by largeness of the build of an occupant, the obtained value may be normalized by the normal pressure $P3_n$ to obtain the step intensity F, for example, as:

$$F=(P3_n-Pm)/P3_n$$

During the 100-meter dash game, the smartphone SP computes the step intensity F, and causes the animated character in the display DSP to move toward the finish line. The distance to be traveled is determined herein according to the magnitude of the step intensity F.

When the animated character has reached the finish line, the smartphone SP shows the time of the race on the display DSP. The game app for the 100-meter dash game is configured to show a plurality of race tracks and animated characters for a plurality of occupants playing the 100-meter dash game, so that the race of running toward the finish line can be held.

When the driver is executing an app in his/her own smartphone SP during automated driving, the termination request notification provider 260 notifies the driver of a termination request which requests termination of the app based on the switching time ts acquired from the car controller 10. To be more specific, during the automated driving, if the driver is executing an app, the termination request notification provider 260 acquires the switching time ts from the car controller 10, and notifies the driver of the termination request, at a time a predetermined period before the acquired switching time ts.

The notification of the termination request may be provided, for example, by showing a text message such as "Please terminate automated driving", or the like, on the display DSP of the driver's smartphone SP. The notification may also be provided by a voice message saying "Please terminate automated driving" or an alarm, etc. given from the speaker of the driver's smartphone SP. The notification may also be made by vibrating the driver's smartphone SP. The notification of the termination request may be provided in combination thereof.

The termination request notification provider 260 notifies the driver of a primary termination request to be made in the first place and a secondary termination request to be made after the driver is notified of the primary termination request, as a termination request. To be more specific, the termination request notification provider 260 notifies the driver of the primary termination request at a first notification time tw1 that is a time a first period tp1 before the switching time ts, and notifies the driver of the secondary termination request at a second notification time tw2 that is a time a second period tp2 before the switching time ts. The second notification time tw2 is a time that comes after the first notification time tw1. The second period tp2 is a period of time that is shorter than the first period tp1; for example, the first period tp1 may be set at 15 minutes and the second period tp2 may be set at 10 minutes.

The notification of the primary termination request and the notification of the secondary termination request may be provided in the same way or in different ways. The different ways may be implemented, for example, such that the notification of the primary termination request is provided by a text representation on the display DSP, and the notification of the secondary termination request is provided by a voice message. When the notifications are provided in the same way, for example, by giving an alarm, the secondary termination request may be notified by a sound different from that used for the primary termination request, or by a sound higher in volume level than that used for the first termination request.

If the execution of the app is not terminated by the operation of the driver after notification of a termination request is provided to the driver, the termination request notification provider 260 forcefully terminates the execution of the app in the app execution processor 210. Specifically, if the execution of the app is not terminated by the driver after the notification of the secondary termination request, the termination request notification provider 260 forcefully terminates the execution of the app at a termination time tw3 that is a time a third period tp3 before the switching time ts. The termination time tw3 is a time that comes after the second notification time tw2. The third period tp3 is a period of time that is shorter than the second period tp2, and may be set, for example, at 5 minutes.

When the execution of the app is forcefully terminated, a notification to that effect may be given to the driver, before the actual termination of the app occurs. For example, a text message such as "App will be terminated" or the like may be shown on the display DSP of the driver's smartphone SP, before the app is terminated. The app may be terminated after a voice message saying "App will be terminated" or the like given from the speaker of the driver's smartphone SP. Alternatively, for example, a message "App will be terminated; please prepare for driving operation" may be provided in text or with a voice.

When a notification of the primary termination request is provided, the termination request notification provider 260 changes a termination request flag FL1 from 0 to 1 to record the event of the notification of the primary termination request in the storage unit 290; when a notification of the secondary termination request is provided, the termination request notification provider 260 changes the termination request flag FL1 from 1 to 2 to record the event of the notification of the secondary termination request in the storage unit 290. The initial value of the termination request flag FL1 is 0, and the termination request flag FL1 is reset to 0 when the app is terminated by the operation of the driver or when the app is forcefully terminated.

When the seat body S0 of the driver's seat SD is in the non-driving state (see FIG. 37) during automated driving, the switching request notification provider 270 notifies the driver of a switching request which requests switching of the seat body S0 from the non-driving state to the driving state. To be more specific, during the automated driving, if an app is being executed in the driver's smartphone SP and information on the state of the seat body S0 of the driver's seat SD acquired from the car controller 10 is information indicative of the non-driving state, then the switching request notification provider 270 acquires a switching time ts from the car controller 10, and notifies the driver of the switching request, at a time a predetermined period before the acquired switching time ts.

The notification of the switching request may be provided, like the notification of the termination request, for example, by showing a text message such as "Please turn the seat back to the forward-facing position" or the like, on the display DSP of the driver's smartphone SP. The notification may also be provided by a voice message saying "Please turn the seat back to the forward-facing position" or an alarm, etc. given from the speaker of the driver's smartphone SP. The notification may also be made by vibrating the driver's smartphone SP. The notification of the switching request may be provided in combination thereof.

In the present embodiment, the switching request notification provider 270 notifies the driver of a primary switching request to be made in the first place and a second switching request to be made after the driver is notified of the primary switching request, as a switching request. To be more specific, the switching request notification provider 270 notifies the driver of the primary switching request at the first notification time tw1, and notifies the driver of the secondary switching request at the second notification time tw2.

The notification of the primary switching request and the notification of the secondary switching request may be, as is the case with the termination request, provided in the same way or in different ways.

In the present embodiment, during the automated driving, when the driver is notified of the termination request because an app is being executed in the driver's smartphone SP and the seat body S0 of the driver's seat SD is in the non-driving state, the driver is notified of the switching request, together with the termination request at the same time. To be more specific, if the seat body S0 is in the non-driving state when the termination request notification provider 260 provides notification of a primary termination request, then the switching request notification provider 270 provides notification of a primary switching request at the same time as the time when the primary termination request is provided. Similarly, if the seat body S0 is in the non-driving state when the termination request notification provider 260 provides notification of a secondary termination request, then the switching request notification provider 270 provides notification of a secondary switching request at the same time as the time when the secondary termination request is provided.

If the seat body S0 of the driver's seat SD is not moved by the operation of the driver from its position in the non-driving state to its position in the driving state after notification of a switching request is provided to the driver, then the switching request notification provider 270 causes the seat actuator 31 to forcefully move the seat body S0 from the position in the non-driving state to the position in the driving state. Specifically, if the seat body S0 is not moved to the position in the driving state after the notification of the secondary switching request, the switching request notification provider 270 causes the seat body S0 to be moved to the position in the driving state at the termination time tw3.

In the present embodiment, if the seat body S0 is in the non-driving state when the termination request notification provider 260 forcefully terminates an app, then the switching request notification provider 270 causes the seat body S0 to be moved to the position in the driving state at the same time as the time when the app is forcefully terminated.

If the forceful termination of the app is timed to come after the forceful movement of the seat body S0 to the position in the driving state, the actual movement of the seat body S0 to the position in the driving state may be timed to be made after notification is given to the driver to that effect that the seat body S0 will be moved to the position in the driving state. In this case, for example, a text message such as "The seat will be turned back to a forward-facing position" or the like may be shown on the display DSP of the driver's smartphone SP, before the movement to the position in the driving state is made. The movement to the position in the driving state may be timed to be made after a voice message saying "The seat will be turned back to a forward-facing position" or the like given from the speaker of the driver's smartphone SP. Alternatively, for example, "The seat will be turned back to a forward-facing position; please prepare for driving operation" may be provided in text or with a voice.

When a notification of the primary switching request is provided, the switching request notification provider 270 changes a switching request flag FL2 from 0 to 1 to record the event of the notification of the primary switching request in the storage unit 290; when a notification of the secondary switching request is provided, the switching request notification provider 270 changes the switching request flag FL2 from 1 to 2 to record the event of the notification of the secondary switching request in the storage unit 290. The initial value of the switching request flag FL2 is 0, and the switching request flag FL2 is reset to 0 when the seat body S0 is moved to the position in the driving state by the operation of the driver or when the seat body S0 is forcefully moved to the position in the driving state by the seat actuator 31.

Next, a description will be given of an operation of the driver's smartphone SP with reference to the flowcharts shown in FIG. 39 and FIG. 40.

Figure 39:
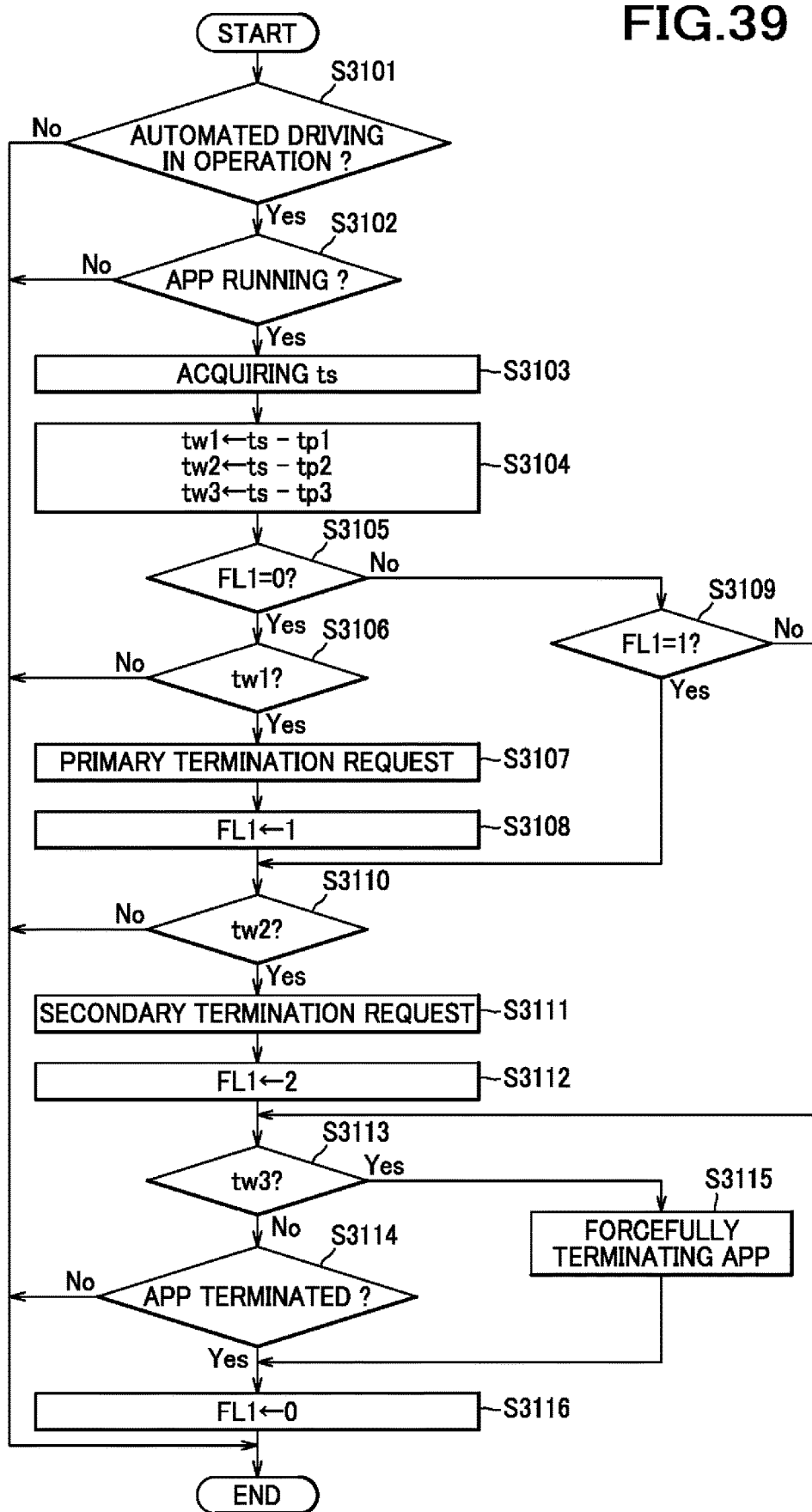
FIG. 39 is a flowchart showing an operation of notification of a termination request in the smartphone.
Figure 40:
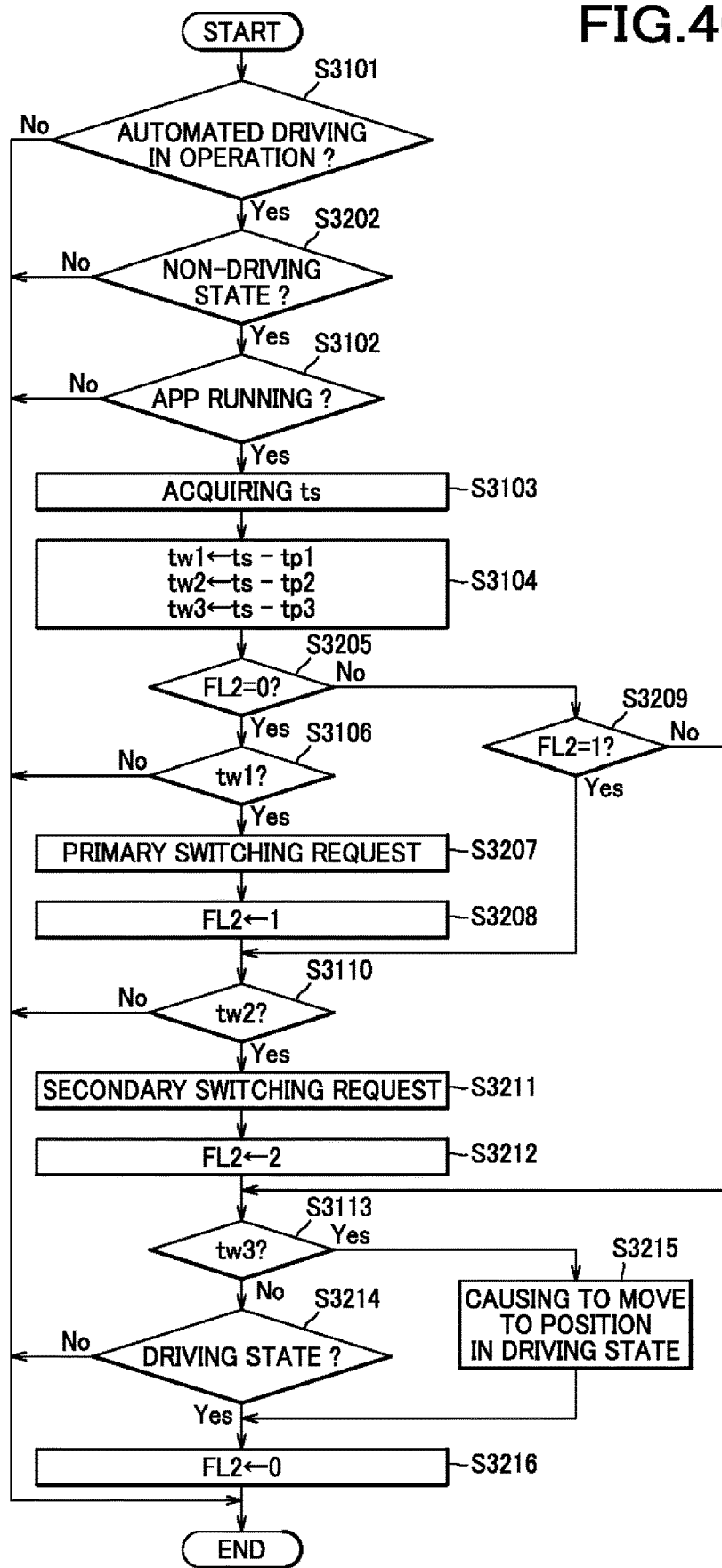
FIG. 40 is a flowchart showing an operation of notification of a switching request in the smartphone.

The smartphone SP executes a process of operation shown in FIG. 39 and FIG. 40 per given control cycle.

As shown in FIG. 39, the smartphone SP makes a determination as to whether or not automated driving is in operation (S3101). If the automated driving is not in operation (S3101, No), then the process is brought to an end. If the automated driving is in operation (S3101, Yes), then the smartphone SP makes a determination as to whether or not an app is being executed (S3102). If the app is not being executed (S3102, No), then the process is brought to an end. If the app is being executed (S3102, Yes), then the smartphone SP acquires a switching time is from the car controller 10 (S3103). Then the smartphone SP computes a first notification time tw1, a second notification time tw2, and a termination time tw3 (S3104).

Subsequently, the smartphone SP makes a determination as to whether or not the termination request flag FL is 0 (S3105). If the termination request flag FL is 0 (S3105, Yes), then the smartphone SP makes a determination as to whether or not the first notification time tw1 has arrived (S3106). If the first notification time tw1 has not arrived yet (S3106, No), then the process is brought to an end. If the first notification time tw1 has arrived (S3106, Yes), then the smartphone SP provides notification of the primary termination request to the driver (S3107), sets the termination request flag FL1 at 1 (S3108), and proceeds to step S3110.

In step S3105, if the termination request flag FL1 is not 0 (No), then the smartphone SP makes a determination as to whether or not the termination flag FL1 is 1 (S3109). If the termination flag FL1 is 1 (S3109, Yes), then the process goes to step S3110.

In step S3110, the smartphone SP makes a determination as to whether or not the second notification time tw2 has arrived. If the second notification time tw2 has not arrived yet (S3110, No), then the process is brought to an end. If the second notification time tw2 has arrived (S3110, Yes), then the smartphone SP provides notification of the secondary termination request to the driver (S3111), sets the termination request flag FL1 at 2 (S3112), and proceeds to step S3113. In step S3109, if the termination request flag FL1 is not 1 (S3109, No), then the process goes to step S3113, too.

In step S3113, the smartphone SP makes a determination as to whether or not the termination time tw3 has arrived. If the termination time tw3 has not arrived yet (S3113, No), then the smartphone SP makes a determination as to whether or not the execution of the app has been terminated by the operation of the driver (S3114). If the app has not been terminated (S3114, No), then the process comes to an end. If the app has been terminated (S3114, Yes), then the process goes to step S3116.

In step 3113, if the termination time tw3 has arrived (Yes), then the smartphone SP forcefully terminates the execution of the app (S3115), and proceeds to step S3116. In step S3116, the smartphone SP resets the termination request flag FL1 to 0, and brings the process to an end.

As shown in FIG. 40, during automated driving (S3101, Yes), if the driver has moved the seat body S0 to a position in the non-driving state (turning it to a backward-facing position) (S3202, Yes), and uses the smartphone SP (executing an app) (S3102, Yes), the smartphone SP executes a process of the switching request notification in parallel with the process of the termination request notification of FIG. 39. If it turns out in step S3205 that the switching request flag FL2 is 0 (Yes), and it turns out in step S3205 that the first notification time tw1 has arrived (Yes), then the smartphone SP provides notification of the primary switching request to the driver (S3207), and sets the switching request flag at 1 (S3208). In this step, if the notification of the primary termination request is also to be provided, the smartphone SP provides the notification of the primary switching request in addition to the notification of the primary termination request to the driver.

If it turns out in step S3205 that the switching request flag FL2 is not 0 (No), and it turns out in step S3209 that the switching request flag FL2 is 1 (Yes), and the second notification time tw2 has arrived (S3110, Yes), then the smartphone SP provides notification of the secondary switching request to the driver (S3211), and sets the switching request flag FL2 at 2 (S3212). In this step, if the notification of the secondary termination request is to be provided, the smartphone SP provides the notification of the secondary switching request in addition to the notification of the secondary termination request to the driver.

If it turns out in step S3209 that the switching request flag FL2 is not 1 (No), and the termination time tw3 has arrived (S3113, Yes), then the smartphone SP moves the seat body S0 of the driver's seat SD by the seat actuator 31 from the position in the non-driving state to the position in the driving state (S3215), and resets the switching request flag FL2 to 0 (S3216). In this step, if the app is to be forcefully terminated, then the smartphone SP forcefully terminates the app and moves the seat body S0 of the driver's seat SD to its position in the driving state at the same time.

If the seat body S0 of the driver's seat SD is not moved by the operation of the driver from the position in the non-driving state to the position in the driving state (S3214, No) before the termination time tw3 (S3113, No), then the process is brought to an end. On the other hand, if movement to the position in the driving state has been made (S3214, Yes), then the smartphone SP resets the switching request flag FL2 to 0 (S3216), and brings the process to an end.

Next, a description will be given of an operation of the driver's smartphone SP with reference to the timing diagram of FIG. 41.

Figure 41:
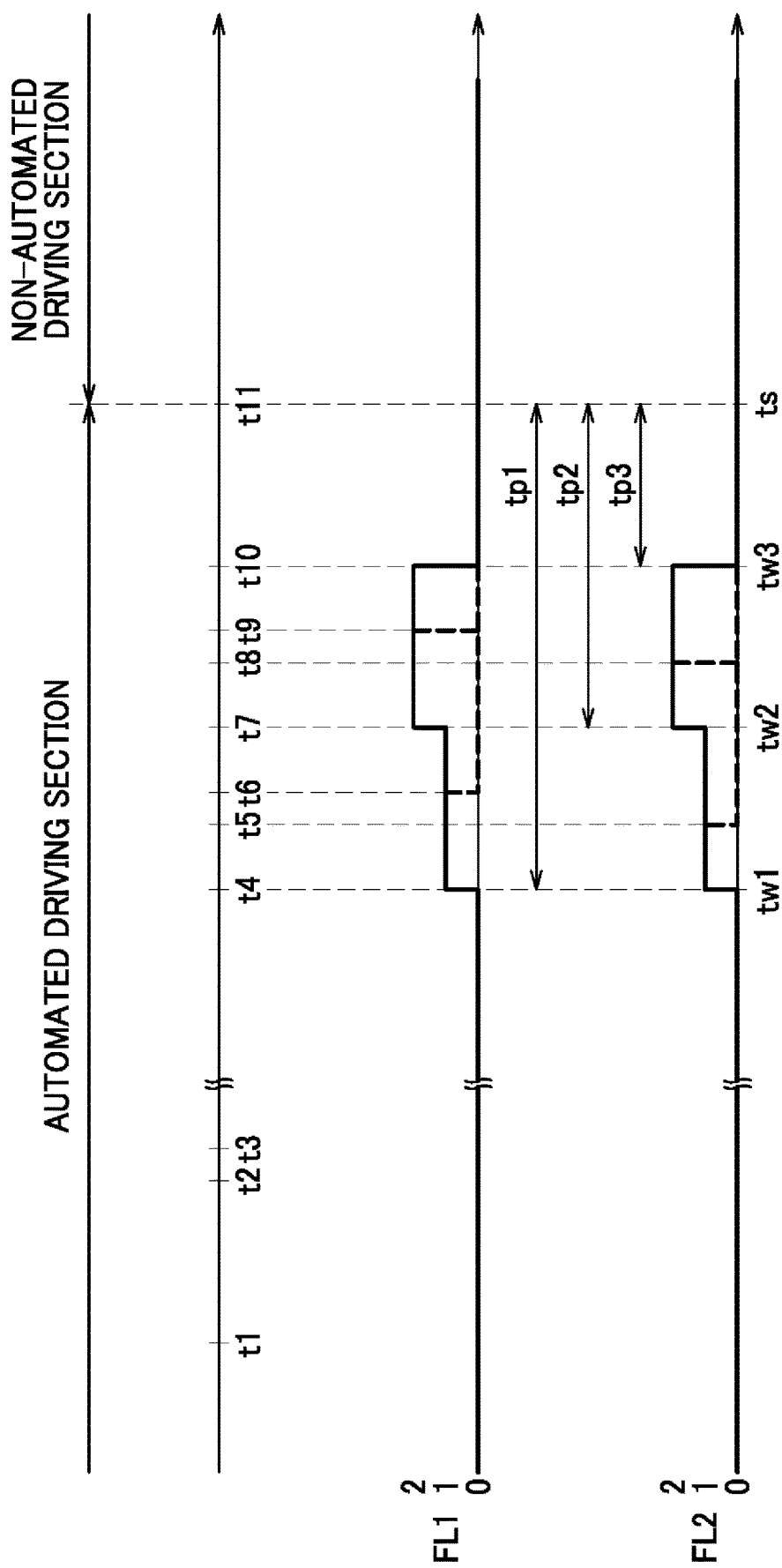
FIG. 41 is a timing diagram showing an operation of the smartphone.

As shown in FIG. 41, if automated driving is put into operation at a time t1, the seat body S0 of the driver's seat SD is moved to a position in the non-driving state at a time t2, and execution of an app is started at a time t3, then the smartphone SP computes a first notification time tw1, a second notification time tw2, and a termination time tw3 per given control cycle.

If the first notification time tw1 has arrived at a time t4, the smartphone SP provides notification of the first termination request and the first switching request to the driver, and changes the flags FL1, FL2 from 0 to 1. Thereafter, if the driver moves the seat S0 to the position in the driving state on his/her own initiative, for example, at a time t5, then the smartphone SP resets the switching request flag FL2 from 1 to 0 as indicated by broken lines, and will not execute the subsequent steps of notification of the second switching request and switching into the driving state any more. If the driver terminates the app on his/her own initiative, for example, at a time t6, then the smartphone SP resets the termination request flag FL1 from 1 to 0 as indicated by broken lines, and will not execute the steps of notification of the secondary termination request and forceful termination of the app any more.

On the other hand, if the execution of the app or the non-driving state continues even after the notification of the first termination request, and the second notification time tw2 has arrived at a time t7, then the smartphone SP provides notification of the secondary termination request and the secondary switching request to the driver, and changes the flags FL1, FL2 from 1 to 2. Thereafter, if the driver moves the seat S0 to the position in the driving state on his/her own initiative, for example, at a time t8, then the smartphone SP resets the switching request flag FL2 from 2 to 0 as indicated by broken lines, and will not execute the subsequent step of switching to the driving state. If the driver terminates the app on his/her own initiative, for example, at a time t9, then the smartphone SP resets the termination request flag FL1 from 2 to 0 as indicated by broken lines, and will not execute the step of forcefully terminating the app.

If the execution of the app or the non-driving state continues even after the notification of the second termination request, and the termination time tw3 has arrived at a time t10, then the smartphone SP forcefully terminates the app and resets the termination request flag FL1 to 0, switches the seat body S0 into the driving state, and resets the switching request flag FL2 to 0.

Thereafter, if the switching time ts has arrived at a time t11, then switching from the automated driving to the non-automated driving is done, and the driver starts (re-starts) the driving operation.

According to the present embodiment described above, the smartphone SP executing an app during automated driving notifies the driver of a termination request based on the switching time ts acquired from the car controller 10; therefore, the driver using the smartphone SP can be effectively notified of the necessity of switching from the automated driving to the non-automated driving.

Since the smartphone SP notifies the driver of the primary termination request and the secondary termination request as a termination request, the necessity of switching from automated driving to non-automated driving can be notified stepwise. Accordingly, the necessity of switching from the automated driving to the non-automated driving can be notified more effectively.

Since the smartphone SP forcefully terminates the execution of the app if the execution of the app is not terminated by the driver after the driver is notified of the termination request, the driver can be made ready for the switching to the non-automated driving.

If the seat body S0 is in the non-driving state at a time to notify the driver of the termination request, the smartphone SP notifies the driver of the switching request, in addition to the termination request; therefore, the driver using the smartphone SP can be notified effectively through the smartphone SP that the seat body S0 need be moved from its position in the non-driving state back to the position in the driving state.

Since the smartphone SP notifies the driver of the primary switching request and the secondary switching request as a switching request, the necessity of switching the seat body S0 back to the driving state can be notified stepwise. Accordingly, the necessity of switching the seat body S0 back to the driving state can be notified more effectively.

Since the smartphone SP causes the seat actuator 31 to move the seat body S0 to the position in the driving state if the seat body S0 is not moved to the position in the driving state by the operation of the driver after the driver is notified of the switching request, the driver can be made ready for the switching to the non-automated driving.

The fourth embodiment has been described above; the present embodiment may be modified where appropriate for practical application.

For example, in the above-described embodiment, the driver is notified of the termination request twice, i.e., of the primary termination request and the secondary termination request; however, the notification of the termination request may be provided once or three or more times. The notification of the termination request may be caused to continue until the driver terminates the app, for example, by causing the text characters on the display DSP to blink repeatedly, or producing voices or alarms continuously. The same goes for the switching request.

In the above-described embodiment, the switching time ts has been taken as an example of information acquired from the car controller 10 on the switching from the automated driving to the non-automated driving; alternatively, the information on the switching from the automated driving to the non-automated driving may be information on the automated driving section and/or the non-automated driving section which are set by the car controller. In this example, the switching time ts may be computed by the smartphone SP.

The information on the switching from the automated driving to the non-automated driving may be the first notification time tw1, the second notification time tw2, the termination time tw3, or the like. In other words, the smartphone may not compute the first notification time tw1, the second notification time tw2, or the termination time tw3, but may acquire such information from the car controller.

In the above-described embodiment, notification of the primary termination request is timed to coincide with notification of the primary switching request; however, they may be provided with different timings. Specifically, the primary switching request may be notified at a time earlier or later in some measure than a time at which the primary termination request is notified. The same goes for the timing of notification of the secondary termination request and notification of the secondary switching request, and the timing of the forceful termination of the app and the switching of the seat body S0 to the driving state.

The functions of the termination request notification provider 260 and the switching request notification provider 270 may be incorporated in an app executable in the smartphone SP, such as a game app.

In the above-described embodiment, the non-driving state is explained as the state in which the whole seat body S0 has been turned to face backward, but the non-driving state may be, for example, a reclining state in which the seat back as part of the seat body has been tilted back.

Another feasible configuration may not comprise an actuator for moving the seat body to a position in the driving state and to a position in the non-driving state. That is, the switching between the driving state and the non-driving state may be done manually. A determination as to whether or not the seat body is in the driving state or in the non-driving state may be made based on a detection signal of a sensor, such as a gyroscope sensor, which is capable of detecting the orientation, position or the like of at least part of the seat body. To give an example, the gyroscope sensor may be attached to a frame of a seat bottom, or an upper part of a frame of a seat back, and the orientation of the seat body, angle of the seat back or the like can be determine based on the coordinate value detected by the gyroscope sensor.

In the above-described embodiment, the smartphone SP is taken as an example of the terminal used in the car; however, the terminal may be a tablet computer, a notebook computer, or the like. The terminal may not be a mobile terminal, but may be a navigation system or the like fixedly installed in the car.

In the above-described embodiment, the pressure sensors PS1 to PS6 are illustrated as an example of sensors; however, the sensor may be other types of sensors, e.g., a capacitance sensor, a temperature sensor, etc.

In the above-described embodiment, the automobile is taken as an example of a car; however, the car may be a vehicle other than an automobile as long as it is switchable between automated driving and non-automated driving.

Any of the elements explained in relation to the exemplified embodiments and illustrative modified examples described above may be implemented in combination as desired.

The invention claimed is:

1. A seat system comprising:
    a seat that comprises:
        a seat body, and
        a sensor provided in the seat body,
            wherein the sensor is configured to acquire information for use in identifying a physical state of an occupant seated on the seat body;
    a server configured to store pieces of advertising information therein; and
    a terminal configured to:
        acquire the information from the sensor, and
        communicate with the server,
        wherein the terminal comprises:
            a location information acquisition unit configured to acquire location information of the seat, and
        wherein the terminal or the server is further configured to:
            choose, based on either the information or an evaluation value based on the information, and the location information, a piece of advertising information related to the information or the evaluation value, and related to the location information, from among the pieces of advertising information, and
            notify the occupant of the piece of advertising information.

2. The seat system according to claim 1, wherein the terminal is further configured to:
    determine, based on the chosen piece of advertising information, a location of an advertiser of the piece of advertising information' and
    produce a notification of the piece of advertising information on a condition that a location specified by the location information is in a predetermined area including the location of the advertiser.

3. A seat system, comprising:
    a seat that comprises:
        a seat body, and
        a sensor provided in the seat body,
            wherein the sensor is configured to acquire information for use in identifying a physical state of an occupant seated on the seat body;
    a server configured to store pieces of advertising information therein; and
    a terminal configured to:
        acquire the information from the sensor, and
        communicate with the server,
        wherein the terminal or the server is further configured to:
            choose, based on either the information or an evaluation value based on the information, a piece of advertising information related to the information or the evaluation value from among the pieces of advertising information, and
            notify the occupant of the piece of advertising information,
        wherein the sensor is a pressure sensor,
        wherein the evaluation value is related to physical exercise,
        wherein the terminal is further configured to compute the evaluation value based on a pressure value as the information,
        wherein the terminal or the server is further configured to:
            choose the piece of advertising information based on the evaluation value, and wherein the terminal is further configured to:
            execute an exercise program for prompting the occupant seated on the seat to do physical exercises based on the pressure value from the pressure sensor; and
            notify the occupant of the chosen piece of advertising information, on a condition that during execution of the exercise program, a predetermined set of exercises has been completed.

4. The seat system according to claim 3, wherein the terminal is further configured to:
    determine, based on the chosen piece of advertising information, a location of an advertiser of the piece of advertising information, and
    produce the notification of the piece of advertising information on a condition that a location specified by the location information is in a predetermined area including the location of the advertiser.

5. A method of manufacturing a seat system, the method comprising:
- providing a seat that comprises a seat body;
- disposing a sensor in the seat body that is configured to acquire information for identifying a physical state of an occupant seated on the seat body;
- providing a server;
- providing a terminal configured to acquire the information from the sensor and to communicate with the server; and
- storing pieces of advertising information in the server,
    - wherein the terminal comprises a location information acquisition unit configured to acquire location information of the seat, and
    - wherein the terminal or the server is configured to:
        - choose, based on either the information or an evaluation value based on the information, and the location information, a piece of advertising information related to either the information or the evaluation value, and related to the location information, from among the pieces of advertising information, and
        - notify the occupant of the piece of advertising information.

* * * * *